US012081735B2

(12) United States Patent
Ko et al.

(10) Patent No.: US 12,081,735 B2
(45) Date of Patent: Sep. 3, 2024

(54) VIDEO SIGNAL PROCESSING METHOD AND DEVICE

(71) Applicant: WILUS INSTITUTE OF STANDARDS AND TECHNOLOGY INC., Seongnam-si (KR)

(72) Inventors: Geonjung Ko, Seoul (KR); Dongcheol Kim, Suwon-Si (KR); Juhyung Son, Uiwang-Si (KR); Jaehong Jung, Seoul (KR); Jinsam Kwak, Uiwang-si (KR)

(73) Assignee: WILUS INSTITUTE OF STANDARDS AND TECHNOLOGY INC., Seongnam-si (KR)

( * ) Notice: Subject to any disclaimer, the term of this patent is extended or adjusted under 35 U.S.C. 154(b) by 182 days.

(21) Appl. No.: 17/629,385

(22) PCT Filed: Jul. 24, 2020

(86) PCT No.: PCT/KR2020/009783
§ 371 (c)(1),
(2) Date: Jan. 23, 2022

(87) PCT Pub. No.: WO2021/015586
PCT Pub. Date: Jan. 28, 2021

(65) Prior Publication Data
US 2022/0279162 A1    Sep. 1, 2022

(30) Foreign Application Priority Data

Jul. 25, 2019  (KR) .................. 10-2019-0090519
Sep. 6, 2019   (KR) .................. 10-2019-0111060
Oct. 9, 2019   (KR) .................. 10-2019-0124933

(51) Int. Cl.
H04N 19/105    (2014.01)
H04N 19/132    (2014.01)
(Continued)

(52) U.S. Cl.
CPC ......... *H04N 19/105* (2014.11); *H04N 19/132* (2014.11); *H04N 19/159* (2014.11);
(Continued)

(58) Field of Classification Search
CPC ... H04N 19/105; H04N 19/132; H04N 19/186
(Continued)

(56) References Cited

U.S. PATENT DOCUMENTS 9,749,646 B2   8/2017   Zhu et al.
11,601,641 B2  3/2023   Ko et al.
(Continued)

FOREIGN PATENT DOCUMENTS

CN    102907100 A    1/2013
CN    105264889 A    1/2016
(Continued)

OTHER PUBLICATIONS

International Search Report and Written Opinion of PCT/KR2019/013450 of the International Searching Authority dated Feb. 11, 2020.
(Continued)

*Primary Examiner* — Jeffery A Williams
(74) *Attorney, Agent, or Firm* — BROADVIEW IP LAW, PC

(57) ABSTRACT

A method for processing a video signal, of the present disclosure, comprising the steps of: parsing, from a bitstream, upper level merge with MVD (MMVD) activation information (sps_mmvd_enabled_flag) indicating whether the upper level MMVD including a current block is usable; parsing, from the bitstream, MMVD merge information (mmvd_merge_flag) indicating whether the MMVD is used in the current block, if the upper level MMVD activation information indicates the activation of the MMVD; parsing MMVD distance-related information (mmvd_distance_idx)

(Continued)

and MMVD direction-related information (mmvd_direction_idx), if the MMVD merge information indicates that the MMVD is used in the current block; and obtaining MMVD information (mMvdLX) based on the MMVD distance-related information and the MMVD direction-related information, wherein the MMVD information is greater than or equal to $-2^{17}$ and is less than or equal to $2^{17}-1$.

14 Claims, 33 Drawing Sheets

(51) Int. Cl.
| | | |
|---|---|---|
| H04N 19/159 | (2014.01) | |
| H04N 19/167 | (2014.01) | |
| H04N 19/176 | (2014.01) | |
| H04N 19/186 | (2014.01) | |
| H04N 19/33 | (2014.01) | |
| H04N 19/593 | (2014.01) | |
| H04N 19/139 | (2014.01) | |

(52) U.S. Cl.
CPC ......... *H04N 19/167* (2014.11); *H04N 19/176* (2014.11); *H04N 19/186* (2014.11); *H04N 19/33* (2014.11); *H04N 19/593* (2014.11); *H04N 19/139* (2014.11)

(58) Field of Classification Search
USPC ..................................................... 375/240.12
See application file for complete search history.

(56) References Cited

U.S. PATENT DOCUMENTS

| | | | |
|---|---|---|---|
| 2013/0107970 A1* | 5/2013 | Wang | H04N 19/186 375/240.18 |
| 2013/0208794 A1 | 8/2013 | Jeong et al. | |
| 2016/0373742 A1 | 12/2016 | Zhao et al. | |
| 2017/0142418 A1 | 5/2017 | Li et al. | |
| 2017/0251213 A1 | 8/2017 | Ye et al. | |
| 2018/0077423 A1 | 3/2018 | Xu et al. | |
| 2019/0320203 A1 | 10/2019 | Chiang et al. | |
| 2020/0260091 A1 | 8/2020 | Pham Van et al. | |
| 2020/0374528 A1 | 11/2020 | Huang et al. | |
| 2021/0120235 A1 | 4/2021 | Liao et al. | |
| 2022/0007057 A1 | 1/2022 | Liu et al. | |
| 2022/0086486 A1 | 3/2022 | Lim et al. | |
| 2022/0132119 A1 | 4/2022 | Zhang et al. | |

FOREIGN PATENT DOCUMENTS

| | | |
|---|---|---|
| CN | 105934948 A | 9/2016 |
| CN | 107736022 A | 2/2018 |
| CN | 107925759 A | 4/2018 |
| EP | 3866468 A1 | 8/2021 |
| JP | 2009-81576 A | 4/2009 |
| KR | 10-2014-0136428 A | 11/2014 |
| KR | 10-2015-0081236 A | 7/2015 |
| KR | 10-2017-0059718 A | 5/2017 |
| KR | 10-2018-0005121 A | 1/2018 |
| KR | 10-2018-0007345 A | 1/2018 |
| KR | 10-2018-0041211 A | 4/2018 |
| KR | 10-2018-0043787 A | 4/2018 |
| WO | 2011-126272 A2 | 10/2011 |
| WO | 2017/039117 A1 | 3/2017 |
| WO | 2019076138 A1 | 4/2019 |
| WO | 2021/015586 A1 | 1/2021 |

OTHER PUBLICATIONS

India Intellectual Property Office Application No. 202127017390, Office action dated Aug. 2, 2022.
Man-Shu Chiang et al., CE10.1.1: Multi-hypothesis prediction for improving AMVP mode, skip or merge mode, and intra mode, JVET-L0100 version 4, Oct. 8, 2018.
English Translation of the Written Opinion of PCT/KR2020/009783 of the International Search Authority dated Oct. 27, 2020.
Bross, Benjamin et al., Versatile Video Coding (Draft 6), Joint Video Experts Team (JVET) of ITU-T SG 16 WP 3 and ISO/IEC JTC 1/SC 29/WG 11, JVET-O2001-vC, 15th Meeting: Gothenburg, SE, pp. 1-419, Jul. 24, 2019, pp. 17, 33-40, 69, 150-153 and 202-266.
Bross, Benjamin et al., Versatile Video Coding (Draft 7), Joint Video Experts Team (JVET) of ITU-T SG 16 WP 3 and ISO/IEC JTC 1/SC 29/WG 11, 16th Meeting: Geneva, CH, Oct. 13, 2019, pp. 19, 36-44, 71, 152-154 and 203-273.
International Search Report & Written Opinion of the International Searching Authority dated Oct. 27, 2020.
Luong Pham Van et al., CE10: CIIP with position-independent weights (Test CE10-1.1), JVET-N0302, Joint Video Experts Team (JVET) of ITU-T SG 16 WP 3 and ISO/IEC JTC 1/SC 29/WG 11 14th Meeting: Geneva, CH, Mar. 13, 2019.
Geonjung Ko et al., Non-CE4: Neighboring locations for CIIP, JVET-P0595, Joint Video Experts Team (JVET) of ITU-T SG 16 WP 3 and ISO/IEC JTC 1/SC 29/WG 11, 16th Meeting: Geneva, CH, Sep. 25, 2019.
Extended European Search Report for EP19870803 by European Patent Office dated Jun. 29, 2022.
Non-Final Office Action for IN202227004628 by Intellectual Property India dated Jun. 24, 2022.
Non-Final Office Action for JP2021-519860 by Japan Patent Office dated May 30, 2022.
Zhao (Huawei) Y et al: "CE6: Sub-block transform for inter blocks (CE6.1.2)", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L0358; Sep. 30, 2018.
C-W Hsu (Mediatek) et al: "Description of 1-15 SDR video coding technology proposal by MediaTek", 10. JVET Meeting; Apr. 10, 2018-Apr. 20, 2018; San Diego; (The Joint Video Exploration Team of ISO/IEC JTC1/SC29/ WG11 and ITU-T SG.16), No. JVET-J0018; Apr. 11, 2018.
Zhang (Qualcomm) K et al: "Intra-prediction Mode Propagation for Inter-pictures", 10. JVET Meeting; Apr. 10, 2018-Apr. 20, 2018; San Diego; (The Joint Video Exploration Team of ISO/IEC JTC1/SC29/WG11 and ITU-T SG. 16), No. JVET-J0053; Apr. 15, 2018.
Bross et al: "Versatile Video Coding (Draft 3)", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L1001.
C-W Hsu (Mediatek) et al: "Description of Core Experiment 10: Combined and multi-hypothesis prediction", 12. JVET Meeting; Oct. 3, 2018-Oct. 12, 2018; Macao; (The Joint Video Exploration Team of ISO/IEC JTC1/SC29/ WG11 and ITU-T SG.16), No. JVET-L1030.
Notice of Allowance and Fees Due (PTOL-85) issued for U.S. Appl. No. 17/227,839 by United States Patent and Trademark Office dated Sep. 14, 2022.
Office Action for JP 2022-505306 by Japan Patent Office dated May 8, 2023.
Bross, Benjamin et al. "Versatile Video Coding" (Draft 6), and Joint Video Experts Team (JVET), Jul. 24, 2019, [JVET-O2001-vC] (version 12), pp. 36,69,144,202-204,211-212.
Deng, Zhipin et al. "Non-CE4 : Cleanups on MVD Ranges" and Joint Video Experts Team (JVET), Jul. 8, 2019, [JVET-O0567-v2] (version 4).
Office Action for CN 201980067130.8 by China National Intellectual Property Administration dated Jun. 29, 2023.
Office Action for EP 20844004.0 by European Patent Office dated Jul. 1, 2023.
Ko, Geonjung et al. "Non-CE4: Neighboring locations for CIIP". Joint Video Experts Team (JVET) of ITU-T SG 16 WP 3 and ISO/IEC JTC 1/SC 29/WG 11. JVET-P0595. (Sep. 25, 2019), XP030206699. URL:http://phenix.int-evry.fr/mpeg/doc_end_user/documents/128_Geneva/wg11 /m50568-JVET-P0595-V1 -JVET-P0595.zip.

(56) References Cited

OTHER PUBLICATIONS

Notice of Allowance for JP 2021-519860 by Japan Patent Office dated Jul. 31, 2023.
Zhao, Yin et al. (2019) "CE6: Sub-Block Transform for Inter Blocks (CE6.4.1)", JVET-M0140 (version 3) ITU. pp. 1-10. URL: https://jvet-experts.org/doc_end_user/documents/13_Marrakech/wg11/JVET-M0140-v3.zip.
Extended European Search Report for EP 20 84 4004 by European Patent Office dated Aug. 2, 2022.
Pham Van (Qualcomm) L et al: "CE10: CIIP with position-independent weights (Test CE10-1.1)", 14. JVET Meeting; Mar. 19, 2019-Mar. 27, 2019; Geneva; (The Joint Video Exploration Team of ISO/IEC JTC1/SC29/WG11 and ITU-T SG.16), No. JVET-N0302 Mar. 13, 2019 (Mar. 13, 2019), XP030202954, Retrieved from the Internet: URL: http://phenix.int-evry.fr/jvet/doc_end_user/documents/14_Geneva/wg11/JVET-N0302-v1.zip JVET-N0302_Spec.docx [retrieved on Mar. 13, 2019].
Kiu (Kwai) X et al: "CE2-related: Prediction dependent luma residual scaling for adaptive in-loop re-shaper", 15. JVET Meeting; Jul. 3, 2019-Jul. 12, 2019; Gothenburg; (The Joint Video Explaration Team of ISO/IEC JTC1/SC29/WG11 and ITU-T SG. 16), No. JVET-O0603; m48742 Jul. 1, 2019 (Jul. 1, 2019), XP030220023, Retrieved from the Internet: URL:http://phenix.int-evry.fr/jvet/doc_end_user/documents/15_Gothenburg/wg11/JVET-O0603-v2.zipJVET-O0603-WD-text.docx [retrieved on Jul. 1, 2019].
Man-Shu Chiang et al., CE10.1.1: Multi-hypothesis prediction for improving AMVP mode, skip or merge mode, and intra mode, JVET-L0100 version 3, Joint Video Experts Team (JVET) of ITU-T SG 16 WP 3 and ISO/IEC JTC 1/SC 29/WG 11, 12th Meeting: Macao, CN, 3-12, Oct. 8, 2018.
Luong Pham Van et al., CE10: CIIP with position-independent weights (Test CE10-1.1), JVET-N0302 version 1, Joint Video Experts Team (JVET) of ITU-T SG 16 WP 3 and ISO/IEC JTC 1/SC 29/WG 11, 14th Meeting: Geneva, CH, 19-27, Mar. 12, 2019.
Geonjung Ko et al., Non-CE4: Neighboring locations for CIIP, JVET-P0595, Joint Video Experts Team (JVET) of ITU-T SG 16 WP 3 and ISO/IEC JTC 1/SC 29/WG 11, 16th Meeting: Geneva, CH, 1-11, Sep. 25, 2019.
Man-Shu Chiang et al., CE10.1: Combined and multi-hypothesis prediction, JVET-K0257 version 1, Joint Video Experts Team (JVET) of ITU-T SG 16 WP 3 and ISO/IEC JTC 1/SC 29/WG 11, 11th Meeting: Ljubljana, SI, 10-18, Jul. 2, 2018.
Non-Final Office Action by United States Patent and Trademark Office for U.S. Appl. No. 17/227,839 dated Mar. 30, 2022.
Corrected Notice of Allowance and Fees Due for U.S. Appl. No. 17/227,839 by United States Patent and Trademark Office dated Nov. 7, 2022.
Notice of Reasons for Refusal for JP2021-519860 by Japan Patent Office dated Dec. 23, 2022.
Ling Li, et al., CE3-6.2.1: Extended MPM list, Joint Video Experts Team (JVET) of ITU-T SG 16 WP 3 and ISO/IEC JTC 1/SC 29/WG 11, JVET-L0165, Nov. 8, 2018.
Benjamin Bross, et al., Versatile Video Coding (Draft 6), Joint Video Experts Team (JVET) of ITU-T SG 16 WP 3 and ISO/IEC JTC 1/SC 29/WG 11, JVET-O2001-vE, Jul. 31, 2019,pp. 268-269.
Corrected Notice of Allowance and Fees Due for U.S. Appl. No. 17/227,839 by United States Patent and Trademark Office dated Feb. 6, 2023.
Notice of Allowance for CN 201980067130.8 by China National Intellectual Property Administration dated Jan. 31, 2024.
Office Action for KR 10-2021-7012536 by Korean Intellectual Property Office dated Jan. 18, 2024.
Chiang, Man-Shu et al. "CE10.1: Combined and multi-hypothesis prediction". Document: JVET-K0257-v1. Joint Video Experts Team (JVET) of ITU-T SG 16 WP 3 and ISO/IEC JTC 1/SC 29/WG 11. 11th Meeting: Ljubljana, SI, Jul. 10-18, 2018.
Corrected Notice of Allowance for U.S. Appl. No. 18/065,839 by United States Patent and Trademark Office dated Mar. 13, 2024.
Reconsideration Report By Examiner Before Appeal for JP 2024-000161 by Japan Patent Office dated Feb. 27, 2024.
Hearing Notice for IN 202227004628 by Intellectual Property India dated Mar. 19, 2024.
Corrected Notice of Allowance for U.S. Appl. No. 18/065,839 by United States Patent and Trademark Office dated Mar. 27, 2024.
Decision of Rejection for JP 2022-505306 by Japan Patent Office dated Oct. 2, 2023.
Office Action for U.S. Appl. No. 18/065,839 by United States Patent and Trademark Office dated Nov. 8, 2023.

* cited by examiner

Fig.6
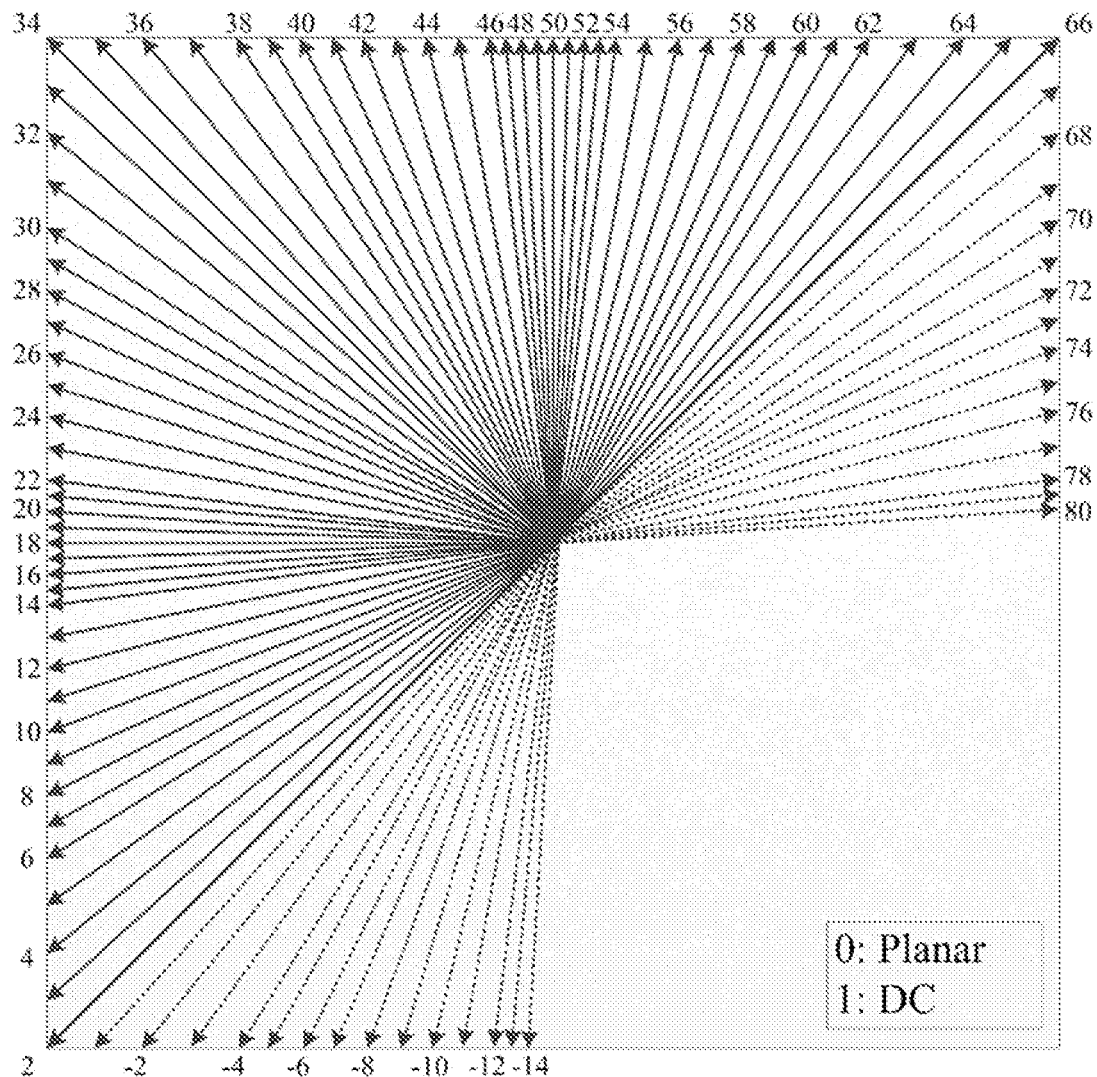
Fig.7
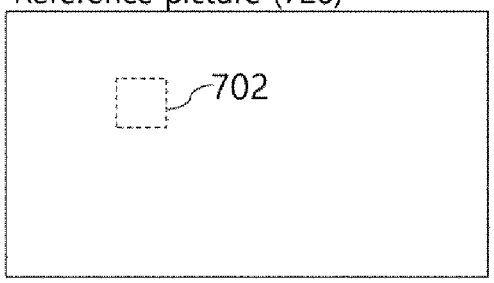
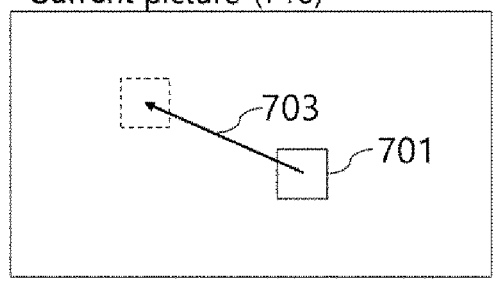

| mvd_coding( x0, y0, refList ) { | Descriptor |
|---|---|
| abs_mvd_greater0_flag[ 0 ] | ae(v) |
| abs_mvd_greater0_flag[ 1 ] | ae(v) |
| if( abs_mvd_greater0_flag[ 0 ] ) | |
|    abs_mvd_greater1_flag[ 0 ] | ae(v) |
| if( abs_mvd_greater0_flag[ 1 ] ) | |
|    abs_mvd_greater1_flag[ 1 ] | ae(v) |
| if( abs_mvd_greater0_flag[ 0 ] ) { | |
|    if( abs_mvd_greater1_flag[ 0 ] ) | |
|      abs_mvd_minus2[ 0 ] | ae(v) |
|    mvd_sign_flag[ 0 ] | ae(v) |
| } | |
| if( abs_mvd_greater0_flag[ 1 ] ) { | |
|    if( abs_mvd_greater1_flag[ 1 ] ) | |
|      abs_mvd_minus2[ 1 ] | ae(v) |
|    mvd_sign_flag[ 1 ] | ae(v) |
| } | |
| } | |

Fig.11

| coding_unit( x0, y0, cbWidth, cbHeight, treeType ) { | Descriptor |
|---|---|
|   /* MODE_INTER */ | |
|   if( cu_skip_flag[ x0 ][ y0 ] ) { | |
|     if( sps_affine_enabled_flag && cbWidth >= 8 && cbHeight >= 8 ) | |
|       merge_subblock_flag[ x0 ][ y0 ] | ae(v) |
|     if( merge_subblock_flag[ x0 ][ y0 ] == 0 && MaxNumMergeCand > 1 ) | |
|       merge_idx[ x0 ][ y0 ] | ae(v) |
|     if( merge_subblock_flag[ x0 ][ y0 ] == 1 && MaxNumSubblockMergeCand > 1 ) | |
|       merge_subblock_idx[ x0 ][ y0 ] | ae(v) |
|   } else { | |
|     merge_flag[ x0 ][ y0 ] | ae(v) |
|     if( merge_flag[ x0 ][ y0 ] ) { | |
|       if( sps_affine_enabled_flag && cbWidth >= 8 && cbHeight >= 8 ) | |
|         merge_subblock_flag[ x0 ][ y0 ] | ae(v) |
|       if( merge_subblock_flag[ x0 ][ y0 ] == 0 && MaxNumMergeCand > 1 ) | |
|         merge_idx[ x0 ][ y0 ] | ae(v) |
|       if( merge_subblock_flag[ x0 ][ y0 ] == 1 && MaxNumSubblockMergeCand > 1 ) | |
|         merge_subblock_idx[ x0 ][ y0 ] | ae(v) |
|     } else { | |
|       if( slice_type == B ) | |
|         inter_pred_idc[ x0 ][ y0 ] | ae(v) |
|       if( sps_affine_enabled_flag && cbWidth >= 16 && cbHeight >= 16 ) { | |
|         inter_affine_flag[ x0 ][ y0 ] | ae(v) |
|         if( sps_affine_type_flag && inter_affine_flag[ x0 ][ y0 ] ) | |
|           cu_affine_type_flag[ x0 ][ y0 ] | ae(v) |
|       } | |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0, 0 ) | |
|         if( MotionModelIdc[ x0 ][ y0 ] > 0 ) | |
|           mvd_coding( x0, y0, 0, 1 ) | |
|         if( MotionModelIdc[ x0 ][ y0 ] > 1 ) | |
|           mvd_coding( x0, y0, 0, 2 ) | |
|         mvp_l0_flag[ x0 ][ y0 ] | ae(v) |
|       } else { | |
|         MvdL0[ x0 ][ y0 ][ 0 ] = 0 | |
|         MvdL0[ x0 ][ y0 ][ 1 ] = 0 | |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && inter_pred_idc[ x0 ][ y0 ] == PRED_BI ) { | |
|           MvdL1[ x0 ][ y0 ][ 0 ] = 0 | |
|           MvdL1[ x0 ][ y0 ][ 1 ] = 0 | |
|           MvdCpL1[ x0 ][ y0 ][ 0 ][ 0 ] = 0 | |
|           MvdCpL1[ x0 ][ y0 ][ 0 ][ 1 ] = 0 | |
|           MvdCpL1[ x0 ][ y0 ][ 1 ][ 0 ] = 0 | |
|           MvdCpL1[ x0 ][ y0 ][ 1 ][ 1 ] = 0 | |
|           MvdCpL1[ x0 ][ y0 ][ 2 ][ 0 ] = 0 | |
|           MvdCpL1[ x0 ][ y0 ][ 2 ][ 1 ] = 0 | |
|         } else { | |
|           mvd_coding( x0, y0, 1, 0 ) | |
|           if( MotionModelIdc[ x0 ][ y0 ] > 0 ) | |
|             mvd_coding( x0, y0, 1, 1 ) | |
|           if( MotionModelIdc[ x0 ][ y0 ] > 1 ) | |
|             mvd_coding( x0, y0, 1, 2 ) | |
|           mvp_l1_flag[ x0 ][ y0 ] | ae(v) |
|       } else { | |
|         MvdL1[ x0 ][ y0 ][ 0 ] = 0 | |
|         MvdL1[ x0 ][ y0 ][ 1 ] = 0 | |
|       } | |
|       if( sps_amvr_enabled_flag && inter_affine_flag == 0 && | |
|         ( MvdL0[ x0 ][ y0 ][ 0 ] != 0 \|\| MvdL0[ x0 ][ y0 ][ 1 ] != 0 \|\| | |
|         MvdL1[ x0 ][ y0 ][ 0 ] != 0 \|\| MvdL1[ x0 ][ y0 ][ 1 ] != 0 ) ) | |
|         amvr_mode[ x0 ][ y0 ] | ae(v) |
|     } | |
|   } | |
|   if( CuPredMode[ x0 ][ y0 ] != MODE_INTRA && cu_skip_flag[ x0 ][ y0 ] == 0 ) | |
|     cu_cbf | ae(v) |
|   if( cu_cbf ) { | |
|     transform_tree( x0, y0, cbWidth, cbHeight, treeType ) | |
| } | |

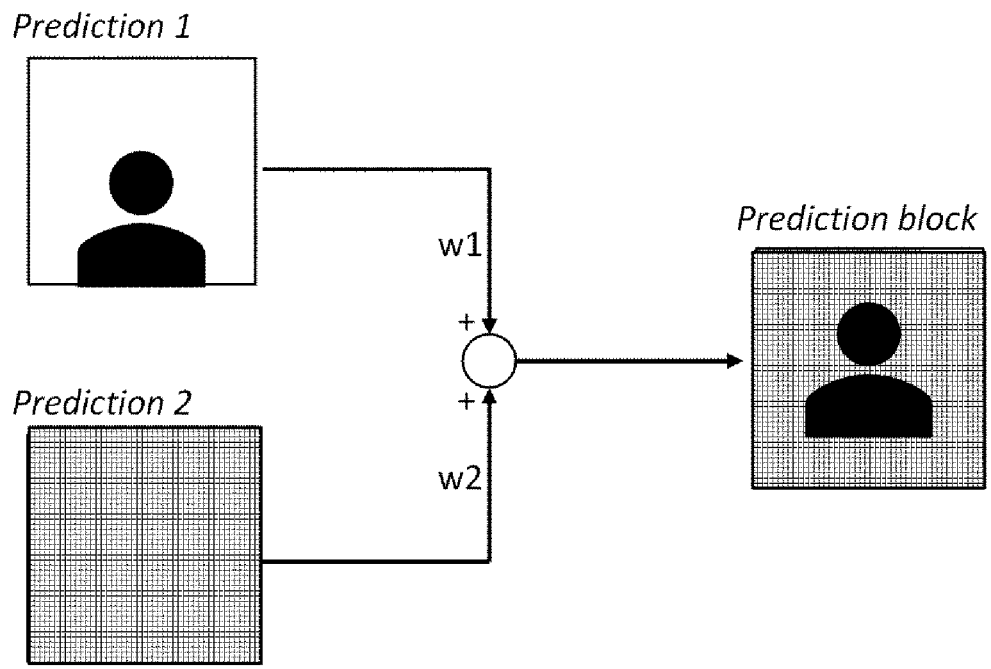

| if( mh_conditions ) | |
|---|---|
|   mh_intra_flag[ x0 ][ y0 ] | ae(v) |
| if( mh_intra_flag[ x0 ][ y0 ] ) { | |
|   if( Abs(Log2( cbWidth/cbHeight )) < 2 ) | |
|     mh_intra_luma_mpm_flag[ x0 ][ y0 ] | ae(v) |
|   if( mh_intra_luma_mpm_flag[ x0 ][ y0 ] ) | |
|     mh_intra_luma_mpm_idx[ x0 ][ y0 ] | ae(v) |
| } | |

Fig.27

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In monochrome sampling there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling, depending on the value of separate_colour_plane_flag, the following applies:
- If separate_colour_plane_flag is equal to 0, each of the two chroma arrays has the same height and width as the luma array.
- Otherwise (separate_colour_plane_flag is equal to 1), the three colour planes are separately processed as monochrome sampled pictures.

Fig.30

8.5.6.7 Weighted sample prediction process for combined merge and intra prediction

Inputs to this process are:

- a luma location ( xCb, yCb ) specifying the top-left sample of the current luma coding block relative to the top left luma sample of the current picture,
- the width of the current coding block cbWidth,
- the height of the current coding block cbHeight,
- two (cbWidth)x(cbHeight) arrays predSamplesInter and predSamplesIntra,
- a variable cIdx specifying the colour component index.

Output of this process is the (cbWidth)x(cbHeight) array predSamplesComb of prediction sample values.

The variable bitDepth is derived as follows:

- If cIdx is equal to 0, bitDepth is set equal to $BitDepth_Y$.
- Otherwise, bitDepth is set equal to $BitDepth_C$.

The variable scallFact is derived as follows:

$$scallFact = ( cIdx == 0 ) ? 0 : 1. \quad (8\text{-}838)$$

The neighbouring luma locations ( xNbA, yNbA ) and ( xNbB, yNbB ) are set equal to ( xCb − 1, yCb − 1 + ( cbHeight << scallFact ) ) and ( xCb − 1 + (cbWidth << scallFact ), yCb − 1 ), respectively.

For X being replaced by either A or B, the variables availableX and isIntraCodedNeighbourX are derived as follows:

The derivation process for neighbouring block availability as specified in clause 6.4.4 is invoked with the location ( xCurr, yCurr ) set equal to ( xCb, yCb ), the neighbouring location ( xNbY, yNbY ) set equal to ( xNbX, yNbX ) , checkPredModeY set equal to TRUE, and cIdx set equal to 0 as inputs, and the output is assigned to availableX.

- The variable isIntraCodedNeighbourX is derived as follows:

If availableX is equal to TRUE and CuPredMode[ 0 ][ xNbX ][ yNbX ] is equal to MODE_INTRA, isIntraCodedNeighbourX is set equal to TRUE.

- Otherwise, isIntraCodedNeighbourX is set equal to FALSE.

The weight w is derived as follows:

- If isIntraCodedNeighbourA and isIntraCodedNeighbourB are both equal to TRUE, w is set equal to 3.

Otherwise, if isIntraCodedNeighbourA and isIntraCodedNeighbourB are both equal to to FALSE, w is set equal to 1.

- Otherwise, w is set equal to 2.

When cIdx is equal to 0 and slice_lmcs_enabled_flag is equal to 1, predSamplesInter[ x ][ y ] with x = 0..cbWidth − 1 and y = 0..cbHeight − 1 are modified as follows:

$$\begin{aligned} &idxY = predSamplesInter[\ x\ ][\ y\ ] >> Log2(\ OrgCW\ ) \\ &predSamplesInter\ [\ x\ ][\ y\ ] = Clip1_Y(\ LmcsPivot[\ idxY\ ] + \\ &\quad (\ ScaleCoeff[\ idxY\ ] * (\ predSamplesInter[\ x\ ][\ y\ ] - InputPivot[\ idxY\ ] ) + \\ &\quad (\ 1 << 10\ )\ ) >> 11\ ) \end{aligned} \quad (8\text{-}839)$$

The prediction samples predSamplesComb[ x ][ y ] with x = 0..cbWidth − 1 and y = 0..cbHeight − 1 are derived as follows:

$$predSamplesComb[\ x\ ][\ y\ ] = (\ w * predSamplesIntra[\ x\ ][\ y\ ] + \\ (\ 4 - w\ ) * predSamplesInter[\ x\ ][\ y\ ] + 2) >> 2 \quad (8\text{-}840)$$

Fig.32

8.5.6.7 Weighted sample prediction process for combined merge and intra prediction

Inputs to this process are:
- a luma location ( xCb, yCb ) specifying the top-left sample of the current luma coding block relative to the top left luma sample of the current picture,
- the width of the current coding block cbWidth,
- the height of the current coding block cbHeight,
- two (cbWidth)x(cbHeight) arrays predSamplesInter and predSamplesIntra,
- a variable cIdx specifying the colour component index.

Output of this process is the (cbWidth)x(cbHeight) array predSamplesComb of prediction sample values.

The variable bitDepth is derived as follows:
- If cIdx is equal to 0, bitDepth is set equal to BitDepth$_Y$.
- Otherwise, bitDepth is set equal to BitDepth$_C$.

The variable scallFact is derived as follows:

scallFactWidth = ( cIdx = = 0 | | SubWidthC = = 1 ) ? 0 : 1

(8-838)

scallFactHeight = ( cIdx = = 0 | | SubHeightC = = 1 ) ? 0 : 1

(8-839)

The neighbouring luma locations ( xNbA, yNbA ) and ( xNbB, yNbB ) are set equal to
( xCb − 1, yCb − 1 + ( cbHeight << scallFactHeight ) ) and
( xCb − 1 + (cbWidth << scallFactWidth ), yCb − 1 ), respectively.

For X being replaced by either A or B, the variables availableX and isIntraCodedNeighbourX are derived as follows:

- The derivation process for neighbouring block availability as specified in clause 6.4.4 is invoked with the location ( xCurr, yCurr ) set equal to ( xCb, yCb ), the neighbouring location ( xNbY, yNbY ) set equal to ( xNbX, yNbX ) , checkPredModeY set equal to TRUE, and cIdx set equal to 0 as inputs, and the output is assigned to availableX.

- The variable isIntraCodedNeighbourX is derived as follows:  ⎫
    - If availableX is equal to TRUE and CuPredMode[ 0 ][ xNbX ][ yNbX ] is equal to MODE_INTRA, isIntraCodedNeighbourX is set equal to TRUE.  ⎬ 3210
    - Otherwise, isIntraCodedNeighbourX is set equal to FALSE.  ⎭

The weight w is derived as follows:

- If isIntraCodedNeighbourA and isIntraCodedNeighbourB are both equal to TRUE, w is set equal to 3.  ⎫
- Otherwise, if isIntraCodedNeighbourA and isIntraCodedNeighbourB are both equal to to FALSE, w is set equal to 1.  ⎬ 3220
- Otherwise, w is set equal to 2.  ⎭

When cIdx is equal to 0 and slice_lmcs_enabled_flag is equal to 1, predSamplesInter[ x ][ y ] with x = 0..cbWidth − 1 and y = 0..cbHeight − 1 are modified as follows:

idxY = predSamplesInter[ x ][ y ] >> Log2( OrgCW )
predSamplesInter [ x ][ y ] = Clip1$_Y$( LmcsPivot[ idxY ] +  (8-840)
    ( ScaleCoeff[ idxY ] * ( predSamplesInter[ x ][ y ]
    − InputPivot[ idxY ] ) +
    ( 1 << 10 ) ) >> 11 )

Fig.33

8.5.6.7 Weighted sample prediction process for combined merge and intra prediction

Inputs to this process are:

- a luma location ( xCb, yCb ) specifying the top-left sample of the current luma coding block relative to the top left luma sample of the current picture,
- the width of the current coding block cbWidth,
- the height of the current coding block cbHeight,
- two (cbWidth)x(cbHeight) arrays predSamplesInter and predSamplesIntra,
- a variable cIdx specifying the colour component index.

Output of this process is the (cbWidth)x(cbHeight) array predSamplesComb of prediction sample values.

The variable bitDepth is derived as follows:

- If cIdx is equal to 0, bitDepth is set equal to BitDepth$_Y$.
- Otherwise, bitDepth is set equal to BitDepth$_C$.

The variable scallFact is derived as follows:

$$\text{scallFactWidth} = (\text{cIdx} == 0 \,||\, \text{SubWidthC} == 1\,) \,?\, 1 : 2 \qquad (8\text{-}838)$$

$$\text{scallFactHeight} = (\text{cIdx} == 0 \,||\, \text{SubHeightC} == 1\,) \,?\, 1 : 2 \qquad (8\text{-}839)$$

The neighbouring luma locations ( xNbA, yNbA ) and ( xNbB, yNbB ) are set equal to ( xCb − 1, yCb − 1 + ( cbHeight * scallFactHeight ) ) and ( xCb − 1 + (cbWidth * scallFactWidth ), yCb − 1 ), respectively.

For X being replaced by either A or B, the variables availableX and isIntraCodedNeighbourX are derived as follows:

- The derivation process for neighbouring block availability as specified in clause 6.4.4 is invoked with the location ( xCurr, yCurr ) set equal to ( xCb, yCb ), the neighbouring location ( xNbY, yNbY ) set equal to ( xNbX, yNbX ) , checkPredModeY set equal to TRUE, and cIdx set equal to 0 as inputs, and the output is assigned to availableX.
- The variable isIntraCodedNeighbourX is derived as follows:
  - If availableX is equal to TRUE and CuPredMode[ 0 ][ xNbX ][ yNbX ] is equal to MODE_INTRA, isIntraCodedNeighbourX is set equal to TRUE.
  - Otherwise, isIntraCodedNeighbourX is set equal to FALSE.

The weight w is derived as follows:

- If isIntraCodedNeighbourA and isIntraCodedNeighbourB are both equal to TRUE, w is set equal to 3.
- Otherwise, if isIntraCodedNeighbourA and isIntraCodedNeighbourB are both equal to to FALSE, w is set equal to 1.
- Otherwise, w is set equal to 2.

When cIdx is equal to 0 and slice_lmcs_enabled_flag is equal to 1, predSamplesInter[ x ][ y ] with x = 0..cbWidth − 1 and y = 0..cbHeight − 1 are modified as follows:

$$\text{idxY} = \text{predSamplesInter}[\,x\,][\,y\,] \gg \text{Log2}(\,\text{OrgCW}\,)$$
$$\text{predSamplesInter}[\,x\,][\,y\,] = \text{Clip1}_Y(\,\text{LmcsPivot}[\,\text{idxY}\,] + \qquad (8\text{-}840)$$
$$(\,\text{ScaleCoeff}[\,\text{idxY}\,] * (\,\text{predSamplesInter}[\,x\,][\,y\,] - \text{InputPivot}[\,\text{idxY}\,]\,) +$$
$$(\,1 \ll 10\,)\,) \gg 11\,)$$

The prediction samples predSamplesComb[ x ][ y ] with x = 0..cbWidth − 1 and y = 0..cbHeight − 1 are derived as follows:

$$\text{predSamplesComb}[\,x\,][\,y\,] = (\,w * \text{predSamplesIntra}[\,x\,][\,y\,] + \qquad (8\text{-}841)$$
$$(\,4 - w\,) * \text{predSamplesInter}[\,x\,][\,y\,] + 2) \gg 2$$

Fig.34

8.5.6.7 Weighted sample prediction process for combined merge and intra prediction

Inputs to this process are:

- a luma location ( xCb, yCb ) specifying the top-left sample of the current luma coding block relative to the top left luma sample of the current picture,
- the width of the current coding block cbWidth,
- the height of the current coding block cbHeight,
- two (cbWidth)x(cbHeight) arrays predSamplesInter and predSamplesIntra,
- a variable cIdx specifying the colour component index.

Output of this process is the (cbWidth)x(cbHeight) array predSamplesComb of prediction sample values.

The variable bitDepth is derived as follows:

- If cIdx is equal to 0, bitDepth is set equal to $BitDepth_Y$.
- Otherwise, bitDepth is set equal to $BitDepth_C$.

The variable scallFact is derived as follows:

$$\text{scallFactWidth} = (\text{cIdx} == 0 \,||\, \text{SubWidthC} == 1 \,) ? 0 : 1 \qquad (8\text{-}838)$$

$$\text{scallFactHeight} = (\text{cIdx} == 0 \,||\, \text{SubHeightC} == 1 \,) ? 0 : 1 \qquad (8\text{-}839)$$

The neighbouring luma locations ( xNbA, yNbA ) and ( xNbB, yNbB ) are set equal to ( xCb − 1, yCb − 1 + ( cbHeight << scallFactHeight ) ) and ( xCb − 1 + (cbWidth << scallFactWidth ), yCb − 1 ), respectively.

For X being replaced by either A or B, the variables availableX and isIntraCodedNeighbourX are derived as follows:

- The derivation process for neighbouring block availability as specified in clause 6.4.4 is invoked with the location ( xCurr, yCurr ) set equal to ( xCb, yCb ), the neighbouring location ( xNbY, yNbY ) set equal to ( xNbX, yNbX ) , checkPredModeY set equal to TRUE, and cIdx set equal to cIdx as inputs, and the output is assigned to availableX.
- The variable isIntraCodedNeighbourX is derived as follows:
  - If availableX is equal to TRUE and CuPredMode[ 0 ][ xNbX ][ yNbX ] is equal to MODE_INTRA, isIntraCodedNeighbourX is set equal to TRUE.
  - Otherwise, isIntraCodedNeighbourX is set equal to FALSE.

The weight w is derived as follows:

- If isIntraCodedNeighbourA and isIntraCodedNeighbourB are both equal to TRUE, w is set equal to 3.
- Otherwise, if isIntraCodedNeighbourA and isIntraCodedNeighbourB are both equal to to FALSE, w is set equal to 1.
- Otherwise, w is set equal to 2.

When cIdx is equal to 0 and slice lmcs enabled flag is equal to 1, predSamplesInter[ x ][ y ] with x = 0..cbWidth − 1 and y = 0..cbHeight − 1 are modified as follows:

$$\text{idxY} = \text{predSamplesInter}[\,x\,][\,y\,] >> \text{Log2}(\text{OrgCW})$$
$$\text{predSamplesInter}[\,x\,][\,y\,] = \text{Clip1}_Y(\text{LmcsPivot}[\,\text{idxY}\,] + \qquad (8\text{-}840)$$
$$(\text{ScaleCoeff}[\,\text{idxY}\,] * (\text{predSamplesInter}[\,x\,][\,y\,] - \text{InputPivot}[\,\text{idxY}\,]) +$$
$$(1 << 10)) >> 11\,)$$

The prediction samples predSamplesComb[ x ][ y ] with x = 0..cbWidth − 1 and y = 0..cbHeight − 1 are derived as follows:

$$\text{predSamplesComb}[\,x\,][\,y\,] = (\,w * \text{predSamplesIntra}[\,x\,][\,y\,] + \qquad (8\text{-}841)$$
$$(4 - w) * \text{predSamplesInter}[\,x\,][\,y\,] + 2) >> 2$$

Fig.36

When ciip_flag[ xCb ][ yCb ] is equal to 1, the array predSamples of prediction samples is modified as follows:

- The weighting value derivation process is invoked with the location ( xTbCmp, yTbCmp ) set equal to ( xCb, yCb ), the coding block width cbWidth, the coding block height cbHeight, as inputs, and the output is assigend to the weighting value w.
- If cIdx is equal to 0, the following applies:
  - The general intra sample prediction process as specified in clause 8.4.5.2.5 is invoked with the location ( xTbCmp, yTbCmp ) set equal to ( xCb, yCb ), the intra prediction mode predModeIntra set equal to IntraPredModeY[ xCb ][ yCb ], the transform block width nTbW and height nTbH set equal to cbWidth and cbHeight, the coding block width nCbW and height nCbH set equal to cbWidth and cbHeight, and the variable cIdx as inputs, and the output is assigned to the (cbWidth)x(cbHeight) array predSamplesIntra$_L$.
  - The weighted sample prediction process for combined merge and intra prediction as specified in clause 8.5.6.7 is invoked with the location ( xTbCmp, yTbCmp ) set equal to ( xCb, yCb ), the coding block width cbWidth, the coding block height cbHeight, the sample arrays predSamplesInter and predSamplesIntra set equal to predSamples and predSamplesIntra$_L$, respectively, the intra prediction mode predModeIntra set equal to IntraPredModeY[ xCb ][ yCb ], the colour component index cIdx, and the weighting value w as inputs, and the output is assigend to the (cbWidth)x(cbHeight) array predSamples.
- Otherwise, if cIdx is equal to 1, the following applies:
  - The general intra sample prediction process as specified in clause 8.4.5.2.5 is invoked with the location ( xTbCmp, yTbCmp ) set equal to ( xCb / SubWidthC , yCb / SubHeightC ), the intra prediction mode predModeIntra set equal to IntraPredModeY[ xCb ][ yCb ], the transform block width nTbW and height nTbH set equal to cbWidth / SubWidthC and cbHeight / SubHeightC, the coding block width nCbW and height nCbH set equal to cbWidth / SubWidthC and cbHeight / SubHeightC, and the variable cIdx as inputs, and the output is assigned to the (cbWidth / SubWidthC )x(cbHeight / SubHeightC) array predSamplesIntra$_{Cb}$.
  - The weighted sample prediction process for combined merge and intra prediction as specified in clause 8.5.6.7 is invoked with the location ( xTbCmp, yTbCmp ) set equal to ( xCb, yCb ), the coding block width cbWidth / SubWidthC , the coding block height cbHeight / SubHeightC, the sample arrays predSamplesInter and predSamplesIntra set equal to predSamples$_{Cb}$ and predSamplesIntra$_{Cb}$, respectively, the intra prediction mode predModeIntra set equal to IntraPredModeY[ xCb ][ yCb ], the colour component index cIdx, and the weighting value w as inputs, and the output is assigend to the (cbWidth / SubWidthC )x(cbHeight / SubHeightC) array predSamples.
- Otherwise (cIdx is equal to 2), the following applies:
  - The general intra sample prediction process as specified in clause 8.4.5.2.5 is invoked with the location ( xTbCmp, yTbCmp ) set equal to ( xCb / SubWidthC , yCb / SubHeightC ), the intra prediction mode predModeIntra set equal to IntraPredModeY[ xCb ][ yCb ], the transform block width nTbW and height nTbH set equal to cbWidth / SubWidthC and cbHeight / SubHeightC, the coding block width nCbW and height nCbH set equal to cbWidth / SubWidthC and cbHeight / SubHeightC, and the variable cIdx as inputs, and the output is assigned to the (cbWidth / SubWidthC )x(cbHeight / SubHeightC) array predSamplesIntra$_{Cr}$.
  - The weighted sample prediction process for combined merge and intra prediction as specified in clause 8.5.6.7 is invoked with the location ( xTbCmp, yTbCmp ) set equal to ( xCb, yCb ), the coding block width cbWidth / SubWidthC , the coding block height cbHeight / SubHeightC, the sample arrays predSamplesInter and predSamplesIntra set equal to predSamples$_{Cr}$ and predSamplesIntra$_{Cr}$, respectively, the intra prediction mode predModeIntra set equal to IntraPredModeY[ xCb ][ yCb ], the colour component index cIdx, and the weighting value w as inputs, and the output is assigend to the (cbWidth / SubWidthC )x(cbHeight / SubHeightC) array predSamples.

11. When mmvd_merge_flag[ xCb ][ yCb ] is equal to 1, the following applies:

– The derivation process for merge motion vector difference as specified in 8.5.2.7 is invoked with the luma location ( xCb, yCb ), the reference indices refIdxL0, refIdxL1 and the prediction list utilization flags predFlagL0[ 0 ][ 0 ] and predFlagL1[ 0 ][ 0 ] as inputs, and the motion vector differences mMvdL0 and mMvdL1 as outputs.

– The motion vector difference mMvdLX is added to the merge motion vectors mvLX for X being 0 and 1 as follows:

$$mvLX[ 0 ][ 0 ][ 0 ] += mMvdLX[ 0 ] \quad (8\text{-}281)$$
$$mvLX[ 0 ][ 0 ][ 1 ] += mMvdLX[ 1 ] \quad (8\text{-}282)$$
$$mvLX[ 0 ][ 0 ][ 0 ] = \text{Clip3}(-2^{17}, 2^{17} - 1, mvLX[ 0 ][ 0 ][ 0 ]) \quad (8\text{-}283)$$
$$mvLX[ 0 ][ 0 ][ 1 ] = \text{Clip3}(-2^{17}, 2^{17} - 1, mvLX[ 0 ][ 0 ][ 1 ]) \quad (8\text{-}284)$$

(b)

8.5.2.7 Derivation process for merge motion vector difference

Inputs to this process are:
- a luma location ( xCb, yCb ) of the top-left sample of the current luma coding block relative to the top-left luma sample of the current picture,
- reference indices refIdxL0 and refIdxL1,
- prediction list utilization flags predFlagL0 and predFlagL1.

Outputs of this process are the luma merge motion vector differences in 1/16 fractional-sample accuracy mMvdL0 and mMvdL1.

The variable currPic specifies the current picture.

The luma merge motion vector differences mMvdL0 and mMvdL1 are derived as follows:

– If both predFlagL0 and predFlagL1 are equal to 1, the following applies:
$$currPocDiffL0 = \text{DiffPicOrderCnt}( currPic, \text{RefPicList}[ 0 ][ refIdxL0 ] ) \quad (8\text{-}348)$$
$$currPocDiffL1 = \text{DiffPicOrderCnt}( currPic, \text{RefPicList}[ 1 ][ refIdxL1 ] ) \quad (8\text{-}349)$$

– If currPocDiffL0 is equal to currPocDiffL1, the following applies:
$$mMvdL0[ 0 ] = \text{MmvdOffset}[ xCb ][ yCb ][ 0 ] \quad (8\text{-}350)$$
$$mMvdL0[ 1 ] = \text{MmvdOffset}[ xCb ][ yCb ][ 1 ] \quad (8\text{-}351)$$
$$mMvdL1[ 0 ] = \text{MmvdOffset}[ xCb ][ yCb ][ 0 ] \quad (8\text{-}352)$$
$$mMvdL1[ 1 ] = \text{MmvdOffset}[ xCb ][ yCb ][ 1 ] \quad (8\text{-}353)$$

– Otherwise, if Abs( currPocDiffL0 ) is greater than or equal to Abs( currPocDiffL1 ), the following applies:
$$mMvdL0[ 0 ] = \text{MmvdOffset}[ xCb ][ yCb ][ 0 ] \quad (8\text{-}354)$$
$$mMvdL0[ 1 ] = \text{MmvdOffset}[ xCb ][ yCb ][ 1 ] \quad (8\text{-}355)$$

– If RefPicList[ 0 ][ refIdxL0 ] is not a long-term reference picture and RefPicList[ 1 ][ refIdxL1 ] is not a long-term reference picture, the following applies:
$$td = \text{Clip3}(-128, 127, currPocDiffL0) \quad (8\text{-}356)$$
$$tb = \text{Clip3}(-128, 127, currPocDiffL1) \quad (8\text{-}357)$$
$$tx = ( 16384 + ( \text{Abs}( td ) >> 1 ) ) / td \quad (8\text{-}358)$$
$$distScaleFactor = \text{Clip3}(-4096, 4095, ( tb * tx + 32 ) >> 6 ) \quad (8\text{-}359)$$
$$mMvdL1[ 0 ] = \text{Clip3}(-2^{15}, 2^{15} - 1, ( distScaleFactor * mMvdL0[ 0 ] >= 0 ) ? \quad (8\text{-}360)$$
$$128 - ( distScaleFactor * mMvdL0[ 0 ] ) >> 0 ) >> 8 )$$
$$mMvdL1[ 1 ] = \text{Clip3}(-2^{15}, 2^{15} - 1, ( distScaleFactor * mMvdL0[ 1 ] >= 0 ) ? \quad (8\text{-}361)$$
$$128 - ( distScaleFactor * mMvdL0[ 1 ] ) >> 0 ) >> 8 )$$

– Otherwise, the following applies:
$$mMvdL1[ 0 ] = \text{Sign}( currPocDiffL0 ) == \text{Sign}( currPocDiffL1 ) ? \quad (8\text{-}362)$$
$$mMvdL0[ 0 ] : -mMvdL0[ 0 ]$$
$$mMvdL1[ 1 ] = \text{Sign}( currPocDiffL0 ) == \text{Sign}( currPocDiffL1 ) ? \quad (8\text{-}363)$$
$$mMvdL0[ 1 ] : -mMvdL0[ 1 ]$$

– Otherwise (Abs( currPocDiffL0 ) is less than Abs( currPocDiffL1 )), the following applies:
$$mMvdL1[ 0 ] = \text{MmvdOffset}[ xCb ][ yCb ][ 0 ] \quad (8\text{-}364)$$
$$mMvdL1[ 1 ] = \text{MmvdOffset}[ xCb ][ yCb ][ 1 ] \quad (8\text{-}365)$$

– If RefPicList[ 0 ][ refIdxL0 ] is not a long-term reference picture and RefPicList[ 1 ][ refIdxL1 ] is not a long-term reference picture, the following applies:
$$td = \text{Clip3}(-128, 127, currPocDiffL1) \quad (8\text{-}366)$$
$$tb = \text{Clip3}(-128, 127, currPocDiffL0) \quad (8\text{-}367)$$
$$tx = ( 16384 + ( \text{Abs}( td ) >> 1 ) ) / td \quad (8\text{-}368)$$
$$distScaleFactor = \text{Clip3}(-4096, 4095, ( tb * tx + 32 ) >> 6 ) \quad (8\text{-}369)$$
$$mMvdL0[ 0 ] = \text{Clip3}(-2^{15}, 2^{15} - 1, ( distScaleFactor * mMvdL1[ 0 ] >= 0 ) ? \quad (8\text{-}370)$$
$$128 - ( distScaleFactor * mMvdL1[ 0 ] ) >> 0 ) >> 8 )$$
$$mMvdL0[ 1 ] = \text{Clip3}(-2^{15}, 2^{15} - 1, ( distScaleFactor * mMvdL1[ 1 ] >= 0 ) ? \quad (8\text{-}371)$$
$$128 - ( distScaleFactor * mMvdL1[ 1 ] ) >> 0 ) >> 8 )$$

– Otherwise, the following applies:
$$mMvdL0[ 0 ] = \text{Sign}( currPocDiffL0 ) == \text{Sign}( currPocDiffL1 ) ? \quad (8\text{-}372)$$
$$mMvdL1[ 0 ] : -mMvdL1[ 0 ]$$
$$mMvdL0[ 1 ] = \text{Sign}( currPocDiffL0 ) == \text{Sign}( currPocDiffL1 ) ? \quad (8\text{-}373)$$
$$mMvdL1[ 1 ] : -mMvdL1[ 1 ]$$

– Otherwise ( predFlagL0 or predFlagL1 are equal to 1 ), the following applies for X being 0 and 1:
$$mMvdLX[ 0 ] = ( predFlagLX == 1 ) ? \text{MmvdOffset}[ xCb ][ yCb ][ 0 ] : 0 \quad (8\text{-}374)$$
$$mMvdLX[ 1 ] = ( predFlagLX == 1 ) ? \text{MmvdOffset}[ xCb ][ yCb ][ 1 ] : 0 \quad (8\text{-}375)$$

Fig.40

The motion vector difference lMvd[ compIdx ] for compIdx = 0..1 is derived as follows:

lMvd[ compIdx ] = abs_mvd_greater0_flag[ compIdx ] *
 ( abs_mvd_minus2[ compIdx ] + 2 ) * ( 1 − 2 * mvd_sign_flag[ compIdx ] )    (7-161)

The value of lMvd[ compIdx ] shall be in the range of $-2^{17}$ to $2^{17}-1$, inclusive.

Depending in the value of MotionModelIdc[ x0 ][ y0 ], motion vector differences are derived as follows:

– If MotionModelIdc[ x0 ][ y0 ] is equal to 0, the variable MvdLX[ x0 ][ y0 ][ compIdx ], with X being 0 or 1, specifies the difference between a list X vector component to be used and its prediction. The array indices x0, y0 specify the location ( x0, y0 ) of the top-left luma sample of the considered coding block relative to the top-left luma sample of the picture. The horizontal motion vector component difference is assigned compIdx = 0 and the vertical motion vector component is assigned compIdx = 1.

– If refList is equal to 0, MvdL0[ x0 ][ y0 ][ compIdx ] is set equal to lMvd[ compIdx ] for compIdx = 0..1.

– Otherwise (refList is equal to 1), MvdL1[ x0 ][ y0 ][ compIdx ] is set equal to lMvd[ compIdx ] for compIdx = 0..1.

– Otherwise (MotionModelIdc[ x0 ][ y0 ] is not equal to 0), the variable MvdCpLX[ x0 ][ y0 ][ cpIdx ][ compIdx ], with X being 0 or 1, specifies the difference between a list X vector component to be used and its prediction. The array indices x0, y0 specify the location ( x0, y0 ) of the top-left luma sample of the considered coding block relative to the top-left luma sample of the picture, the array index cpIdx specifies the control point index. The horizontal motion vector component difference is assigned compIdx = 0 and the vertical motion vector component is assigned compIdx = 1.

– If refList is equal to 0, MvdCpL0[ x0 ][ y0 ][ cpIdx ][ compIdx ] is set equal to lMvd[ compIdx ] for compIdx = 0..1.

– Otherwise (refList is equal to 1), MvdCpL1[ x0 ][ y0 ][ cpIdx ][ compIdx ] is set equal to lMvd[ compIdx ] for compIdx = 0..1.

When sym_mvd_flag[ x0 ][ y0 ] is equal to 1, the value of MvdL1[ x0 ][ y0 ][ compIdx] shall be in the range of $-2^{17}$ to $2^{17}-1$, inclusive.

– For X being replaced by either 0 or 1 in the variables predFlagLX[ 0 ][ 0 ], mvLX[ 0 ][ 0 ] and refIdxLX, in PRED_LX, and in the syntax elements ref_idx_lX and MvdLX, the following ordered steps apply:

1. The variables refIdxLX and predFlagLX[ 0 ][ 0 ] are derived as follows:

– If inter_pred_idc[ xCb ][ yCb ] is equal to PRED_LX or PRED_BI, refIdxLX = ref_idx_lX[ xCb ][ yCb ]    (8-258)

predFlagLX[ 0 ][ 0 ] = 1    (8-259)

– Otherwise, the variables refIdxLX and predFlagLX[ 0 ][ 0 ] are specified by:

refIdxLX = −1    (8-260)

predFlagLX[ 0 ][ 0 ] = 0    (8-261)

2. The variable mvdLX is derived as follows:

mvdLX[ 0 ] = MvdLX[ xCb ][ yCb ][ 0 ]    (8-262)

mvdLX[ 1 ] = MvdLX[ xCb ][ yCb ][ 1 ]    (8-263)

3. When predFlagLX[ 0 ][ 0 ] is equal to 1, the derivation process for luma motion vector prediction in clause 8.5.2.8 is invoked with the luma coding block location ( xCb, yCb ), the coding block width cbWidth, the coding block height cbHeight and the variable refIdxLX as inputs, and the output being mvpLX.

4. When predFlagLX[ 0 ][ 0 ] is equal to 1, the luma motion vector mvLX[ 0 ][ 0 ] is derived as follows:

uLX[ 0 ] = ( mvpLX[ 0 ] + mvdLX[ 0 ] + $2^{18}$ ) % $2^{18}$    (8-264)

mvLX[ 0 ][ 0 ][ 0 ] = ( uLX[ 0 ] >= $2^{17}$ ) ? ( uLX[ 0 ] − $2^{18}$ ) : uLX[ 0 ]    (8-265)

uLX[ 1 ] = ( mvpLX[ 1 ] + mvdLX[ 1 ] + $2^{18}$ ) % $2^{18}$    (8-266)

mvLX[ 0 ][ 0 ][ 1 ] = ( uLX[ 1 ] >= $2^{17}$ ) ? ( uLX[ 1 ] − $2^{18}$ ) : uLX[ 1 ]    (8-267)

NOTE 1 – The resulting values of mvLX[ 0 ][ 0 ] and mvLX[ 0 ][ 1 ] as specified above will always be in the range of $-2^{17}$ to $2^{17}-1$, inclusive.

Fig.41

(a) — When availableFlagLXCol is equal to TRUE, mvLXCol and availableFlagLXCol are derived as follows:

- If LongTermRefPic( currPic, currCb, refIdxLX, LX ) is not equal to LongTermRefPic( ColPic, colCb, refIdxCol, listCol ), both components of mvLXCol are set equal to 0 and availableFlagLXCol is set equal to 0.

- Otherwise, the variable availableFlagLXCol is set equal to 1, refPicList[ listCol ][ refIdxCol ] is set to be the picture with reference index refIdxCol in the reference picture list listCol of the slice containing coding block colCb in the collocated picture specified by ColPic, and the following applies:

$$\text{colPocDiff} = \text{DiffPicOrderCnt}(\text{ColPic}, \text{refPicList}[\text{listCol}][\text{refIdxCol}]) \quad (8\text{-}393)$$

$$\text{currPocDiff} = \text{DiffPicOrderCnt}(\text{currPic}, \text{RefPicList}[X][\text{refIdxLX}]) \quad (8\text{-}394)$$

- The temporal motion buffer compression process for collocated motion vectors as specified in clause 8.5.2.15 is invoked with mvCol as input, and the modified mvCol as output.

- If RefPicList[ X ][ refIdxLX ] is a long-term reference picture, or colPocDiff is equal to currPocDiff, mvLXCol is derived as follows:

$$\text{mvLXCol} = \text{mvCol} \quad (8\text{-}395)$$

- Otherwise, mvLXCol is derived as a scaled version of the motion vector mvCol as follows:

$$tx = (16384 + (\text{Abs}(td) >> 1)) / td \quad (8\text{-}396)$$

$$\text{distScaleFactor} = \text{Clip3}(-4096, 4095, (tb * tx + 32) >> 6) \quad (8\text{-}397)$$

$$\text{mvLXCol} = \text{Clip3}(-131072, 131071, (\text{distScaleFactor} * \text{mvCol} + 128 - (\text{distScaleFactor} * \text{mvCol} >= 0)) >> 8)) \quad (8\text{-}398)$$

where td and tb are derived as follows:

$$td = \text{Clip3}(-128, 127, \text{colPocDiff}) \quad (8\text{-}399)$$

$$tb = \text{Clip3}(-128, 127, \text{currPocDiff}) \quad (8\text{-}400)$$

(b) — The motion vectors cpMvLX[ cpIdx ] with cpIdx = 0 .. numCpMv − 1 are clipped as follows:

$$\text{cpMvLX}[\text{cpIdx}][0] = \text{Clip3}(-2^{17}, 2^{17} - 1, \text{cpMvLX}[\text{cpIdx}][0]) \quad (8\text{-}551)$$

$$\text{cpMvLX}[\text{cpIdx}][1] = \text{Clip3}(-2^{17}, 2^{17} - 1, \text{cpMvLX}[\text{cpIdx}][1]) \quad (8\text{-}552)$$

(c) — The motion vectors mvLX[ xSbIdx ][ ySbIdx ] are clipped as follows:

$$\text{mvLX}[\text{xSbIdx}][\text{ySbIdx}][0] = \text{Clip3}(-2^{17}, 2^{17} - 1, \text{mvLX}[\text{xSbIdx}][\text{ySbIdx}][0]) \quad (8\text{-}689)$$

$$\text{mvLX}[\text{xSbIdx}][\text{ySbIdx}][1] = \text{Clip3}(-2^{17}, 2^{17} - 1, \text{mvLX}[\text{xSbIdx}][\text{ySbIdx}][1]) \quad (8\text{-}690)$$

MVD2 range
MVD1 range
MV range

Fig.43

8.5.2.7 Derivation process for merge motion vector difference

Inputs to this process are:
- a luma location ( xCb, yCb ) of the top-left sample of the current luma coding block relative to the top-left luma sample of the current picture.
- reference indices refIdxL0 and refIdxL1.
- prediction list utilization flags predFlagL0 and predFlagL1.

Outputs of this process are the luma merge motion vector differences in 1/16 fractional-sample accuracy mMvdL0 and mMvdL1.
The variable currPic specifies the current picture.
The luma merge motion vector differences mMvdL0 and mMvdL1 are derived as follows:

- If both predFlagL0 and predFlagL1 are equal to 1, the following applies:

currPocDiffL0 = DiffPicOrderCnt( currPic, RefPicList[ 0 ][ refIdxL0 ] )  (8-348)
    currPocDiffL1 = DiffPicOrderCnt( currPic, RefPicList[ 1 ][ refIdxL1 ] )  (8-349)

- If currPocDiffL0 is equal to currPocDiffL1, the following applies:

mMvdL0[ 0 ] = MmvdOffset[ xCb ][ yCb ][ 0 ]  (8-350)
        mMvdL0[ 1 ] = MmvdOffset[ xCb ][ yCb ][ 1 ]  (8-351)
        mMvdL1[ 0 ] = MmvdOffset[ xCb ][ yCb ][ 0 ]  (8-352)
        mMvdL1[ 1 ] = MmvdOffset[ xCb ][ yCb ][ 1 ]  (8-353)

- Otherwise, if Abs( currPocDiffL0 ) is greater than or equal to Abs( currPocDiffL1 ), the following applies:

mMvdL0[ 0 ] = MmvdOffset[ xCb ][ yCb ][ 0 ]  (8-354)
        mMvdL0[ 1 ] = MmvdOffset[ xCb ][ yCb ][ 1 ]  (8-355)

- If RefPicList[ 0 ][ refIdxL0 ] is not a long-term reference picture and RefPicList[ 1 ][ refIdxL1 ] is not a long-term reference picture, the following applies:

td = Clip3( −128, 127, currPocDiffL0 )  (8-356)
            tb = Clip3( −128, 127, currPocDiffL1 )  (8-357)
            tx = ( 16384 + ( Abs( td ) >> 1 ) ) / td  (8-358)
            distScaleFactor = Clip3( −4096, 4095, ( tb * tx + 32 ) >> 6 )  (8-359)
            mMvdL1[ 0 ] = Clip3( $-2^{17}$, $2^{17}-1$, (distScaleFactor * mMvdL0[ 0 ] +  (8-360)
                128 − ( distScaleFactor * mMvdL0[ 0 ] >= 0 )) >> 8 )
            mMvdL1[ 1 ] = Clip3( $-2^{17}$, $2^{17}-1$, (distScaleFactor * mMvdL0[ 1 ] +  (8-361)
                128 − ( distScaleFactor * mMvdL0[ 1 ] >= 0 )) >> 8 )

- Otherwise, the following applies:

mMvdL1[ 0 ] = Sign( currPocDiffL0 ) == Sign( currPocDiffL1 ) ?
                mMvdL0[ 0 ] : −mMvdL0[ 0 ]  (8-362)
            mMvdL1[ 1 ] = Sign( currPocDiffL0 ) == Sign( currPocDiffL1) ?
                mMvdL0[ 1 ] : −mMvdL0[ 1 ]  (8-363)

- Otherwise (Abs( currPocDiffL0 ) is less than Abs( currPocDiffL1 )), the following applies:

mMvdL1[ 0 ] = MmvdOffset[ xCb ][ yCb ][ 0 ]  (8-364)
        mMvdL1[ 1 ] = MmvdOffset[ xCb ][ yCb ][ 1 ]  (8-365)

- If RefPicList[ 0 ][ refIdxL0 ] is not a long-term reference picture and RefPicList[ 1 ][ refIdxL1 ] is not a long-term reference picture, the following applies:

td = Clip3( −128, 127, currPocDiffL1 )  (8-366)
            tb = Clip3( −128, 127, currPocDiffL0 )  (8-367)
            tx = ( 16384 + ( Abs( td ) >> 1 ) ) / td  (8-368)
            distScaleFactor = Clip3( −4096, 4095, ( tb * tx + 32 ) >> 6 )  (8-369)
            mMvdL0[ 0 ] = Clip3( $-2^{17}$, $2^{17}-1$, (distScaleFactor * mMvdL1[ 0 ] +  (8-370)
                128 − (distScaleFactor * mMvdL1[ 0 ] >= 0)) >> 8 )
            mMvdL0[ 1 ] = Clip3( $-2^{17}$, $2^{17}-1$, , (distScaleFactor * mMvdL1[ 1 ] +  (8-371)
                128 − (distScaleFactor * mMvdL1[ 1 ] >= 0)) >> 8 ))

- Otherwise, the following applies:

mMvdL0[ 0 ] = Sign( currPocDiffL0 ) == Sign( currPocDiffL1 ) ?
                mMvdL1[ 0 ] : −mMvdL1[ 0 ]  (8-372)
            mMvdL0[ 1 ] = Sign( currPocDiffL0 ) == Sign( currPocDiffL1) ?
                mMvdL1[ 1 ] : −mMvdL1[ 1 ]  (8-373)

- Otherwise ( predFlagL0 or predFlagL1 are equal to 1 ), the following applies for X being 0 and 1:

mMvdLX[ 0 ] = ( predFlagLX == 1 ) ? MmvdOffset[ xCb ][ yCb ][ 0 ] : 0  (8-374)
    mMvdLX[ 1 ] = ( predFlagLX == 1 ) ? MmvdOffset[ xCb ][ yCb ][ 1 ] : 0  (8-375)

VIDEO SIGNAL PROCESSING METHOD AND DEVICE

CROSS-REFERENCE TO RELATED APPLICATIONS

This application is a National Stage Application of International Application No. PCT/KR2020/009783 filed on Jul. 24, 2020, which claims priority to Korean Patent Application No. 10-2019-0090519 filed on Jul. 25, 2019 in Korean Intellectual Property Office, Korean Patent Application No. 10-2019-0111060 filed on Sep. 6, 2019 in Korean Intellectual Property Office, and Korean Patent Application No. 10-2019-0124933 filed on Oct. 9, 2019 in Korean Intellectual Property Office, the entire contents of which are hereby incorporated by reference in their entireties.

TECHNICAL FIELD

The present disclosure relates to a video signal processing method and device and, more specifically, to a video signal processing method and device for encoding or decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF INVENTION

Technical Problem

An objective of the present disclosure is to improve the coding efficiency of a video signal.

Solution to Problem

A method for decoding a video signal according to an embodiment of the present disclosure includes: parsing, from a bitstream, higher-level merge with MVD (MMVD) enabling information (sps_mmvd_enabled_flag) indicating availability of MMVD of a higher level including a current block; if the higher-level MMVD enabling information indicates enabling of MMVD, parsing, from the bitstream, MMVD merge information (mmvd_merge_flag) indicating whether MMVD is used in the current block; if the MMVD merge information indicates that MMVD is used in the current block, parsing MMVD distance-related information (mmvd_distance_idx) and MMVD direction-related information (mmvd_direction_idx); and obtaining MMVD information (mMvdLX) based on the MMVD distance-related information and the MMVD direction-related information, wherein the MMVD information has a value that is greater than or equal to $-2^{17}$ and is smaller than or equal to $2^{17}-1$.

The higher level in the method for decoding the video signal according to an embodiment of the present disclosure is one of a coding tree unit, a slice, a tile, a tile group, a picture, and a sequence unit.

The method for decoding the video signal according to an embodiment of the present disclosure further includes: generating a merge candidate list of the current block; selecting a motion vector from the merge candidate list based on a merge index parsed from the bitstream; if the MMVD merge information indicates that MMVD is used in the current block, obtaining a modified motion vector by adding the MMVD information to the motion vector; and reconstructing the current block based on the modified motion vector, wherein the modified motion vector has a value that is greater than or equal to $-2^{17}$ and is smaller than or equal to $2^{17}-1$.

The obtaining the MMVD information (mMvdLX) in the method for decoding the video signal according to an embodiment of the present disclosure includes: obtaining an MMVD offset based on the MMVD distance-related information and the MMVD direction-related information; if a first reference list and a second reference list are used, obtaining, as a first picture order count (POC) difference, a difference between a POC of a current picture including the current block and a POC of a first reference picture based on the first reference list, and obtaining, as a second picture order count (POC) difference, a difference between the POC of the current picture and a POC of a second reference picture based on the second reference list; and based on at least one of the MMVD offset, the first POC difference, and the second POC difference, obtaining first MMVD information related to the first reference list and second MMVD information related to the second reference list, wherein the MMVD information includes the first MMVD information and the second MMVD information.

The method for decoding the video signal according to an embodiment of the present disclosure includes, if the first POC difference and the second POC difference are the same, obtaining the MMVD offset as the first MMVD information, and obtaining the MMVD offset as the second MMVD information.

The method for decoding the video signal according to an embodiment of the present disclosure includes: if an absolute value of the first POC difference is greater than or equal to an absolute value of the second POC difference, obtaining the MMVD offset as the first MMVD information; if the first reference picture is not a long-term reference picture, and the second reference picture is not a long-term reference picture, obtaining the second MMVD information by scaling the first MMVD information; and if the first reference picture is a long-term reference picture, or the second reference picture is a long-term reference picture, obtaining the second MMVD information without scaling an absolute value of the first MMVD information.

The method for decoding the video signal according to an embodiment of the present disclosure includes: if an absolute value of the first POC difference is smaller than an absolute value of the second POC difference, obtaining the MMVD offset as the second MMVD information; if the first reference picture is not a long-term reference picture, and the second reference picture is not a long-term reference picture, obtaining the first MMVD information by scaling the second MMVD information; and if the first reference picture is a long-term reference picture, or the second reference picture is a long-term reference picture, obtaining the first MMVD information without scaling an absolute value of the second MMVD information.

The obtaining the MMVD information (mMvdLX) in the method for decoding the video signal according to an embodiment of the present disclosure includes: obtaining an MMVD offset based on the MMVD distance-related information and the MMVD direction-related information; if only a first reference list is used, obtaining the MMVD offset as first MMVD information related to the first reference list without scaling the MMVD offset; and if only a second reference list is used, obtaining the MMVD offset as second MMVD information related to the second reference list without scaling the MMVD offset.

A method for decoding a video signal according to an embodiment of the present disclosure includes: obtaining chroma component format information from a higher-level bitstream; obtaining width-related information (SubWidthC) and height-related information (SubHeightC) based on the chroma component format information; obtaining x-axis scale information based on the width-related information or information on a color component of a current block; obtaining y-axis scale information based on the height-related information or information on the color component of the current block; determining a location of a left block based on the y-axis scale information; determining a location of an upper block based on the x-axis scale information; determining a weighting value based on the left block and the upper block; obtaining first samples by predicting the current block in a merge mode; obtaining second samples by predicting the current block in an intra mode; and obtaining a combination prediction sample for the current block based on the weighting value, the first samples, and the second samples.

The determining of the weighting value in the method for decoding the video signal according to an embodiment of the present disclosure includes: if the left block is available, and a prediction mode of the left block is intra prediction, setting code information (isIntraCodedNeighbourA) of the left block to TRUE; if the left block is not available, or the prediction mode of the left block is not intra prediction, setting the code information of the left block to FALSE; if the upper block is available, and a prediction mode of the upper block is intra prediction, setting code information (isIntraCodedNeighbourB) of the upper block to TRUE; and if the upper block is not available, or the prediction mode of the upper block is not intra prediction, setting the code information of the upper block to FALSE.

The determining the weighting value in the method for decoding the video signal according to an embodiment of the present disclosure includes: if both the code information of the left block and the code information of the upper block are TRUE, determining the weighting value to be 3; if both the code information of the left block and the code information of the upper block are FALSE, determining the weighting value to be 1; and if only one of the code information of the left block and the code information of the upper block is TRUE, determining the weighting value to be 2.

The obtaining the combination prediction sample in the method for decoding the video signal according to an embodiment of the present disclosure includes predicting the current block based on predSamplesComb[x][y]=(w*predSamplesIntra[x][y]+(4−w)*predSamplesInter[x][y]+2)>>2, where predSamplesComb refers to the combination prediction sample, w refers to the weighting value, predSamplesIntra refers to the second samples, predSamplesInter refers to the first samples, [x] refers to an x-axis coordinate of a sample included in the current block, and [y] refers to a y-axis coordinate of the sample included in the current block.

In the method for decoding the video signal according to an embodiment of the present disclosure, the obtaining the x-axis scale information includes: if the color component of the current block is 0, or the width-related information is 1, determining the x-axis scale information to be 0; and if the color component of the current block is not 0, and the width-related information is not 1, determining the x-axis scale information to be 1, and the obtaining the y-axis scale information includes: if the color component of the current block is 0, or the height-related information is 1, determining the y-axis scale information to be 0; and if the color component of the current block is not 0, and the height-related information is not 1, determining the y-axis scale information to be 1.

In the method for decoding the video signal according to an embodiment of the present disclosure, the location of the left block is (xCb−1, yCb−1+(cbHeight<<scallFactHeight)), where xCb is an x-axis coordinate of a top-left sample of a current luma block, yCb is a y-axis coordinate of the top-left sample of the current luma block, cbHeight is a value of a height of the current block, and scallFactHeight is the y-axis scale information, and the location of the upper block is (xCb−1+(cbWidth<<scallFactWidth), yCb−1), where xCb is the x-axis coordinate of the top-left sample of the current luma block, yCb is the y-axis coordinate of the top-left sample of the current luma block, cbWidth is a value of a width of the current block, and scallFactWidth is the x-axis scale information.

A device for decoding a video signal according to an embodiment of the present disclosure includes a processor and a memory, wherein, based on instructions stored in the memory, the processor is configured to: parse, from a bitstream, higher-level merge with MVD (MMVD) enabling information (sps_mmvd_enabled_flag) indicating availability of MMVD of a higher level including a current block; if the higher-level MMVD enabling information indicates enabling of MMVD, parse, from the bitstream, MMVD merge information (mmvd_merge_flag) indicating whether MMVD is used in the current block; if the MMVD merge information indicates that MMVD is used in the current block, parse MMVD distance-related information (mmvd_distance_idx) and MMVD direction-related information (mmvd_direction_idx); and obtain MMVD information (mMvdLX) based on the MMVD distance-related information and the MMVD direction-related information, wherein the MMVD information has a value that is greater than or equal to $-2^{17}$ and is smaller than or equal to $2^{17}-1$.

The higher level in the device for decoding the video signal according to an embodiment of the present disclosure is one of a coding tree unit, a slice, a tile, a tile group, a picture, and a sequence unit.

In the device for decoding the video signal according to an embodiment of the present disclosure, the processor is configured to, based on the instructions stored in the memory: generate a merge candidate list of the current block; selects a motion vector from the merge candidate list based on a merge index parsed from the bitstream; if the MMVD merge information indicates that MMVD is used in the current block, obtain a modified motion vector by adding the MMVD information to the motion vector; and reconstruct the current block based on the modified motion vector, wherein the modified motion vector has a value that is greater than or equal to $-2^{17}$ and is smaller than or equal to $2^{17}-1$.

In the device for decoding the video signal according to an embodiment of the present disclosure, the processor is configured to, based on the instructions stored in the memory: obtain an MMVD offset based on the MMVD distance-related information and the MMVD direction-related information; if a first reference list and a second reference list are used, obtain, as a first picture order count (POC) difference, a difference between a POC of a current picture including the current block and a POC of a first reference picture based on the first reference list, and obtain, as a second picture order count (POC) difference, a difference between the POC of the current picture and a POC of a second reference picture based on the second reference list; and based on at least one of the MMVD offset, the first POC difference, and the second POC difference, obtain first MMVD information related to the first reference list and second MMVD information related to the second reference list, wherein the MMVD information includes the first MMVD information and the second MMVD information.

In the device for decoding the video signal according to an embodiment of the present disclosure, the processor is configured to, based on the instructions stored in the memory, obtain the MMVD offset as the first MMVD information and obtains the MMVD offset as the second MMVD information if the first POC difference and the second POC difference are the same.

In the device for decoding the video signal according to an embodiment of the present disclosure, the processor is configured to, based on the instructions stored in the memory: if an absolute value of the first POC difference is greater than or equal to an absolute value of the second POC difference, obtain the MMVD offset as the first MMVD information; if the first reference picture is not a long-term reference picture, and the second reference picture is not a long-term reference picture, obtain the second MMVD information by scaling the first MMVD information; and if the first reference picture is a long-term reference picture, or the second reference picture is a long-term reference picture, obtain the second MMVD information without scaling an absolute value of the first MMVD information.

In the device for decoding the video signal according to an embodiment of the present disclosure, the processor is configured to, based on the instructions stored in the memory: if an absolute value of the first POC difference is smaller than an absolute value of the second POC difference, obtain the MMVD offset as the second MMVD information; if the first reference picture is not a long-term reference picture, and the second reference picture is not a long-term reference picture, obtain the first MMVD information by scaling the second MMVD information; and if the first reference picture is a long-term reference picture, or the second reference picture is a long-term reference picture, obtain the first MMVD information without scaling an absolute value of the second MMVD information.

In the device for decoding the video signal according to an embodiment of the present disclosure, the processor is configured to, based on the instructions stored in the memory: obtain an MMVD offset based on the MMVD distance-related information and the MMVD direction-related information; if only a first reference list is used, obtain the MMVD offset as first MMVD information related to the first reference list without scaling the MMVD offset; and if only a second reference list is used, obtain the MMVD offset as second MMVD information related to the second reference list without scaling the MMVD offset.

A device for decoding a video signal according to an embodiment of the present disclosure includes a processor and a memory, wherein, based on instructions stored in the memory, the processor is configured to: obtain chroma component format information from a higher-level bitstream; obtain width-related information (SubWidthC) and height-related information (SubHeightC) based on the chroma component format information; obtain x-axis scale information based on the width-related information or information on a color component of a current block; obtains y-axis scale information based on the height-related information or information on the color component of the current block; determine a location of a left block based on the y-axis scale information; determine a location of an upper block based on the x-axis scale information; determine a weighting value based on the left block and the upper block; obtain first samples by predicting the current block in a merge mode; obtain second samples by predicting the current block in an intra mode; and obtain a combination prediction sample for the current block based on the weighting value, the first samples, and the second samples.

In the device for decoding the video signal according to an embodiment of the present disclosure, the processor is configured to, based on the instructions stored in the memory: if the left block is available, and a prediction mode of the left block is intra prediction, set code information (isIntraCodedNeighbourA) of the left block to TRUE; if the left block is not available, or the prediction mode of the left block is not intra prediction, set the code information of the left block to FALSE; if the upper block is available, and a prediction mode of the upper block is intra prediction, set code information (isIntraCodedNeighbourB) of the upper block to TRUE; and if the upper block is not available, or the prediction mode of the upper block is not intra prediction, set the code information of the upper block to FALSE.

In the device for decoding the video signal according to an embodiment of the present disclosure, the processor is configured to, based on the instructions stored in the memory: if both the code information of the left block and the code information of the upper block are TRUE, determine the weighting value to be 3; if both the code information of the left block and the code information of the upper block are FALSE, determine the weighting value to be 1; and if only one of the code information of the left block and the code information of the upper block is TRUE, determine the weighting value to be 2.

In the device for decoding the video signal according to an embodiment of the present disclosure, based on the instructions stored in the memory, the processor is configured to predict the current block based on predSamplesComb[x][y]=(w*predSamplesIntra[x][y]+(4−w)*predSamplesInter[x][y]+2)>>2, where predSamplesComb refers to the combination prediction sample, w refers to the weighting value, predSamplesIntra refers to the second samples, predSamplesInter refers to the first samples, [x] refers to an x-axis coordinate of a sample included in the current block, and [y] refers to a y-axis coordinate of the sample included in the current block.

In the device for decoding the video signal according to an embodiment of the present disclosure, the processor is configured to, based on the instructions stored in the memory: if the color component of the current block is 0, or the width-related information is 1, determine the x-axis scale information to be 0; if the color component of the current block is not 0, and the width-related information is not 1, determine the x-axis scale information to be 1; if the color component of the current block is 0, or the height-related information is 1, determine the y-axis scale information to be 0; and if the color component of the current block is not 0, and the height-related information is not 1, determine the y-axis scale information to be 1.

In the device for decoding the video signal according to an embodiment of the present disclosure, the location of the left block is (xCb−1, yCb−1+(cbHeight<<scallFactHeight)), where xCb is an x-axis coordinate of a top-left sample of a current luma block, yCb is a y-axis coordinate of the top-left sample of the current luma block, cbHeight is a value of a height of the current block, and scallFactHeight is the y-axis scale information, and the location of the upper block is (xCb−1+(cbWidth<<scallFactWidth), yCb−1), where xCb is the x-axis coordinate of the top-left sample of the current luma block, yCb is the y-axis coordinate of the top-left sample of the current luma block, cbWidth is a value of a width of the current block, and scallFactWidth is the x-axis scale information.

A method for encoding a video signal according to an embodiment of the present disclosure includes: generating merge with MVD (MMVD) information (mMvdLX) of a current block; generating MMVD distance-related information and MMVD direction-related information based on the MMVD information (mMvdLX); generating MMVD merge information (mmvd_merge_flag) indicating whether MMVD is used in the current block; generating higher-level MMVD enabling information (sps_mmvd_enabled_flag) indicating availability of MMVD of a higher level including the current block; and generating a bitstream based on the MMVD distance-related information, the MMVD direction-related information, the MMVD merge information (mmvd_merge_flag), and the higher-level MMVD enabling information (sps_mmvd_enabled_flag), wherein the MMVD information has a value that is greater than or equal to $-2^{17}$ and is smaller than or equal to $2^{17}-1$.

A device for encoding a video signal according to an embodiment of the present disclosure includes a processor and a memory, wherein, based on instructions stored in the memory, the processor is configured to: generate merge with MVD (MMVD) information (mMvdLX) of a current block; generate MMVD distance-related information and MMVD direction-related information based on the MMVD information (mMvdLX); generate MMVD merge information (mmvd_merge_flag) indicating whether MMVD is used in the current block; generate higher-level MMVD enabling information (sps_mmvd_enabled_flag) indicating availability of MMVD of a higher level including the current block; and generate a bitstream based on the MMVD distance-related information, the MMVD direction-related information, the MMVD merge information (mmvd_merge_flag), and the higher-level MMVD enabling information (sps_mmvd_enabled_flag), wherein the MMVD information has a value that is greater than or equal to $-2^{17}$ and is smaller than or equal to $2^{17}-1$.

A method for encoding a video signal according to an embodiment of the present disclosure includes: generating higher-level chroma component format information; obtaining width-related information (SubWidthC) and height-related information (SubHeightC) based on the chroma component format information; obtaining x-axis scale information based on the width-related information or information on a color component of a current block; obtaining y-axis scale information based on the height-related information or information on the color component of the current block; determining a location of a left block based on the y-axis scale information; determining a location of an upper block based on the x-axis scale information; determining a weighting value based on the left block and the upper block; obtaining first samples by predicting the current block in a merge mode; obtaining second samples by predicting the current block in an intra mode; and obtaining a combination prediction sample for the current block based on the weighting value, the first samples, and the second samples.

A device for encoding a video signal according to an embodiment of the present disclosure includes a processor and a memory, wherein, based on instructions stored in the memory, the processor is configured to: generate higher-level chroma component format information; obtain width-related information (SubWidthC) and height-related information (SubHeightC) based on the chroma component format information; obtain x-axis scale information based on the width-related information or information on a color component of a current block; obtain y-axis scale information based on the height-related information or information on the color component of the current block; determine a location of a left block based on the y-axis scale information; determine a location of an upper block based on the x-axis scale information; determine a weighting value based on the left block and the upper block; obtain first samples by predicting the current block in a merge mode; obtain second samples by predicting the current block in an intra mode; and obtain a combination prediction sample for the current block based on the weight, the first samples, and the second samples.

Advantageous Effects of Invention

According to an embodiment of the present invention, coding efficiency of a video signal can be improved.

BRIEF DESCRIPTION OF DRAWINGS

FIGS. 5 and 6 illustrate an intra-prediction method in more detail according to an embodiment of the present disclosure.

FIG. 7 illustrates an inter prediction method according to an embodiment of the present disclosure.

FIG. 11 is a diagram illustrating inter prediction-related syntax according to an embodiment of the present disclosure;

FIG. 12 is a diagram illustrating multi-hypothesis prediction according to an embodiment of the present disclosure;

FIG. 13 is a diagram illustrating multi-hypothesis prediction-related syntax according to an embodiment of the present disclosure;

FIG. 14 is a diagram illustrating multi-hypothesis prediction-related syntax according to an embodiment of the present disclosure;

FIG. 27 is a diagram illustrating a relationship between color components according to an embodiment of the present disclosure;

FIG. 30 is a diagram illustrating a weighted sample prediction process according to an embodiment of the present disclosure;

FIG. 32 is a diagram illustrating a weighted sample prediction process according to an embodiment of the present disclosure;

FIG. 33 is a diagram illustrating a weighted sample prediction process according to an embodiment of the present disclosure;

FIG. 34 is a diagram illustrating a weighted sample prediction process according to an embodiment of the present disclosure;

FIG. 36 is a diagram illustrating a CIIP procedure according to an embodiment of the present disclosure;

FIG. 39 is a diagram illustrating MVD derivation of MMVD according to an embodiment of the present disclosure;

FIG. 40 is a diagram illustrating MVD and MV derivation according to an embodiment of the present disclosure;

FIG. 41 is a diagram illustrating MV and CPMV derivation according to an embodiment of the present disclosure;

FIG. 43 is a diagram illustrating MVD derivation of MMVD according to an embodiment of the present disclosure.

BEST MODE FOR CARRYING OUT THE INVENTION

Terms used in this specification may be currently widely used general terms in consideration of functions in the present disclosure but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present disclosure is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
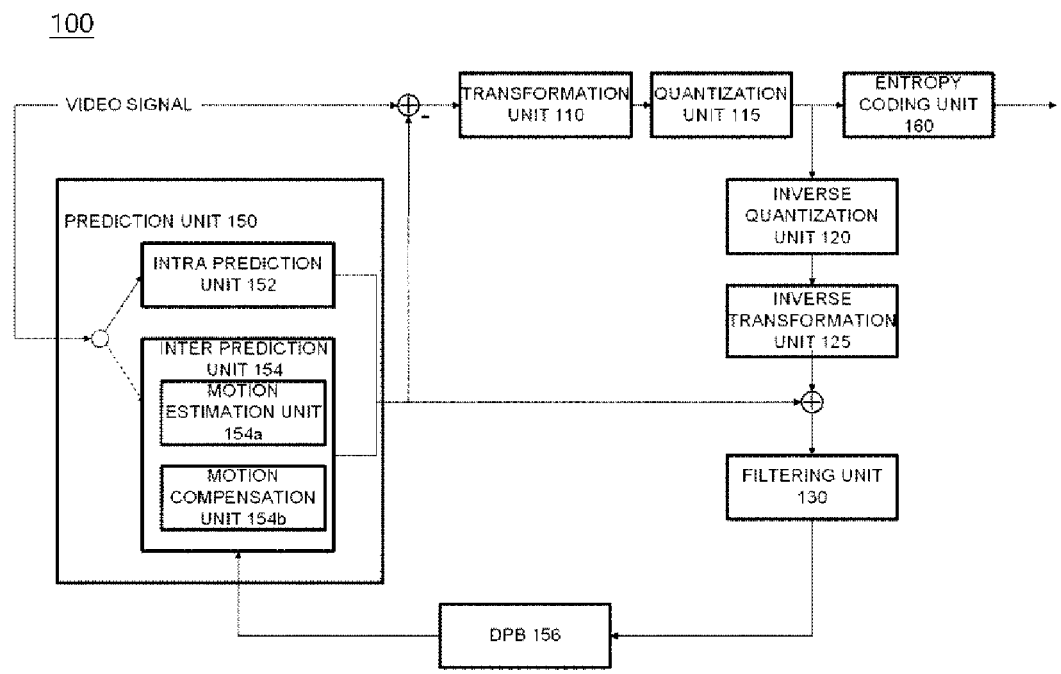
FIG. 1 is a schematic block diagram of a video signal encoding apparatus according to an embodiment of the present invention.

FIG. 1 is a schematic block diagram of a video signal encoding apparatus according to an embodiment of the present disclosure. Referring to FIG. 1, the encoding apparatus of the present disclosure includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154*a* and the motion compensation unit 154*b*. The motion estimation unit 154*a* obtains a motion vector value of the current region by referring to a specific region of the reconstructed reference picture. The motion estimation unit 154*a* transfers a motion information set (reference picture index, motion vector information, etc.) for the reference region to the entropy coding unit 160. The motion compensation unit 154*b* performs motion compensation by using the motion vector value transferred from the motion estimation unit 154*a*. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

[1] The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present disclosure, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
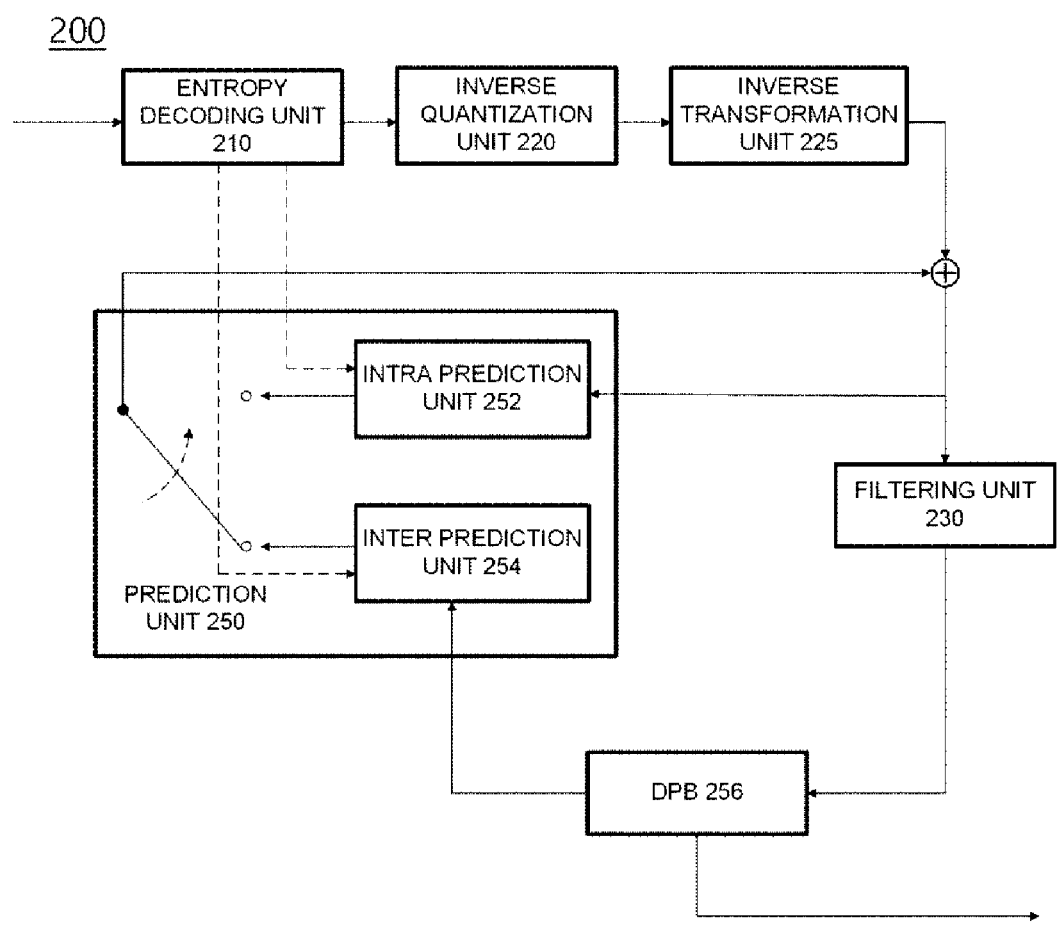
FIG. 2 is a schematic block diagram of a video signal decoding apparatus according to an embodiment of the present invention.

FIG. 2 is a schematic block diagram of a video signal decoding apparatus 200 according to an embodiment of the present disclosure. Referring to FIG. 2, the decoding apparatus 200 of the present disclosure includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 restores a residual value by using the inverse-quantized transform coefficient. The video signal processing device 200 restores an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs only intra prediction or (intra prediction and intra-BC prediction), is called an intra picture or an I picture (or, tile/slice), and a picture (or, tile/slice) that can perform all of intra prediction, and inter prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or top side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. In addition, two reference regions in the bi-prediction scheme may be in two reference picture lists.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may perform intra BC prediction from reconstructed samples in the current picture to deliver intra BC encoding information for the current region to the entropy coding unit 160. The intra BC prediction unit obtains a block vector value of the current region indicating the specific region in the current picture. The intra BC prediction unit may perform intra BC prediction by using the obtained block vector value. The intra BC prediction unit deliver the intra BC encoding information to the entrophy coding unit 160. The intra BC encoding information may include block vector information.

According to an additional embodiment, the prediction unit 250 may include an intra BC prediction unit (not shown). The intra BC prediction unit performs intra BC prediction from reconstructed samples in a current picture, and transfers intra BC encoding information to the entropy coding unit 160. The intra BC prediction unit obtains a block vector value of a current area indicating a specific area in the current picture. The intra BC prediction unit may perform intra BC prediction by using the obtained block vector value. The intra BC prediction unit transfers the intra BC encoding information to the entropy coding unit 160. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present disclosure, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
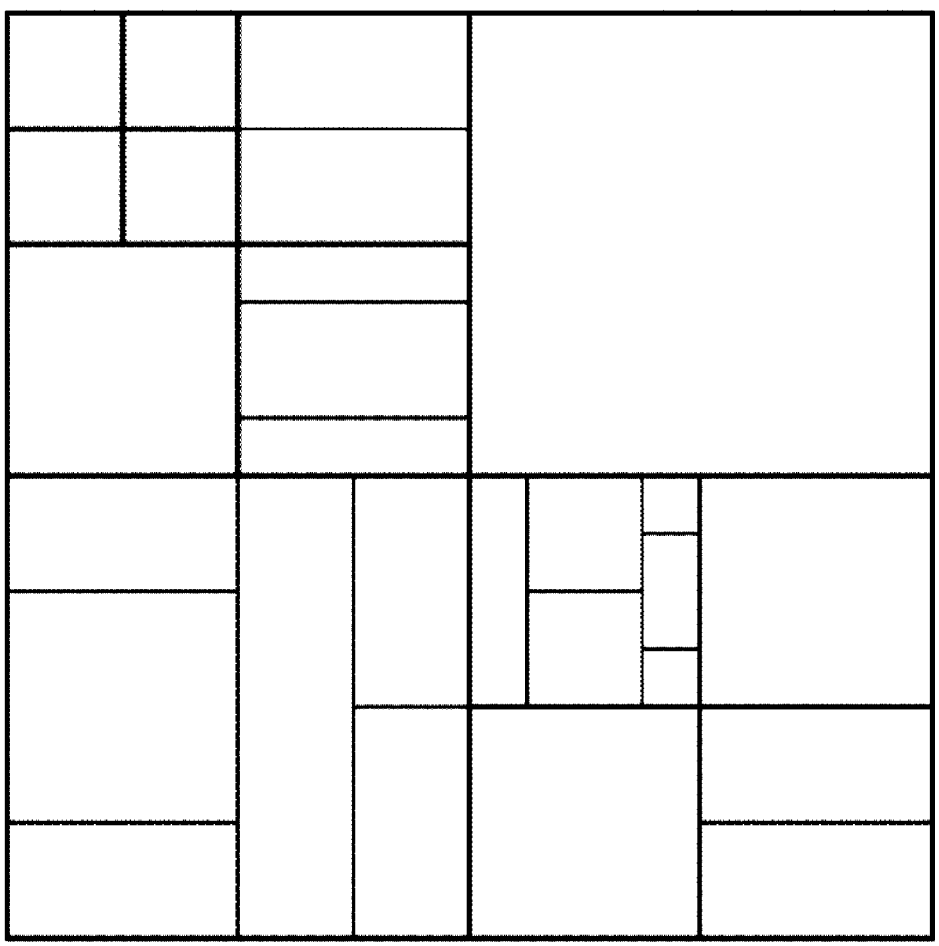
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present disclosure is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present disclosure, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present disclosure, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
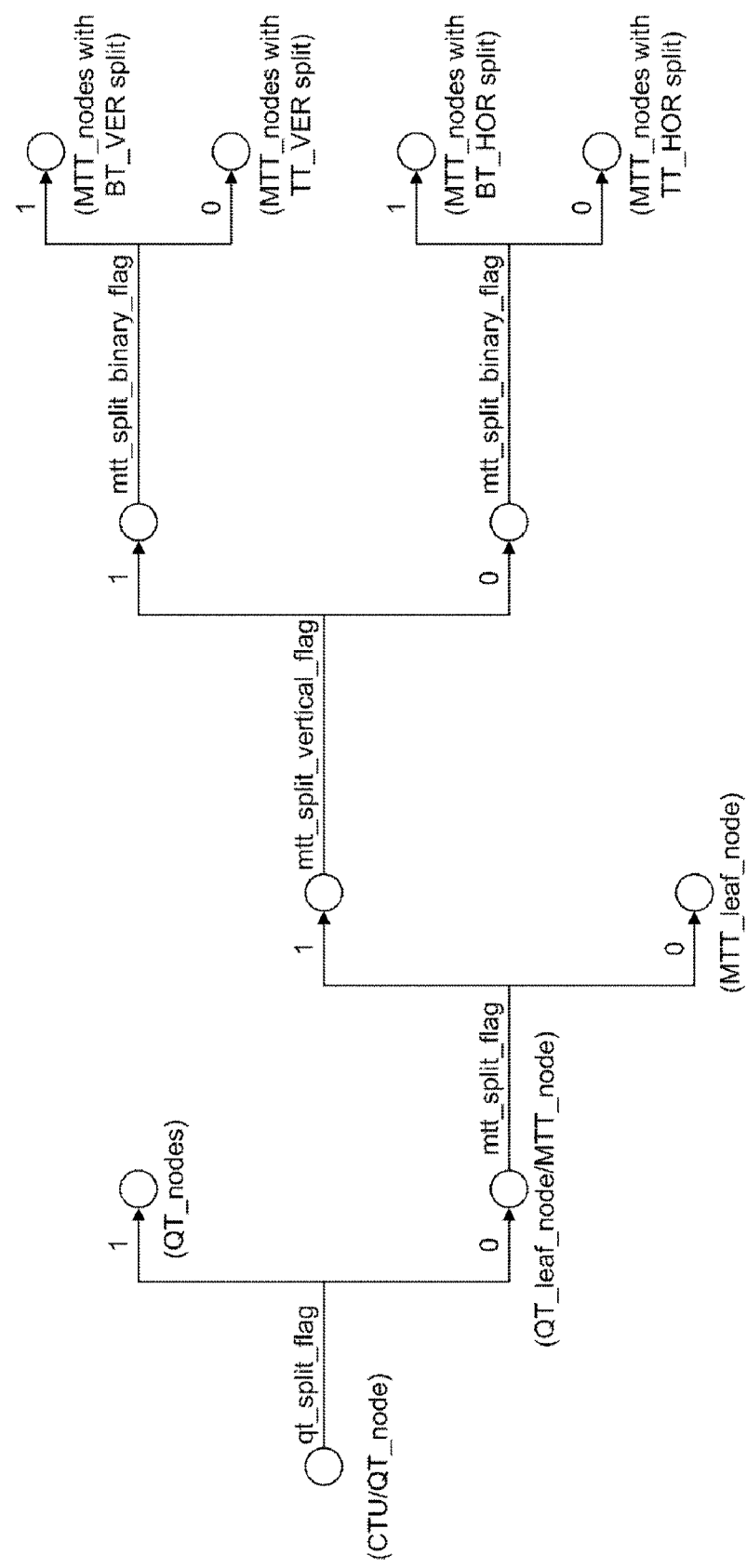
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present disclosure, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
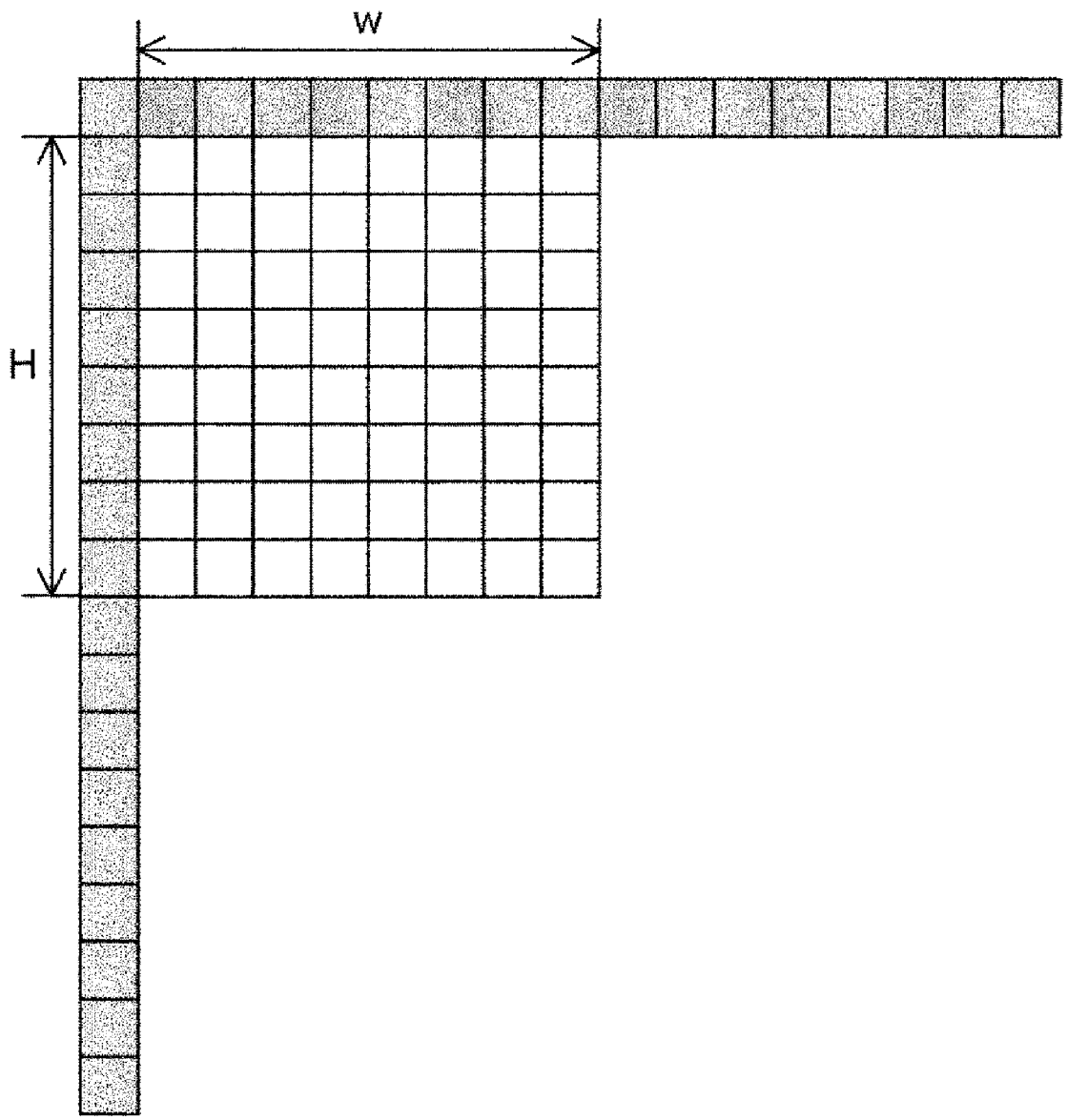

FIGS. 5 and 6 more specifically illustrate an intra prediction method according to an embodiment of the present disclosure. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

According to an additional embodiment of the present disclosure, samples on multiple reference lines may be used for intra prediction of the current block. The multiple reference lines may include n lines located within a preconfigured distance from the boundary of the current block. In this case, separate reference line information indicating at least one reference line used for intra prediction of the current block may be signaled. Specifically, the reference line information may include an index indicating any one of the multiple reference lines.

When at least some samples to be used as reference samples have not yet been restored, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present disclosure, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

A preconfigured angle range may be configured differently according to the shape of the current block. For example, if the current block is a rectangular block, a wide-angle mode indicating an angle greater than 45 degrees or an angle less than −135 degrees in the clockwise direction may be additionally used. If the current block is a horizontal block, the angle mode may indicate an angle within an angle range (i.e., a second angle range) between (45+offset1) degrees and (−135+offset1) degrees in the clockwise direction. In this case, angle modes 67 to 80 outside a first angle range may be additionally used. If the current block is a vertical block, the angle mode may indicate an angle within an angle range (i.e., a third angle range) between (45−offset2) degrees and (−135−offset2) degrees in the clockwise direction. In this case, angle modes −10 to −1 outside the first angle range may be additionally used. According to an embodiment of the present disclosure, values of offset1 and offset2 may be determined differently according to a ratio between the width and height of a rectangular block. offset1 and offset2 may be positive numbers.

According to an additional embodiment of the present disclosure, multiple angle modes constituting an intra prediction mode set may include a basic angle mode and an extended angle mode. The extended angle mode may be determined based on the basic angle mode.

According to an embodiment, the basic angle mode may be a mode corresponding to an angle used in intra prediction of the existing high efficiency video coding (HEVC) standard, and the extended angle mode may be a mode corresponding to an angle newly added in intra prediction of the next-generation video codec standard. More specifically, the basic angle mode may be an angle mode corresponding to one of intra prediction modes {2, 4, 6, . . . , 66}, and the extended angle mode may be an angle mode corresponding to one of intra prediction modes {3, 5, 7, . . . , 65}. That is, the extended angle mode may be an angle mode between basic angle modes within the first angle range. Accordingly, an angle indicated by the extended angle mode may be determined based on an angle indicated by the basic angle mode.

According to another embodiment, the basic angle mode may be a mode corresponding to an angle within the preconfigured first angle range, and the extended angle mode may be a wide-angle mode outside the first angle range. That is, the basic angle mode may be an angle mode corresponding to one of intra prediction modes {2, 3, 4, . . . , 66}, and the extended angle mode may be an angle mode corresponding to one of intra prediction modes {−10, −9, . . . , −1} and {67, 68, . . . , 76}. An angle indicated by the extended angle mode may be determined to be an angle opposite to an angle indicated by the corresponding basic angle mode. Accordingly, an angle indicated by the extended angle mode may be determined based on an angle indicated by the basic angle mode. The number of extended angle modes is not limited thereto, and additional extended angles may be defined according to the size and/or shape of the current block. For example, the extended angle mode may be defined to be an angle mode corresponding to one of intra prediction modes {−14, −13, . . . , −1} and {67, 68, . . . , 80}. The total number of intra prediction modes included in the intra prediction mode set may vary according to the aforementioned configuration of the basic angle mode and the extended angle mode.

In the above embodiments, the spacing between the extended angle modes may be configured based on the spacing between the corresponding basic angle modes. For example, the spacing between extended angle modes {3, 5, 7, . . . , 65} may be determined based on the spacing between corresponding basic angle modes {2, 4, 6, . . . , 66}. Also, the spacing between extended angle modes {−10, −9, . . . , −1} may be determined based on the spacing between the corresponding opposite basic angle modes {56, 57, . . . , 65}, and the spacing between extended angle modes {67, 68, . . . , 76} may be determined based on the spacing between corresponding opposite basic angle modes {3, 4, . . . , 12}. The angular spacing between the extended angle modes may be configured to be the same as the angular spacing between the corresponding basic angle modes. In the intra prediction mode set, the number of the extended angle modes may be configured to be equal to or less than the number of the basic angle modes.

According to an embodiment of the present disclosure, the extended angle mode may be signaled based on the basic angle mode. For example, a wide-angle mode (i.e., the extended angle mode) may replace at least one angle mode (i.e., the basic angle mode) within the first angle range. The replaced basic angle mode may be an angle mode corresponding to the opposite of the wide-angle mode. That is, the replaced basic angle mode is an angle mode corresponding to an angle in the opposite direction to an angle indicated by the wide-angle mode or corresponding to an angle different from an angle in the opposite direction by a preconfigured offset index. According to an embodiment of the present disclosure, the preconfigured offset index is 1. An intra prediction mode index corresponding to the replaced basic angle mode may be remapped to the wide-angle mode so as to signal the wide-angle mode. For example, wide-angle modes {−10, −9, . . . , −1} may be respectively signaled by intra prediction mode index {57, 58, . . . , 66}, and wide-angle modes {67, 68, . . . , 76} may be respectively signaled by intra prediction mode index 2, 3, . . . , 11}. As such, by allowing the intra prediction mode index for the basic angle mode to signal the extended angle mode, even if the configurations of angle modes used for intra prediction of each block are different from each other, the same set of intra prediction mode indexes may be used for signaling of the intra prediction mode. Accordingly, a signaling overhead according to a change in the intra prediction mode configuration may be minimized.

Whether to use the extended angle mode may be determined based on at least one of the shape and size of the current block. According to an embodiment, if the size of the current block is greater than a preconfigured size, the extended angle mode may be used for intra prediction of the current block, otherwise only the basic angle mode may be used for intra prediction of the current block. According to another embodiment, if the current block is a non-square block, the extended angle mode may be used for intra prediction of the current block, and if the current block is a square block, only the basic angle mode may be used for intra prediction of the current block.

The intra prediction unit determines interpolated reference samples and/or reference samples to be used for intra prediction of the current block, based on intra prediction mode information of the current block. If an intra prediction mode index indicates a specific angle mode, an interpolated reference sample or a reference sample corresponding to the specific angle from current samples of the current block is used for prediction of the current samples. Accordingly, different sets of reference samples and/or interpolated reference samples may be used for intra prediction according to the intra prediction mode. After intra prediction of the current block is performed using the reference samples and intra prediction mode information, a decoder reconstructs sample values of the current block by adding residual signals of the current block, which are obtained from the inverse transform unit, to intra prediction values of the current block.

Hereinafter, an inter prediction method according to an embodiment of the present disclosure is described with reference to FIG. 7. In the present disclosure, the inter prediction method may include a general inter prediction method optimized for translation motion and an inter prediction method based on an affine model. Further, the motion vector may include at least one of a general motion vector for motion compensation according to the general inter prediction method and a control point motion vector for affine compensation.

FIG. 7 illustrates an inter prediction method according to an embodiment of the present disclosure. As described above, the decoder may predict the current block with reference to reconstructed samples of another decoded picture. Referring to FIG. 7, the decoder obtains a reference block 702 within a reference picture 720 based on a motion information set of a current block 701. In this case, the motion information set may include a reference picture index and a motion vector (MV). The reference picture index indicates a reference picture 720 including a reference block for inter prediction of the current block in a reference picture list. According to an embodiment, the reference picture list may include at least one of the L0 picture list or the L1 picture list. The motion vector indicates an offset between a coordinate value of the current block 701 within the current picture 710 and a coordinate value of the reference block 702 within the reference picture 720. The decoder obtains a predictor of the current block 701 based on sample values of the reference block 702 and reconstructs the current block 701 using the predictor.

Specifically, the encoder may obtain the reference block by searching for blocks similar to the current block in pictures having a higher restoration sequence. For example, the encoder may search for a reference block having a minimum sum of differences in sample values from the current block within a preset search area. In this case, in order to measure similarity between the current block and samples of the reference block, at least one of Sum of Absolute Difference (SAD) and Sum of Hadamard Transformed Difference (SATD) may be used. Here, the SAD may be a value obtained by adding all of absolute values of differences in sample values included in two blocks. Further, the SATD may be a value obtained by adding all of absolute values of Hadamard transform coefficients obtained through Hadamard transform of differences in sample values included in two blocks.

Meanwhile, the current block may be predicted using one or more reference areas. As described above, the current block may be inter-predicted through a pair prediction method using two or more reference areas. According to an embodiment, the decoder may obtain two reference blocks based on two motion information sets of the current block.

Further, the decoder may obtain a first predictor and a second predictor of the current block based on sample values of the two obtained reference blocks. In addition, the decoder may reconstruct the current block using the first predictor and the second predictor. For example, the decoder may reconstruct the current block based on an average for each of the samples of the first predictor and the second predictor.

As described above, for motion compensation of the current block, one or more motion information sets may be signaled. In this case, similarity between motion information sets for motion compensation of each of a plurality of blocks may be used. For example, the motion information set used for predicting the current block may be induced from motion information sets used for predicting one of other reconstructed samples. To this end, the encoder and the decoder may reduce signaling overhead.

For example, there may be multiple candidate blocks that are likely to have been predicted based on a motion information set identical or similar to the motion information set of the current block. The decoder may generate a merge candidate list. The decoder may generate the merge candidate list based on corresponding multiple candidate blocks. Here, the merge candidate list may include candidates corresponding to samples that are likely to have been predicted based on a motion information set related to the motion information set of the current block, from among samples reconstructed before the current block. The merge candidate list may include a spatial candidate or a temporal candidate. The merge candidate list may be generated based on locations of the samples reconstructed before the current block. The samples reconstructed before the current block may be neighboring blocks of the current block. The neighboring blocks of the current block may refer to blocks adjacent to the current block. The encoder and the decoder may configure merge candidate lists of the current block according to a predefined rule. The merge candidate lists respectively configured by the encoder and the decoder may be identical to each other. For example, the encoder and the decoder may configure the merge candidate lists of the current block based on a location of the current block within the current picture. In the present disclosure, a location of a specific block indicates a relative location of a top-left sample of the specific block within a picture including the specific block.

Figures 8, 9:
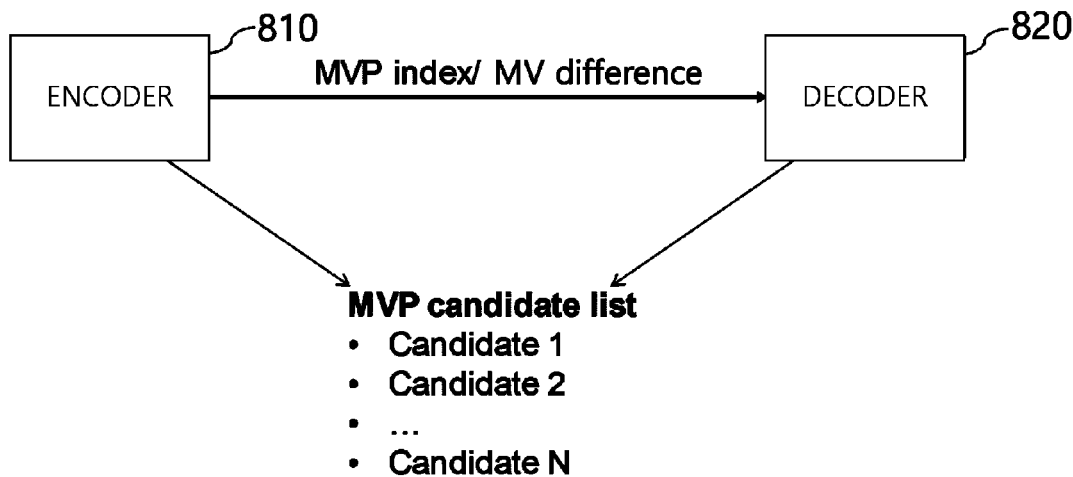
FIG. 8 is a diagram illustrating a method in which a motion vector of a current block is signaled, according to an embodiment of the present disclosure.
FIG. 9 is a diagram illustrating a method in which a motion vector difference value of a current block is signaled, according to an embodiment of the present disclosure.

FIG. 8 is a diagram illustrating a method in which a motion vector of a current block is signaled, according to an embodiment of the present disclosure. According to an embodiment of the present disclosure, a motion vector of a current block may be derived from a motion vector predictor (MVP) of the current block. According to an embodiment, the motion vector predictor referenced to derive the motion vector of the current block may be obtained using a motion vector predictor (MVP) candidate list. The MVP candidate list may include a preconfigured number of MVP candidates (candidate 1, candidate 2, . . . , candidate N).

According to an embodiment, the MVP candidate list may include at least one of a spatial candidate and a temporal candidate. The spatial candidate may be a motion information set used for prediction of neighboring blocks within a certain range from the current block in the current picture. The spatial candidate may be configured based on available neighboring blocks among the neighboring blocks of the current block. The temporal candidate may be a motion information set used for prediction of a block in a picture other than the current picture. For example, the temporal candidate may be configured based on a specific block corresponding to a location of a current block in a specific reference picture. In this case, the location of the specific block indicates a location of a top-left sample of the specific block in the reference picture. According to an additional embodiment, the MVP candidate list may include a zero motion vector. According to an additional embodiment, a rounding process may be performed for the MVP candidates included in the MVP candidate list of the current block. Here, a resolution of a motion vector difference value of the current block, which will be described later, may be used. For example, each of the MVP candidates of the current block may be rounded based on a resolution of a motion vector difference value of the current block.

In the present disclosure, the MVP candidate list may include an improved temporal motion vector candidate (advanced temporal motion vector prediction (ATMVP) or subblock-based temporal motion vector prediction (SbTMVP)) list, a merge candidate list for merge inter prediction, a control point motion vector candidate list for affine motion compensation, and a temporal motion vector candidate (subblock-based temporal motion vector prediction (STMVP)) list for subblock-based motion compensation, and a combination thereof.

According to an embodiment, an encoder 810 and a decoder 820 may configure MVP candidate lists for motion compensation of the current block. For example, among samples reconstructed before the current block, candidates corresponding to samples that are likely to have been predicted based on a motion information set identical or similar to a motion information set of the current block may exist. The encoder 810 and the decoder 820 may configure the MVP candidate lists of the current block based on corresponding multiple candidate blocks. The encoder 810 and the decoder 820 may configure the MVP candidate lists according to a rule predefined between the encoder 810 and the decoder 820. That is, the MVP candidate lists respectively configured by the encoder 810 and the decoder 820 may be identical to each other.

Also, the predefined rule may vary according to a prediction mode of the current block. For example, if the prediction mode of the current block is an affine model-based affine prediction mode, the encoder and the decoder may configure the MVP candidate lists of the current block by using a first method based on the affine model. The first method may be a method of obtaining a control point motion vector candidate list. On the other hand, if the prediction mode of the current block is a general inter prediction mode that is not based on the affine model, the encoder and the decoder may configure the MVP candidate lists of the current block by using a second method that is not based on the affine model. The first method and the second method may be different methods.

The decoder 820 may derive a motion vector of the current block, based on one of at least one MVP candidate included in the MVP candidate list of the current block. For example, the encoder 810 may signal an MVP index indicating a motion vector predictor referenced to derive the motion vector of the current block. Signaling may refer to that the encoder generates a signal as a bitstream and the decoder 820 performs parsing from the bitstream. The MVP index may include a merge index for the merge candidate list. The decoder 820 may obtain the motion vector predictor of the current block, based on the signaled MVP index. The decoder 820 may derive the motion vector of the current block by using the motion vector predictor. According to an embodiment, the decoder 820 may use, as the motion vector of the current block, the motion vector predictor obtained from the MVP candidate list without a separate motion vector difference value. For example, the decoder 820 may select the motion vector from a merge list, based on the merge index.

The decoder 820 may reconstruct the current block, based on the motion vector of the current block. An inter prediction mode, in which the motion vector predictor obtained from the MVP candidate list is used as the motion vector of the current block without the separate motion vector difference value, may be referred to as a merge mode.

According to another embodiment, the decoder 820 may obtain the separate motion vector difference value for the motion vector of the current block. The decoder 820 may obtain the motion vector of the current block by summing the motion vector predictor obtained from the MVP candidate list and the motion vector difference value of the current block. In this case, the encoder 810 may signal the motion vector difference value (MV difference) indicating a difference between the motion vector of the current block and the motion vector predictor. A method in which the motion vector difference value is signaled will be described in detail with reference to FIG. 9. The decoder 820 may obtain the motion vector of the current block, based on the motion vector difference value (MV difference). The decoder 820 may reconstruct the current block, based on the motion vector of the current block.

In addition, a reference picture index for motion compensation of the current block may be signaled. The prediction mode of the current block may allow the encoder 810 to signal a reference picture index indicating a reference picture including a reference block. The decoder 820 may obtain POC of a reference picture referenced for reconstruction of the current block, based on the signaled reference picture index. The POC of the reference picture may be different from POC of the reference picture corresponding to the MVP referenced to derive the motion vector of the current block. In this case, the decoder 820 may perform motion vector scaling. That is, the decoder 820 may obtain an MVP' by scaling the MVP. Motion vector scaling may be performed based on the POC of the current picture, the POC of the signaled reference picture of the current block, and the POC of the reference picture corresponding to the MVP. The decoder 820 may use the MVP' as the motion vector predictor of the current block.

As described above, the motion vector of the current block may be obtained by summing the motion vector predictor of the current block and the motion vector difference value. In this case, the motion vector difference value may be signaled from the encoder. The encoder may encode the motion vector difference value to generate and signal information indicating the motion vector difference value. Hereinafter, a method in which a motion vector difference value is signaled according to an embodiment of the present disclosure will be described.

FIG. 9 is a diagram illustrating a method in which a motion vector difference value of a current block is signaled, according to an embodiment of the present disclosure. According to an embodiment, information indicating a motion vector difference value may include at least one of absolute value information of the motion vector difference value and sign information of the motion vector difference value. The absolute value and the sign of the motion vector difference value may be encoded separately.

According to an embodiment, the absolute value of the motion vector difference value may not be signaled as the value itself. An encoder may reduce a magnitude of the signaled value by using at least one flag indicating a characteristic of the absolute value of the motion vector difference value. A decoder may derive the absolute value of the motion vector difference value from the signaled value by using at least one flag.

For example, the at least one flag may include a first flag indicating whether the absolute value of the motion vector difference value is greater than N. N may be an integer. If the magnitude of the absolute value of the motion vector difference value is greater than N, a value (the absolute value of the motion vector difference value−N) may be signaled together with an enabled first flag. In this case, the enabled flag may indicate a case in which the magnitude of the absolute value of the motion vector difference value is greater than N. The decoder may obtain the absolute value of the motion vector difference value, based on the enabled first flag and the signaled value.

Referring to FIG. 9, a second flag (abs_mvd_greater0_flag) indicating whether the absolute value of the motion vector difference value is greater than "0" may be signaled. If the second flag (abs_mvd_greater0_flag[ ]) indicates that the absolute value of the motion vector difference value is not greater than "0", the absolute value of the motion vector difference value may be "0". In addition, if the second flag (abs_mvd_greater0_flag) indicates that the absolute value of the motion vector difference value is greater than "0", the decoder may obtain the absolute value of the motion vector difference value by using other information on the motion vector difference value.

According to an embodiment, a third flag (abs_mvd_greater1_flag) indicating whether the absolute value of the motion vector difference value is greater than "1" may be signaled. If the third flag (abs_mvd_greater1_flag) indicates that the absolute value of the motion vector difference value is not greater than "1", the decoder may determine that the absolute value of the motion vector difference value is "1".

On the other hand, if the third flag (abs_mvd_greater1_flag) indicates that the absolute value of the motion vector difference value is greater than "1", the decoder may obtain the absolute value of the motion vector difference value by using other information on the motion vector difference value. For example, a value (abs_mvd_minus2) of (the absolute value of the motion vector difference value −2) may be signaled. This is because, if the absolute value of the motion vector difference value is greater than "1", the absolute value of the motion vector difference value may be a value of 2 or greater.

As described above, the absolute value of the motion vector difference value of the current block may be transformed in at least one flag. For example, the transformed absolute value of the motion vector difference value may indicate a value of (the absolute value of the motion vector difference value −N) according to the magnitude of the motion vector difference value. According to an embodiment, the transformed absolute value of the motion vector difference value may be signaled via at least one bit. In this case, the number of bits signaled to indicate the transformed absolute value of the motion vector difference value may be variable.

The encoder may encode the transformed absolute value of the motion vector difference value by using a variable length binary method. For example, the encoder may use at least one of truncated unary binary, unary binary, truncated rice binary, and exp-Golomb binary as the variable length binary method.

In addition, the sign of the motion vector difference value may be signaled via a sign flag (mvd_sign_flag). The sign of the motion vector difference value may be implicitly signaled by sign-bit-hiding.

In FIG. 9, [0] and [1] may represent component indexes. For example, [0] and [1] may represent an x-component and a y-component.

Figure 10:
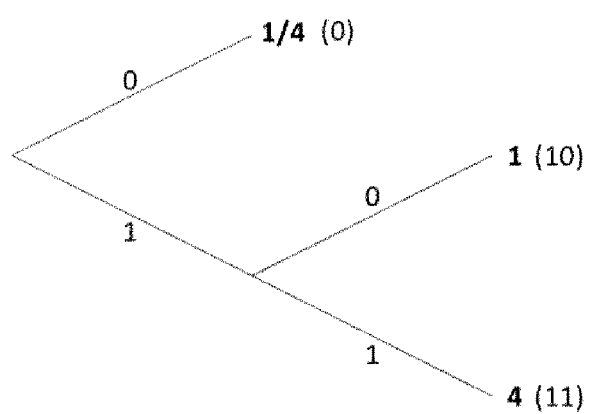
FIG. 10 is a diagram illustrating adaptive motion vector resolution signaling according to an embodiment of the present disclosure.

FIG. 10 is a diagram illustrating adaptive motion vector resolution signaling according to an embodiment of the present disclosure.

According to an embodiment of the present disclosure, resolution indicating a motion vector or motion vector difference may vary. In other words, the resolution at which the motion vector or motion vector difference is coded may vary. For example, the resolution may be expressed based on pixels (pel). For example, the motion vector or the motion vector difference may be signaled in units of ¼(quarter), ½(half), 1(integer), 2, or 4 pixels. For example, when desired to express 16, coding may be performed by 64 in units of ¼ (¼*64=16), coding may be performed by 16 in units of 1 (1*16=16), and coding may be performed by 4 in units of 4 (4*0.4=16). That is, the value may be determined as follows.

valueDetermined=resolution*valuePerResolution Here, valueDetermined may be a value for transfer, that is, a motion vector or a motion vector difference in the present embodiment. valuePerResolution may be a value indicating valueDetermined in the [/resolution] unit.

In this case, if a value signaled by the motion vector or the motion vector difference is not divisible by a resolution, an inaccurate value, which is not the best performance motion vector or motion vector difference, may be transmitted due to rounding or the like. When a high resolution is used, inaccuracy may be decreased, but since a value to be coded is increased, more bits may be used. When a low resolution is used, inaccuracy may be increased, but since a value to be coded is decreased, fewer bits may be used.

Further, it is possible to differently configure the resolution in units of blocks, CUs, slices, and the like. Accordingly, the resolution may be adaptively applied to fit the unit. The resolution may be signaled from the encoder to the decoder. Signaling of the resolution may be the signaling binarized with the variable length described above. In this case, when the signaling is performed with an index corresponding to the smallest value (frontmost value), signaling overhead is reduced.

In an embodiment, signaling indexes may match resolutions in the order from a high resolution (detailed signaling) to a low resolution.

FIG. 10 illustrates signaling of three resolutions. The three signals may be 0, 10, and 11, and may correspond to resolution 1, resolution 2, and resolution 3, respectively. Since signaling of resolution 1 needs 1 bit and signaling of the remaining resolutions need 2 bits, the signaling of resolution 1 has smaller signaling overhead. In the example of FIG. 10, resolution 1, resolution 2, and resolution 3 are ¼, 1, and 4 pels, respectively.

In the invention hereinafter, the motion vector resolution may refer to the resolution of the motion vector difference.

FIG. 11 is a diagram illustrating inter prediction-related syntax according to an embodiment of the present disclosure.

According to an embodiment of the present disclosure, an inter prediction method may include a skip mode, a merge mode, an inter mode, and the like. According to an embodiment, in the skip mode, a residual signal may not be transmitted. In the skip mode, an MV determination method which is the same as that in the merge mode may be used. Whether to use the skip mode may be determined according to a skip flag. Referring to FIG. 11, whether to use the skip mode may be determined according to a value of cu_skip_flag.

According to an embodiment, no motion vector difference may be used in the merge mode. A motion vector may be determined based on a motion candidate index. Whether to use the merge mode may be determined according to a merge flag. Referring to FIG. 11, whether to use the merge mode may be determined according to a value of the merge_flag. If the skip mode is not used, it is possible to use the merge mode.

A candidate may be selectively used from among one or more candidate list types in the skip mode or the merge mode. For example, it is possible to use a merge candidate or a subblock merge candidate. The merge candidate may include a spatial neighboring candidate, a temporal candidate, and the like. Further, the merge candidate may include a candidate using a motion vector for the entire current block (CU). That is, motion vectors of respective subblocks belonging to the current block may include the same candidate. The subblock merge candidate may include a subblock-based temporal MV, an affine merge candidate, and the like. Further, the subblock merge candidate may include a candidate capable of using different motion vector for respective subblocks of the current block (CU). The affine merge candidate may be a method made based on a method of determining a control point motion vector of affine motion prediction without using the motion vector difference. The subblock merge candidate may include methods of determining a motion vector in units of subblocks in the current block. For example, the subblock merge candidate may include a plane MV, a regression-based MV, an STMVP, and the like as well as the subblock-based temporal MV and the affine merge candidate described above.

According to an embodiment, the motion vector difference may be used in the inter mode. The motion vector predictor may be determined based on a motion candidate index, and the motion vector may be determined based on the motion vector predictor and the motion vector difference. Whether to use the inter mode may be determined according to whether other modes are used or not. In another embodiment, whether to use the inter mode may be determined by a flag. FIG. 11 illustrates an example of using the inter mode in the case in which other modes, such as the skip mode and the merge mode, are not used.

The inter mode may include an AMVP mode, an affine inter mode, and the like. The inter mode may be a mode of determining a motion vector based on the motion vector predictor and the motion vector difference. The affine inter mode may be a method of using the motion vector difference when determining a control point motion vector of affine motion prediction.

Referring to FIG. 11, after the skip mode or the merge mode is determined, it may be determined whether to use the subblock merge candidate or the merge candidate. For example, if a specific condition is satisfied, merge_subblock_flag indicating whether the subblock merge candidate is used may be parsed. The specific condition may be a condition related to the block size. For example, the specific condition may be a condition related to a width, a height, an area, or the like, or may use a combination thereof. Referring to FIG. 11, the specific condition may be, for example, a condition in a case where the width and the height of the current block (CU) are greater than or equal to a specific value. When merge_subblock_flag is parsed, a value thereof may be inferred to be 0. If merge_subblock_flag is 1, the subblock merge candidate may be used, and if merge_subblock_flag is 0, the merge candidate may be used. merge_subblock_idx corresponding to a candidate index may be parsed when the subblock merge candidate is used, and merge_idx corresponding to a candidate index may be parsed when the merge candidate is used. If a maximum number of candidate lists is 1, no parsing may be performed. If merge_subblock_idx or merge_idx is not parsed, the value may be inferred to be 0.

FIG. 11 illustrates a function of coding_unit, and the content related to intra prediction may be omitted, or FIG. 11 may indicate a case where inter prediction is determined.

FIG. 12 is a diagram illustrating multi-hypothesis prediction according to an embodiment of the present disclosure.

As described above, encoding and decoding may be performed based on a prediction block. According to an embodiment of the present disclosure, the prediction block may be generated based on multiple predictions. This may be referred to as multi-hypothesis (MH) prediction. The prediction may refer to a block generated by a certain prediction method. The prediction method in multiple predictions may include methods, such as intra prediction and inter prediction. Alternatively, the prediction method in multiple predictions may be further subdivided and refer to a merge mode, an AMVP mode, a specific mode of intra prediction, and the like.

As the method of generating the prediction block based on multiple predictions, it is possible to perform weighted summation on the multiple predictions.

Alternatively, the maximum number of multiple predictions may be preconfigured. For example, the maximum number of multiple predictions may be two. Therefore, in a case of uni-prediction, it is possible to generate the prediction block from two predictions, and in a case of bi-prediction, it is possible to generate the prediction block from two predictions (when multiple predictions are used only for prediction from one reference list) or four predictions (when multiple predictions are used for predictions from two reference lists).

Alternatively, a prediction mode available for multiple predictions may be preconfigured. Alternatively, a combination of prediction modes available for multiple predictions may be preconfigured. For example, it is possible to use predictions generated by inter prediction and intra prediction. In this case, it is possible to use only some modes of inter prediction or intra prediction for multi-hypothesis prediction. For example, it is possible to use, for multi-hypothesis prediction, only the merge mode in inter prediction. Alternatively, it is possible to use, for multi-hypothesis prediction, only the merge mode other than the subblock merge in inter prediction. Alternatively, it is possible to use, for multi-hypothesis prediction, only a specific intra mode in intra prediction. For example, it is possible to use, for multi-hypothesis prediction, only modes including planar, DC, vertical, and horizontal modes in intra prediction.

Therefore, for example, it is possible to generate the prediction block, based on predictions via the merge mode and intra prediction. In this case, it is possible to allow only the planar, DC, vertical, and horizontal modes for intra prediction.

Referring to FIG. 12, a prediction block is generated based on prediction 1 and prediction 2. The prediction block is generated using a weighted sum of prediction 1 and prediction 2, and weights of prediction 1 and prediction 2 are w1 and w2, respectively.

According to an embodiment of the present disclosure, when the prediction block is generated based on multiple predictions, weights of the multiple predictions may be based on locations within the block. Alternatively, the weights of the multiple predictions may be based on modes for generation of the predictions.

For example, if one of modes for generation of prediction corresponds to intra prediction, the weight may be determined based on the prediction mode. For example, if one of the modes for generation of prediction corresponds to intra prediction and is a directional mode, a weight of a location far from a reference sample may be increased. More specifically, if one of the modes for generation of prediction corresponds to intra prediction and is the directional mode, and a mode for generation of another prediction corresponds to inter prediction, the weight of the prediction generated based on intra prediction far from the reference sample may be increased. In the case of inter prediction, motion compensation may be performed based on spatial neighboring candidates, and in that case, there is a probability that movements of the current block and the spatial neighboring blocks referenced for MC are the same or similar, and there is a probability that predictions near the spatial neighboring blocks and prediction of an area including an object with motion are more accurate compared to other parts. Then, more residual signals may remain near the opposite side of the spatial neighboring blocks than in other parts, which may be offset by using intra prediction in multi-hypothesis prediction. The location of the reference sample of intra prediction may be near the spatial neighboring candidates of inter prediction, and thus the weight far therefrom may be increased.

As another example, if one of modes for generation of prediction corresponds to intra prediction and is the directional mode, a weight of a location close to the reference sample may be increased. More specifically, if one of the modes for generation of prediction corresponds to intra prediction and is the directional mode, and a mode for generation of another prediction corresponds to inter prediction, the weight of the prediction generated based on intra prediction close to the reference sample may be increased. This is because a prediction accuracy closer to the reference sample in intra prediction may be higher.

As another example, if one of the modes for generation of prediction corresponds to intra prediction and is not the directional mode (e.g., in the case of the planar or DC mode), it is possible that the weight is constant regardless of the location in the block.

It is also possible, in multi-hypothesis prediction, that the weight for prediction 2 is determined based on the weight for prediction 1.

The following is an equation showing an example of determining prediction sample pbSamples based on multiple predictions.

pbSamples[x][y]=Clip3(0, (1<<bitDepth)−1, (w*predSamples [x][y]+(8−w)*predSamplesIntra [x][y])>>3)

In the above equation, x and y may represent coordinates of a sample in a block, and may be in the following range. x=0 . . . nCbW−1 and y=0 . . . nCbH−1. Further, nCbW and nCbH may be the width and height of the current block, respectively. In addition, predSamples may be a block/sample generated by inter prediction, and predSamplesIntra may be a block/sample generated by intra prediction. The weight "w" may be determined as follows.

If predModeIntra is INTRA_PLANAR or INTRA_DC or nCbW <4 or nCbH <4 or cIdx>0, w is set equal to 4.

Otherwise, if predModeIntra is INTRA_ANGULAR50 and y<(nCbH/4), w is set equal to 6.

Otherwise, if predModeIntra is INTRA_ANGULAR50 and (nCbH/4)<=y<(nCbH/2), w is set equal to 5.

Otherwise, if predModeIntra is INTRA_ANGULAR50 and (nCbH/2)<=y<(3*nCbH/4), w is set equal to 4.

Otherwise, if predModeIntra is INTRA_ANGULAR50 and (3*nCbH/4)<=y<nCbH, w is set equal to 3.

Otherwise, if predModeIntra is INTRA_ANGULAR18 and x<(nCbW/4), w is set equal to 6.

Otherwise, if predModeIntra is INTRA_ANGULAR18 and (nCbW/4)<=x<(nCbW/2), w is set equal to 5.

Otherwise, if predModeIntra is INTRA_ANGULAR18 and (nCbW/2)<=x<(3*nCbW/4), w is set equal to 4.

Otherwise, if predModeIntra is INTRA_ANGULAR18 and (3*nCbW/4)<=x<nCbW, w is set equal to 3.

FIG. 13 is a diagram illustrating multi-hypothesis prediction-related syntax according to an embodiment of the present disclosure.

Referring to FIG. 13, mh_intra_flag may be a flag indicating whether multi-hypothesis prediction is used. According to an embodiment, multi-hypothesis prediction may be used only if mh_conditions are satisfied, and if mh_conditions are not satisfied, it is possible to infer mh_intra_flag to be 0 without parsing. For example, mh_conditions may include a condition relating to a block size. Also, mh_conditions may include a condition relating to whether a specific mode is used. For example, it is possible to parse mh_intra_flag if merge_flag is 1 and subblock_merge_flag is 0.

According to an embodiment of the present disclosure, in order to determine a mode in multi-hypothesis prediction, it is possible to divide candidate modes into multiple lists and signal which list is to be used. Referring to FIG. 13, mh_intra_luma_mpm_flag may be a flag indicating a list to be used from among multiple lists. If mh_intra_luma_mpm_flag does not exist, this can be inferred by 1. In an embodiment of the present disclosure, the multiple lists may be MPM lists and non-MPM lists.

According to an embodiment of the present disclosure, an index indicating which index candidate is used in which list among the multiple lists may be signaled. Referring to FIG. 13, mh_intra_luma_mpm_idx may be such an index. As an embodiment, the index can be signaled only when a specific list is selected. Referring to FIG. 13, mh_intra_luma_mpm_idx may be parsed only when a certain list is determined as mh_intra_luma_mpm_flag.

For example, as in one embodiment described with reference to FIG. 12, multi-hypothesis prediction may be performed based on prediction generated by inter prediction and prediction generated by intra prediction. In addition, multi-hypothesis prediction can be performed only when it is signaled to use inter prediction. Alternatively, multi-hypothesis prediction can be performed only when it is signaled to use a specific mode of inter prediction, such as the merge mode. In such a case, signaling for inter prediction may not be necessary. According to an embodiment, when prediction is generated by intra prediction, there may be a total of four candidate modes. The total of four candidate modes may be divided into 3 and 1 in list1 and list 2, respectively. If list 2 is selected, no index may be signaled. When list1 is selected, an index may be signaled, wherein since there are three candidates included in list1, signaling may be performed with variable length coding, and 1 bit or 2 bits may be required for index signaling.

FIG. 14 is a diagram illustrating multi-hypothesis prediction-related syntax according to an embodiment of the present disclosure.

As described in FIG. 13, there may be signaling indicating which list is to be used, and mh_intra_luma_mpm_flag may be the signaling in FIG. 13 and FIG. 14.

According to an embodiment of the present disclosure, signaling indicating which list is to be used may be explicitly performed only in a specific case. If signaling is not performed explicitly, a signaling value may be inferred according to a preconfigured method. Referring to FIG. 14, if a condition of mh_mpm_infer_condition is satisfied, explicit signaling may not exist, and if the condition is not satisfied, explicit signaling may exist. Also, if the condition of mh_mpm_infer_condition is satisfied, mh_intra_luma_mpm_flag does not exist, and this case may be inferred by 1. That is, the case may be inferred to use the MPM list.

Figures 15, 16:
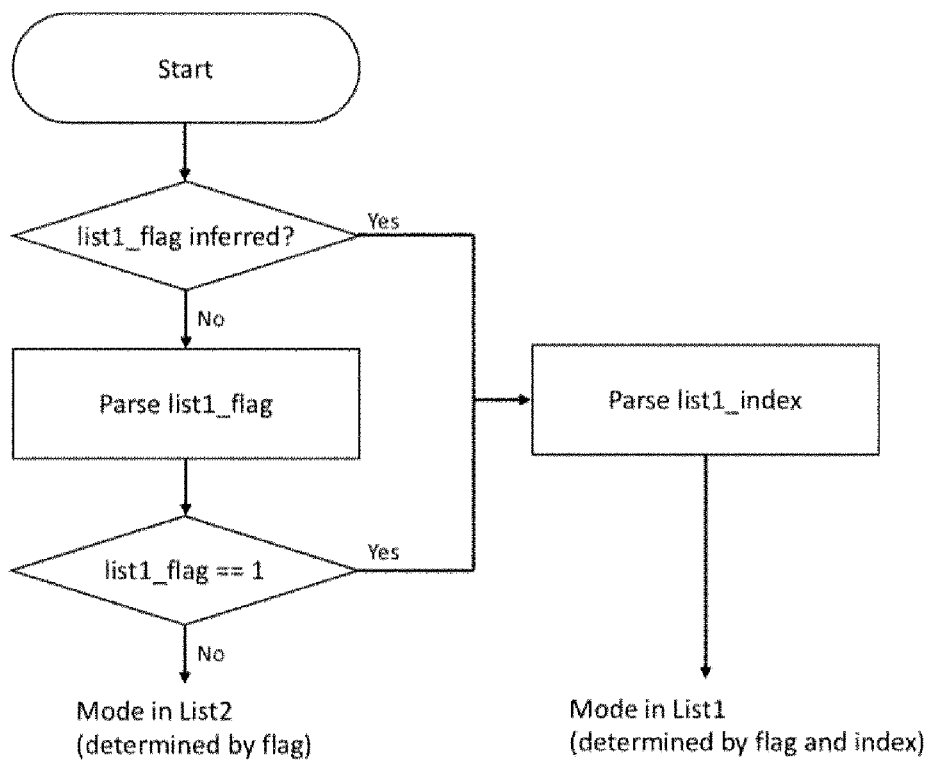
FIG. 15 is a diagram illustrating multi-hypothesis prediction-related syntax according to an embodiment of the present disclosure.
FIG. 16 is a diagram illustrating a method of determining a multi-hypothesis prediction mode according to an embodiment of the present disclosure.

FIG. 15 is a diagram illustrating multi-hypothesis prediction-related syntax according to an embodiment of the present disclosure.

As described in FIG. 13 and FIG. 14, signaling indicating which list is to be used may exist, and if a certain condition is satisfied, a value may be inferred.

According to an embodiment of the present disclosure, a condition for inferring a signaling value indicating which list is to be used may be based on a current block size. For example, the condition may be based on the width and height of the current block. More specifically, it is possible to infer a signaling value if the greater value among the width and the height of the current block is greater than n times the smaller value. For example, n may be 2.

Referring to FIG. 15, the condition for inferring the signaling value indicating which list is to be used may be a condition in which the greater value among the width and the height of the current block is greater than twice the smaller value. If the width and the height of the current block is cbWidth and cbHeight, respectively, a value of Abs(Log 2(cbWidth/cbHeight)) is 0 when cbWidth and cbHeight are the same, and the value is 1 when one of cbWidth and cbHeight is two times greater than the other. Accordingly, if one of cbWidth and cbHeight is greater than 2 times the other, the value of Abs(Log 2(cbWidth/cbHeight)) is greater than 1 (a value greater than or equal to 2).

FIG. 16 is a diagram illustrating a method of determining a multi-hypothesis prediction mode according to an embodiment of the present disclosure.

As described in FIG. 13 to FIG. 15, a mode may be determined based on multiple lists. The mode may refer to an intra mode for generation of prediction based on intra prediction. The multiple lists may include list1 and list2. Referring to FIG. 16, whether list1 is used may be determined by list1_flag. There may be multiple candidates that may belong to list1, and there may be one candidate that may belong to list2. The multiple lists may be two lists. If list1_flag is inferred, the value may be inferred so that list1 is used. In that case, list1_index that is an index indicating which candidate is used in list1 may be parsed. If list1_flag is not inferred, list1_flag may be parsed. If list1_flag is 1, list1_index may be parsed, and if list1_flag is not 1, the index may not be parsed. If list1_flag is 1, a mode to be actually used may be determined based on the index from among candidate modes of list1. If list1_flag is not 1, a candidate mode of list2 may be determined as a mode to be actually used, without the index. That is, the mode may be determined based on the flag and the index in list1, and the mode may be determined based on the flag in list2.

Figure 17:
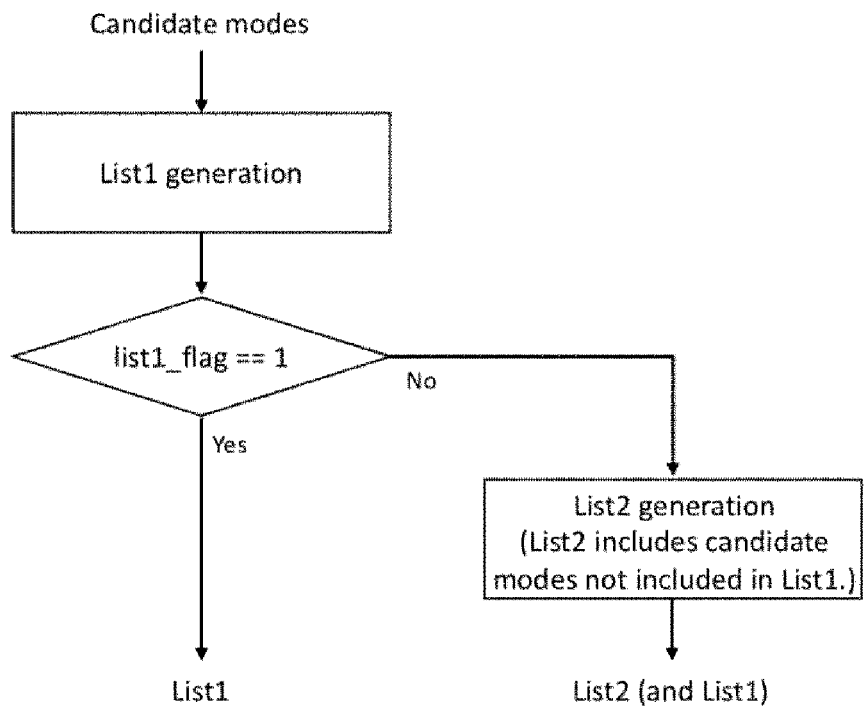
FIG. 17 is a diagram illustrating a method of generating a candidate list according to an embodiment of the present disclosure.

FIG. 17 is a diagram illustrating a method of generating a candidate list according to an embodiment of the present disclosure.

According to an embodiment of the present disclosure, there may be a method of determining the order of modes included in a candidate list in order to increase coding efficiency when variable length coding is performed for an index for determination of a candidate mode in the list. For example, there may be a method of determining the order of modes included in list1. Modes around the current block may be referenced to determine the mode order. List2 may be determined without referring to the modes around the current block. For example, list1 may be generated by referring to the modes around the current block, and a mode that is not included in list1 may be included in list2.

List1 may be an MPM mode and list2 may be a non-MPM mode. There may be a total of 4 candidate modes, and list1 may include 3 and list2 may include 1 mode.

Referring to FIG. 17, list1_flag which is signaling that indicates whether list1 is used may exist. If list1 is used, list1 may be generated, and a mode may be selected in list1. In this case, generation of list1 and determination of whether list1 is used may be performed in any order. However, in a situation where list1 is used, list1 may be generated before or after determination of whether list1 is used. If list1 is used, it is possible not to perform generation of list2. If list1 is not used, list2 may be generated, and a mode may be selected in list2. It is possible to generate list1 to generate list2. Further, among candidate modes, it is possible to include, in list2, a candidate that is not included in list1.

According to an embodiment of the present disclosure, the method of generating list1 may be the same regardless of whether list1 is used (list1_flag value), whether list1 is used or inferred, and the like.

In this case, list signaling and mode signaling may follow the embodiments described above in FIG. 16 and the like.

In the following, the method of generating multiple lists described in FIG. 16 and FIG. 17 will be further described. The multiple lists may include list1 and list2. The multiple lists may be lists specifically used in a multi-hypothesis prediction procedure.

According to an embodiment of the present disclosure, multiple lists may be generated with reference to modes around the current block. Intra prediction may be performed using a mode selected from among the multiple lists, and the intra prediction may be combined with inter prediction (multi-hypothesis prediction) so that a prediction block may be used. As an embodiment, modes (candidate modes) that may be included in the multiple lists may be the planar mode, the DC mode, the vertical mode, and the horizontal mode of the intra prediction method. The vertical mode may be a mode of index 50 in FIG. 6, and the horizontal mode may be a mode of index 18 in FIG. 6. The planar mode and the DC mode may be indexes 0 and 1, respectively.

According to an embodiment of the present disclosure, candModeList may be generated with reference to the modes around the current block. candModeList may be list1 described in the previous embodiments. As an embodiment, candIntraPredModeX, which is a mode around the current block or a mode based on the mode around the current block, may exist. Here, X may be a character, such as A or B, for indication of being corresponding to a specific location around the current block.

As an embodiment, candModeList may be generated based on whether multiple candIntraPredModeXs match each other. For example, candIntraPredModeX may exist for two locations, which may be represented by candIntraPredModeA and candIntraPredModeB. If candIntraPredModeA and candIntraPredModeB are identical, candModeList may include the planar mode and the DC mode.

If candIntraPredModeA and candIntraPredModeB are identical and a value thereof indicates the planar mode or the DC mode, the mode indicated by candIntraPredModeA and candIntraPredModeB may be added to candModeList. In this case, a mode that is not indicated by candIntraPredModeA and candIntraPredModeB from among the planar mode and the DC mode may be added to candModeList. In this case, a preconfigured mode, which is other than the planar mode or the DC mode, may be added to candModeList. As an embodiment, in this case, the order of the planar mode, the DC mode, and the preset mode within the candModeList may be preconfigured. For example, the order may be a sequence of the planar mode, the DC mode, and the preconfigured mode. That is, candModeList[0]=planar mode, candModeList[1]=DC mode, and candModeList[2]=the preconfigured mode. The preconfigured mode may be the vertical mode. As another embodiment, in this case, it is possible that the mode indicated by candIntraPredModeA and candIntraPredModeB from among the planar mode, the DC mode, and the preset modes comes first in candModeList, the mode that is not indicated by candIntraPredModeA and candIntraPredModeB comes after candModeList, and the preconfigured mode comes thereafter.

If candIntraPredModeA and candIntraPredModeB are identical, and the value thereof does not indicate the planar mode and the DC mode, a mode indicated by candIntraPredModeA and candIntraPredModeB may be added to candModeList. The planar mode and the DC mode may be added to candModeList. In this case, the order of the mode indicated by candIntraPredModeA and candIntraPredModeB, the planar mode, and the DC mode within candModeList may be preconfigured. The preconfigured order may be a sequence of the mode indicated by candIntraPredModeA and candIntraPredModeB, the planar mode, and the DC mode. That is, candModeList[0]=candIntraPredModeA, candModeList[1]=planar mode, and candModeList[2]=DC mode.

If candIntraPredModeA and candIntraPredModeB are different, both candIntraPredModeA and candIntraPredModeB may be added to candModeList. candIntraPredModeA and candIntraPredModeB may be included in candModeList according to a specific order. For example, candIntraPredModeA and candIntraPredModeB may be included in candModeList in order. There may be a preconfigured order between candidate modes, and a mode, which is other than candIntraPredModeA and candIntraPredModeB, from among modes according to the preconfigured order may be added to candModeList. The mode, which is other than candIntraPredModeA and candIntraPredModeB, may come after candIntraPredModeA and candIntraPredModeB within candModeList. The preconfigured order may be a sequence of the planar mode, the DC mode, and the vertical mode. Alternatively, the preconfigured order may be a sequence of the planar mode, the DC mode, the vertical mode, and the horizontal mode. That is, candModeList[0]=candIntraPredModeA and candModeList[1]=candIntraPredModeB, and candModeList[2] may be a frontmost mode, which is other than candIntraPredModeA and candIntraPredModeB, from among the planar mode, the DC mode, and the vertical mode.

Among candidate modes, a mode that is not included in candModeList may be candIntraPredModeC. candIntraPredModeC may be included in list2. Also, it is possible to configure candIntraPredModeC if the aforementioned signaling, which indicates whether list1 is used, indicates that list1 is not used.

A mode can be determined from among candModeList according to an index if list1 is used, and a mode of list2 can be used if list1 is not used.

As described above, after candModeList is generated, a procedure of modifying candModeList may be added. For example, the modification procedure may or may not be additionally performed according to a current block size condition. For example, the current block size condition may be based on the width and height of the current block. For example, if the greater value among the width and the height of the current block is greater than n times the other, the modification procedure may be additionally performed. n may be 2.

The modification procedure may be a procedure of, when a certain mode is included in candModeList, replacing the mode with another mode. For example, when the vertical mode is included in candModeList, the horizontal mode may be added to candModeList, instead of the vertical mode. Alternatively, when the vertical mode is included in candModeList, candIntraPredModeC may be added to candModeList, instead of the vertical mode. However, as described above, when candModeList is generated, the planar mode and the DC mode may always be included in candModeList, and in this case, candIntraPredModeC may be the horizontal mode. The modification procedure may be used when the height of the current block is greater than n times the width of the current block. For example, n may be 2. This may be because, when the height is greater than the width, the lower part of the block is far from the reference sample of intra prediction, so that the accuracy of the vertical mode may be low. Alternatively, using the modification procedure may correspond to a case of being inferred to use list1.

As another example of the modification procedure, when the horizontal mode is included in candModeList, the vertical mode may be added to candModeList, instead of the horizontal mode. Alternatively, when the horizontal mode is included in candModeList, candIntraPredModeC may be added to candModeList, instead of the horizontal mode. However, as described above, when candModeList is generated, the planar mode and the DC mode may always be included in candModeList, and in this case, candIntraPredModeC may be the vertical mode. The modification procedure may be used when the width of the current block is greater than n times the height of the current block. For example, n may be 2. This may be because, when the width is greater than the height, the right part of the block is far from the reference sample of intra prediction, so that the accuracy of the horizontal mode may be low. Alternatively, using the modification procedure may correspond to a case of being inferred to use list1.

An example of the list configuration method described above is described in the following again. In the following, IntraPredModeY may be a mode to be used in intra prediction in multi-hypothesis prediction. This may also be a mode of a luma component. As an embodiment, in multi-hypothesis prediction, an intra prediction mode of a chroma component may follow the mode of the luma component. Also, mh_intra_luma_mpm_flag may be signaling which indicates a list to be used. That is, the signaling may be, for example, mh_intra_luma_mpm_flag of FIG. 13 to FIG. 15, and list1_flag of FIG. 16 and FIG. 17. Also, mh_intra_luma_mpm_idx may be an index indicating which candidate in the list is to be used. That is, the index may be, for example, mh_intra_luma_mpm_idx of FIG. 13 to FIG. 15, and list1_index of FIG. 16. xCb and yCb may be x and y coordinates of the top-left of the current block. Further, cbWidth and cbHeight may be the width and height of the current block.

The candModeList[x] with x=0 . . . 2 is derived as follows:

A. If candIntraPredModeB is equal to candIntraPredModeA, the following applies:

a. If candIntraPredModeA is less than 2 (i.e., equal to INTRA_PLANAR or INTRA_DC), candModeList[x] with x=0 . . . 2 is derived as follows:
candModeList[0]=INTRA_PLANAR
candModeList[1]=INTRA_DC
candModeList[2]=INTRA_ANGULAR50 b. Otherwise, candModeList[x] with x=0 . . . 2 is derived as follows:
candModeList[0]=candIntraPredModeA
candModeList[1]=INTRA_PLANAR
candModeList[2]=INTRA_DC B. Otherwise (candIntraPredModeB is not equal to candIntraPredModeA), the following applies:

a. candModeList[0] and candModeList[1] are derived as follows:
candModeList[0]=candIntraPredModeA
candModeList[1]=candIntraPredModeB b. If neither of candModeList[0] and candModeList[1] is equal to INTRA_PLANAR, candModeList[2] is set equal to INTRA_PLANAR, c. Otherwise, if neither of candModeList[0] and candModeList[1] is equal to INTRA_DC, candModeList[2] is set equal to INTRA_DC, d. Otherwise, candModeList[2] is set equal to INTRA_ANGULAR50.

IntraPredModeY[xCb][yCb] is derived by applying the following procedure:

A. If mh_intra_luma_mpm_flag[xCb][yCb] is equal to 1, the IntraPredModeY[xCb][yCb] is set equal to candModeList[intra_luma_mpm_idx[xCb][yCb]].

B. Otherwise, IntraPredModeY[xCb][yCb] is set to equal to candIntraPredModeC, derived by applying the following steps:

a. If neither of candModeList[x], x=0 . . . 2 is equal to INTRA_PLANAR, candIntraPredModeC is set equal to INTRA_PLANAR, b. Otherwise, if neither of candModeList[x], x=0 . . . 2 is equal to INTRA_DC, candIntraPredModeC is set equal to INTRA_DC, c. Otherwise, if neither of candModeList[x], x=0 . . . 2 is equal to INTRA_ANGULAR50, candIntraPredModeC is set equal to INTRA_ANGULAR50, d. Otherwise, if neither of candModeList[x], x=0 . . . 2 is equal to INTRA_ANGULAR18. candIntraPredModeC is set equal to INTRA_ANGULAR18, The variable IntraPredModeY[x][y] with x=xCb . . . xCb+cbWidth−1 and y=yCb . . . yCb+cbHeight−1 is set to be equal to IntraPredModeY[xCb][yCb]. One additional setting is when cbHeight is larger than double of cbWidth, mh_intra_luma_mpm_flag[xCb][yCb] is inferred to be 1 and if candModeList[x], x=0 . . . 2 is equal to INTRA_ANGULAR50, candModeList[x] is replaced with candIntraPredModeC.

Another additional setting is when cbWidth is larger than double of cbHeight, mh_intra_luma_mpm_flag[xCb][yCb] is inferred to be 1 and if candModeList[x], x=0 . . . 2 is equal to INTRA_ANGULAR18, candModeList[x] is replaced with candIntraPredModeC.

Figure 18:
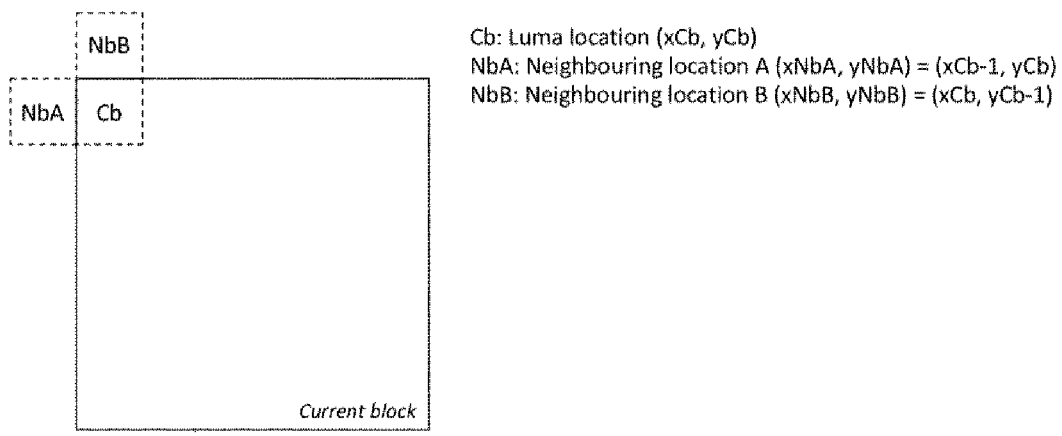
FIG. 18 is a diagram illustrating neighboring locations referenced in multi-hypothesis prediction according to an embodiment of the present disclosure.

FIG. 18 is a diagram illustrating neighboring locations referenced in multi-hypothesis prediction according to an embodiment of the present disclosure.

As described above, during the procedure of generating a candidate list for multi-hypothesis prediction, neighboring locations may be referenced. For example, aforementioned candIntraPredModeX may be needed. Locations of A and B adjacent to a current block may be NbA and NbB as shown in FIG. 18. That is, the locations may be immediately left and immediately above the top-left of the current block. If the location of the top-left of the current block is Cb as illustrated in FIG. 18, and when coordinates thereof are (xCb, yCb), NbA may be that (xNbA, yNbA)=(xCb−1, yCb), and NbB may be that (xNbB, yNbB)=(xCb, yCb−1).

Figures 19, 20:
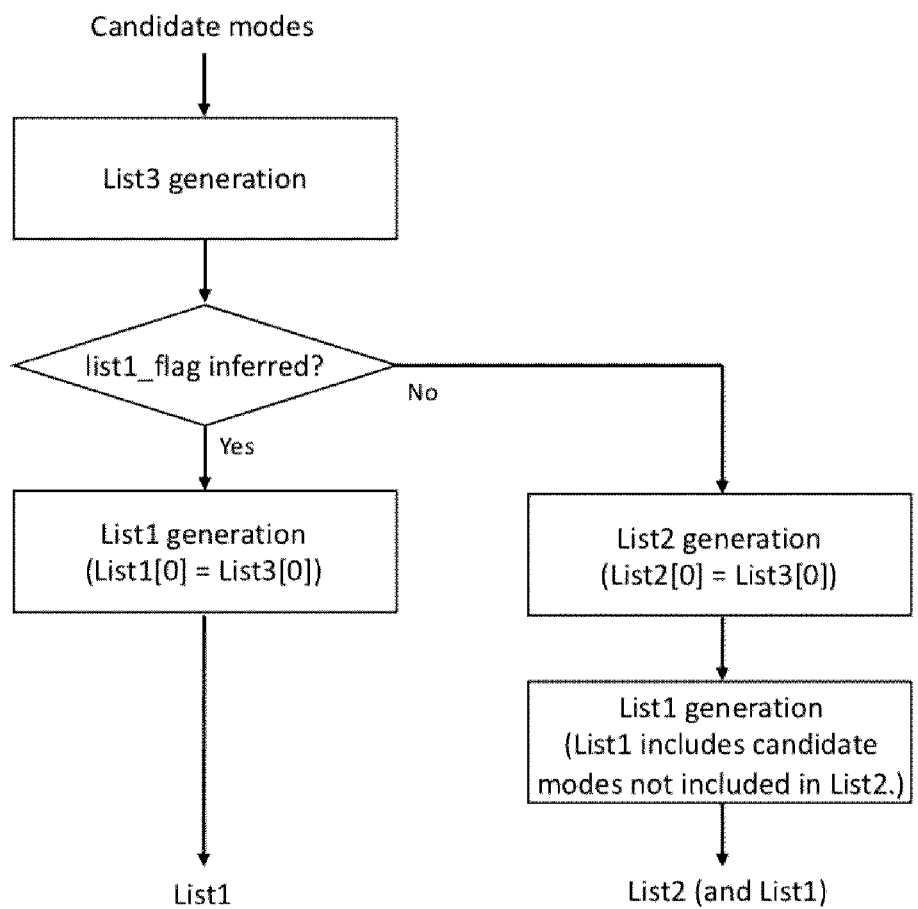
FIG. 19 is a diagram illustrating a method of referencing neighboring modes according to an embodiment of the present disclosure.
FIG. 20 is a diagram illustrating a method of generating a candidate list according to an embodiment of the present disclosure.

FIG. 19 is a diagram illustrating a method of referencing surrounding modes according to an embodiment of the present disclosure.

As described above, during the procedure of generating a candidate list of multi-hypothesis prediction, neighboring locations may be referenced. In addition, it is possible to generate a list by using a neighboring mode as it is or by using a mode based on the neighboring mode. A mode obtained by referring to a neighboring location may be candIntraPredModeX.

As an embodiment, in a case where a neighboring location is unavailable, candIntraPredModeX may be a predetermined mode. The case where the neighboring location is unavailable may include a case where the neighboring location uses inter prediction, a case where a mode is not determined in the determined decoding or encoding order, and the like.

Alternatively, if multi-hypothesis prediction is not used for the neighboring location, candIntraPredModeX may be the predetermined mode.

Alternatively, if the neighboring location is beyond and above a CTU to which the current block belongs, candIntraPredModeX may be the predetermined mode. As another example, if the neighboring location is out of the CTU to which the current block belongs, candIntraPredModeX may be the predetermined mode.

According to an embodiment, the predetermined mode may be the DC mode. As another embodiment, the predetermined mode may be the planar mode.

Also, depending on whether the mode of the neighboring location is beyond a threshold angle or whether the index of the mode of the neighboring location is beyond a threshold, candIntraPredModeX may be configured. For example, if the index of the mode of the neighboring location is greater than a diagonal mode index, candIntraPredModeX may be configured to be the vertical mode index. In addition, if the index of the mode of the neighboring location is less than or equal to the diagonal mode index and corresponds to the directional mode, candIntraPredModeX may be configured to be the horizontal mode index. The diagonal mode index may be mode 34 in FIG. 6.

If the mode of the neighboring location is the planar mode or the DC mode, candIntraPredModeX may be configured to be the planar mode or the DC mode as it is.

Referring to FIG. 19, mh_intra_flag may be signaling indicating whether multi-hypothesis prediction is used (or has been used). An intra prediction mode used in a neighboring block may be X. In addition, the current block may use multi-hypothesis prediction, and a candidate list may be generated using candIntraPredMode based on the mode of the neighboring block, wherein the neighboring block does not use multi-hypothesis prediction, and therefore candIntraPredMode may be configured to be the DC mode that is the preconfigured mode, irrespective of an intra prediction mode of the neighboring block or irrespective of whether the neighboring block uses intra prediction.

An example of the method of referencing a neighboring mode described above will be described again in the following.

For X being replaced by either A or B, the variables candIntraPredModeX are derived as follows:

1. The availability derivation process for a block as specified in Neighbouring blocks availability checking process is invoked with the location (xCurr, yCurr) set equal to (xCb, yCb) and the neighbouring location (xNbY, yNbY) set equal to (xNbX, yNbX) as inputs, and the output is assigned to availableX.

2. The candidate intra prediction mode candIntraPredModeX is derived as follows:

A. If one or more of the following conditions are true, candIntraPredModeX is set equal to INTRA_DC.
  a. The variable availableX is equal to FALSE.
  b. mh_intra_flag[xNbX][yNbX] is not equal to 1.
  c. X is equal to B and yCb−1 is less than ((yCb >>CtbLog 2SizeY)<<CtbLog 2SizeY).

B. Otherwise, if IntraPredModeY[xNbX][yNbX]>INTRA_ANGULAR34, candIntraPredModeX is set equal to INTRA_ANGULAR50.

C. Otherwise, if IntraPredModeY[xNbX][yNbX]<=INTRA_ANGULAR34 and IntraPredModeY[xNbX][yNbX]>INTRA_DC, candIntraPredModeX is set equal to INTRA_ANGULAR18.

D. Otherwise, candIntraPredModeX is set equal to IntraPredModeY[xNbX][yNbX].

In the aforementioned list configuration method, candIntraPredModeX may be determined according to the method of referencing a neighboring mode.

FIG. 20 is a diagram illustrating a method of generating a candidate list according to an embodiment of the present disclosure.

According to the methods of generating list1 and list2, which are described in FIG. 13 to FIG. 17, list1 may be generated by referring to a neighboring mode of the current block, and a mode that is not included in list1 from among candidate modes may be added to list2. Since there is spatial similarity in a picture, referring to a neighboring mode may correspond to a high priority. That is, list1 may have a higher priority than list2. However, according to the methods of signaling list1 and list2, which are described in FIG. 13 to FIG. 17, if signaling for determination of a list is not inferred, signaling is performed using a flag and an index in order to use a mode in list1, and only a flag may be used to use a mode in list2. That is, signaling of list2 may use fewer bits. However, the fact that a larger number of bits are used for signaling a mode in the list having a higher priority may be inefficient in terms of coding efficiency. Therefore, as in the present disclosure, there may be a method of using signaling with fewer bits for a list and mode with a high priority.

According to an embodiment of the present disclosure, depending on whether only list1 is available, a method of generating a candidate list may vary. Whether only list1 is available may indicate whether signaling, which indicates a list to be used, is inferred. For example, when there is list3 generated by a preconfigured method with candidate modes, list3 may be divided into list1 and list2. For example, list3 generated by the preconfigured method and the generation method may correspond to candModeList and the generation method thereof described above. If signaling indicating a list to be used is inferred, only list1 may be used, and in this case, list1 may be filled with list3 from the front part thereof. In addition, if signaling indicating a list to be used is not inferred, list1 or list2 may be used, and in this case, list2 may be filled with list3 from the front part thereof, and list1 may be filled with the remaining part. When list1 is filled, it is also possible to fill list1 according to the order of list3. That is, candIntraPredModeX may be added to a candidate list with reference to a neighboring mode of the current block, wherein if signaling indicating the list is inferred, candIntraPredModeX may be added to list1 and, if the signaling is not inferred, candIntraPredModeX may be added to list2. A size of list2 may be 1, in which case, if signaling indicating the list is inferred, candIntraPredModeA may be added to list1 and, if the signaling is not inferred, candIntraPredModeA may be added to list2. candIntraPredModeA may be list3[0] which is the foremost mode in list3. Therefore, in the present disclosure, candIntraPredModeA, which is a mode based on a neighboring mode, may be added as it is to both list1 and list2 depending on the case. Conversely, according to the methods described in FIG. 13 to FIG. 17, candIntraPredModeA is added to only list1. According to the present disclosure, depending on whether signaling indicating a list to be used is inferred, a method of generating list1 may be differently configured.

Referring to FIG. 20, candidate modes may be candidates that may be used for generating intra prediction of multi-hypothesis prediction. Depending on whether list1_flag, which is signaling indicating a list to be used, is inferred, a candidate list generating method may vary. If the signaling is inferred, it is inferred that list1 is used, and since only list1 can be used, list3 may be added to list1 starting from the foremost mode thereof. When list3 is generated, a mode based on a neighboring mode may be added to the top. If the signaling is not inferred, both list1 and list2 may be used, and therefore list3 may be added, from the foremost mode thereof, to list2 of less signaling. If list1 is needed, for example, if use of list1 is signaled, list3, from which the part included in list2 has been excluded, may be added to list1.

Although there is a part described using list3 in the present disclosure, this may be a conceptual explanation, and it is possible to generate list1 and list2 without actually storing list3.

A method of generating a candidate list according to the embodiments described below and the methods of generating a candidate list, which are described in FIG. 16 and FIG. 17, may be adaptively used. For example, one of two methods of generating a candidate list may be selected, depending on whether signaling indicating a list to be used is inferred. This may correspond to the case of multi-hypothesis prediction. In addition, list1 may include three modes, and list2 may include one mode. In the mode signaling method, as described in FIG. 13 to FIG. 16, a mode in list1 may be signaled using a flag and an index, and a mode in list2 may be signaled using a flag.

According to an embodiment, if candIntraPredModeA and candIntraPredModeB are identical, and candIntraPredModeA is the planar mode or the DC mode, it is possible that List2[0]=planar mode, List1 [0]=DC mode, List1 [1]=vertical mode, and List1 [2]=horizontal mode.

According to another embodiment, if candIntraPredModeA and candIntraPredModeB are identical, and candIntraPredModeA is the planar mode or the DC mode, it is possible that List2[0]=candIntraPredModeA, List1 [0]=!candIntraPredModeA, List1 [1]=vertical mode, and List1 [2]=horizontal mode.

As an embodiment, if candIntraPredModeA and candIntraPredModeB are identical, and candIntraPredModeA is the directional mode, it is possible that List2[0]=candIntraPredModeA, List1[0]=planar mode, List1[1]=DC mode, and List1[2]=vertical mode.

In an embodiment, if candIntraPredModeA and candIntraPredModeB are different, List2[0]=candIntraPredModeA, and List1[0]=candIntraPredModeB. A mode, which is other than candIntraPredModeA and candIntraPredModeB, may be first added to list1 [1] and list1 [2] from among the planar mode, the DC mode, the vertical mode, and the horizontal mode.

Figure 21:
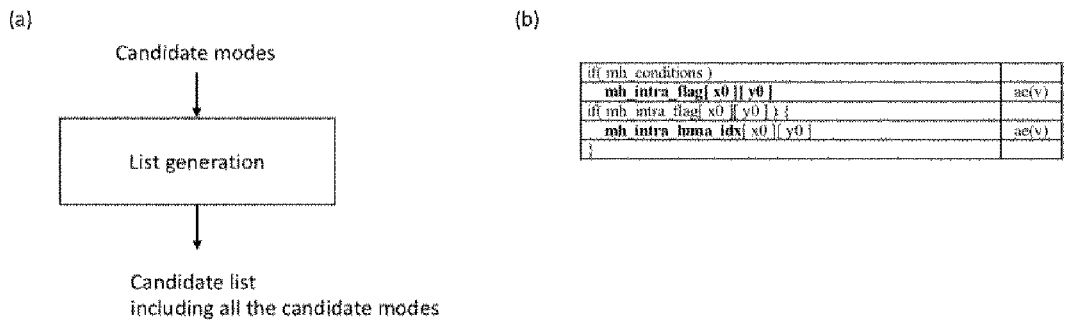
FIG. 21 is a diagram illustrating a method of generating a candidate list according to an embodiment of the present disclosure.

FIG. 21 is a diagram illustrating a method of generating a candidate list according to an embodiment of the present disclosure.

In the aforementioned embodiments, the method of determining a mode based on multiple lists has been described. In the invention of FIG. 21, a mode may be determined based on one list instead of multiple lists.

Referring to FIG. 21, as shown in FIG. 21(a), one candidate list including all candidate modes of multi-hypothesis prediction may be generated. Referring to FIG. 21(a), since there is one candidate list, signaling for selecting a list does not exist, and there may be index signaling indicating a mode to be used from among modes in the candidate list. Therefore, if mh_intra_flag indicating whether multi-hypothesis prediction is used is "1", mh_intra_luma_idx that is a candidate index may be parsed.

According to an embodiment, a method of generating a candidate list for multi-hypothesis prediction may be based on a method of generating an MPM list in existing intra prediction.

According to an embodiment, the method of generating a candidate list for multi-hypothesis prediction may be configured in the form of a list in which list1 and list2 are combined sequentially in the method of generating list1 and list2 described in FIG. 17. That is, if the candidate list of multi-hypothesis prediction is referred to as candModeList, a size of candModeList may be 4 in the embodiment. If candIntraPredModeA and candIntraPredModeB are identical, and correspond to the planar mode or the DC mode, candModeList may be determined in a predetermined order. For example, candModeList[0]=planar mode, candModeList[1]=DC mode, candModeList[2]=vertical mode, and candModeList[3]=horizontal mode.

According to another embodiment, if candIntraPredModeA and candIntraPredModeB are identical, and correspond to the planar mode or the DC mode, it may be configured that candModeList[0]=candIntraPredModeA, candModeList[1]=!candIntraPredModeA, candModeList[2]=vertical mode, and candModeList[3]=horizontal mode.

If candIntraPredModeA and candIntraPredModeB are identical, and correspond to the directional mode, it may be configured that candModeList[0]=candIntraPredModeA, candModeList[1]=planar mode, candModeList[2]=DC mode, and candModeList[3]=mode, which is other than candIntraPredModeA, planar mode, and non-DC mode.

If candIntraPredModeA and candIntraPredModeB are different, candModeList[0]=candIntraPredModeA, and candModeList[1]=candIntraPredModeB. In candModeList[2] and candModeList[3], a mode, which is other than candIntraPredModeA and candIntraPredModeB, may be added sequentially according to a predetermined order of the candidate modes. The predetermined order may be a sequence of the planar mode, the DC mode, the vertical mode, and the horizontal mode.

According to an embodiment of the present disclosure, the candidate list may vary depending on a block size condition. If a greater value among the width and the height of a block is greater than n times the other, the candidate list may be shorter. For example, if the width is greater than n times the height, the horizontal mode may be removed from the candidate list described in FIG. 21, and the candidate list may be filled with a mode subsequent to the horizontal mode. In addition, if the height is greater than n times the width, the vertical mode may be removed from the candidate list described in FIG. 21, and the candidate list may be filled with a mode subsequent to the vertical mode. Therefore, if the width is greater than n times the height, the size of the candidate list may be 3. In addition, if the width is greater than n times the height, the size of the candidate list may have a value smaller than or equal to that of otherwise.

According to an embodiment of the present disclosure, variable length coding may be performed on a candidate index in the embodiment of FIG. 21. This may be to increase signaling efficiency by adding, to the front part of the list, a mode that is more likely to be used.

According to another embodiment, fixed length coding may be performed on the candidate index in the embodiment of FIG. 21. The number of modes used in multi-hypothesis prediction may be 2 to an nth power. For example, as described above, four intra prediction modes may be used. In this case, since an unassigned value does not occur even with fixed length coding, it may be because an unnecessary part is not generated in signaling. If fixed length coding is performed, the number of cases of list construction may be 1. This is because the number of bits is the same regardless of an index to be signaled.

According to an embodiment, in some cases, variable length coding or fixed length coding may be performed on a candidate index. For example, as in the aforementioned embodiments, the size of the candidate list may vary in some cases. According to an embodiment, variable length coding or fixed length coding may be performed on the candidate index depending on the size of the candidate list. For example, if the size of the candidate list corresponds to 2 to the nth power, fixed length coding may be performed, and variable length coding may be performed otherwise. That is, according to the aforementioned embodiments, a coding method may vary depending on a block size condition.

According to an embodiment of the present disclosure, if the DC mode is used when multi-hypothesis prediction is used, weights between multiple predictions may be the same with respect to the entire block, and thus a result may be identical or similar to that of adjusting a weight for a prediction block. Accordingly, the DC mode may be excluded from multi-hypothesis prediction.

According to an embodiment, only the planar mode, the vertical mode, and the horizontal mode can be used in multi-hypothesis prediction. In this case, as described in FIG. 21, it is possible to signal multi-hypothesis prediction by using a single list. Variable length coding may be used for index signaling. According to an embodiment, a list may be generated in a fixed order. For example, the fixed order may be a sequence of the planar mode, the vertical mode, and the horizontal mode. According to another embodiment, a list may be generated by referring to a neighboring mode of the current block. For example, if candIntraPredModeA and candIntraPredModeB are identical, candModeList[0]=candIntraPredModeA. If candIntraPredModeA and candIntraPredModeB are identical, and candIntraPredModeA is the planar mode, candModeList[1] and candModeList[2] may be configured in a predetermined order. If candIntraPredModeA and candIntraPredModeB are identical, and candIntraPredModeA is other than the planar mode, candModeList[1]=planar mode, and candModeList[2]=mode, which is other than candIntraPredModeA and the planar mode. If candIntraPredModeA and candIntraPredModeB are different, candModeList[0]=candIntraPredModeA, candModeList[1]=candIntraPredModeB, and candModeList[2]=mode, which is other than candIntraPredModeA and candIntraPredModeB.

According to another embodiment, only three modes may be used in multi-hypothesis prediction. It is possible that the three modes include the planar mode and the DC mode. It is possible that the three modes include one of the vertical mode and the horizontal mode according to a condition. The condition may be associated with a block size. For example, which one of the horizontal mode and the vertical mode is to be included may be determined according to which one of the width and the height of the block has a greater value. For example, if the width of the block is greater than the height, the vertical mode may be included. If the height of the block is greater than the width, the horizontal mode may be included. If the height and the width of the block are identical, a predetermined mode among the vertical mode and the horizontal mode may be included.

According to an embodiment, a list may be generated in a fixed order. For example, the fixed order may be a sequence of the planar mode, the DC mode, and the vertical mode or the horizontal mode. According to another embodiment, a list may be generated by referring to a neighboring mode of the current block. For example, if candIntraPredModeA and candIntraPredModeB are identical, candModeList[0]=candIntraPredModeA. If candIntraPredModeA and candIntraPredModeB are identical, and candIntraPredModeA is other than the directional mode, candModeList[1] and candModeList[2] may be configured according to a predetermined order. If candIntraPredModeA and candIntraPredModeB are identical, and candIntraPredModeA is the directional mode, candModeList[1]=planar mode and candModeList[2]=DC mode. If candIntraPredModeA and candIntraPredModeB are different, candModeList[0]=candIntraPredModeA, candModeList[1]=candIntraPredModeB, and candModeList[2]=mode, which is other than candIntraPredModeA and candIntraPredModeB.

According to another embodiment of the present disclosure, only two modes can be used in multi-hypothesis prediction. The two modes may include the planar mode. The two modes may include one of the vertical mode and the horizontal mode according to a condition. The condition may be associated with a block size. For example, which one of the modes between the horizontal mode and the vertical mode is to be included may be determined according to which one of the width and the height of the block has a greater value. For example, if the width of the block is greater than the height, the vertical mode may be included. If the height of the block is greater than the width, the horizontal mode may be included. If the height and the width of the block are identical, a predetermined mode between the vertical mode and the horizontal mode may be included. In this case, a flag indicating a mode to be used in multi-hypothesis prediction may be signaled. According to an embodiment, a specific mode may be excluded according to a block size. For example, if a block size is small, a specific mode may be excluded. For example, if the block size is small, only the planar mode can be used in multi-hypothesis prediction. If a specific mode is excluded, it is possible to omit mode signaling or to perform signaling in a reduced state.

According to another embodiment of the present disclosure, it is possible to use only one mode in multi-hypothesis prediction. The one mode can be the planar mode. As another embodiment, the one mode can be determined based on a block size among the vertical mode and the horizontal mode. For example, one of the vertical mode and the horizontal mode may be determined as the mode depending on which one of the width and the height of the block has a greater value. For example, if the width of the block is greater than the height, the vertical mode may be determined as the mode, and if the height of the block is greater than the width, the horizontal mode may be determined as the mode. If the width and the height of the block are identical, a predetermined mode may be determined as the mode. If the width and the height of the block are identical, it is possible to determine, as the mode, a predetermined mode among the horizontal mode and the vertical mode. If the width and the height of the block are identical, it is possible to determine, as the mode, a predetermined mode among the planar mode and the DC mode.

In addition, according to an embodiment of the present disclosure, flipping signaling for flipping of prediction generated in multi-hypothesis prediction may exist. Accordingly, although one mode is selected in multi-hypothesis prediction, flipping may eliminate the residual on the opposite side. Through this, candidate modes available in multi-hypothesis prediction may be decreased. More particularly, for example, it is possible to use flipping for a case of using only one mode among the embodiments. Accordingly, the performance of prediction may be increased. The flipping may refer to flipping with respect to the x axis, flipping with respect to the y axis, or flipping with respect to both the x axis and the y axis. As an embodiment, it is possible to determine a flipping direction based on a selected mode in multi-hypothesis prediction. For example, if the selected mode in multi-hypothesis prediction is the planar mode, the flipping may be determined to be with respect to both the x axis and the y axis. Flipping with respect to both the x axis and the y axis may be based on a block shape. For example, if the block is not a square, it may be determined that flipping is not performed with respect to both the x axis and the y axis. For example, if the selected mode in multi-hypothesis prediction is the horizontal mode, it may be determined that the flipping is with respect to the x axis. For example, if the selected mode in multi-hypothesis prediction is the vertical mode, it may be determined that the flipping is with respect to the y axis. If the selected mode in multi-hypothesis prediction is the DC mode, it is possible to determine that no flipping exists and not to perform explicit signaling.

The DC mode in multi-hypothesis prediction may have an effect similar to that of illumination compensation. Therefore, according to an embodiment of the present disclosure, if one of the illumination compensation and the DC mode in multi-hypothesis prediction is used, the other may not be used.

In addition, multi-hypothesis prediction may have an effect similar to that of generalized bi-prediction (GBi). For example, in multi-hypothesis prediction, the DC mode may have an effect similar to that of generalized bi-prediction (GBi). Generalized bi-prediction may be a technique that adjusts weights between two reference blocks of bi-prediction in units of blocks and in units of Cus. Therefore, according to an embodiment of the present disclosure, if one of multi-hypothesis prediction (or the DC mode in multi-hypothesis prediction) and generalized bi-prediction is used, the other may not be used. This may be a case of including bi-prediction in predictions of multi-hypothesis prediction. For example, if a selected merge candidate of multi-hypothesis prediction is bi-prediction, generalized bi-prediction may not be used. In the embodiments, the relationship between multi-hypothesis prediction and generalized bi-prediction may be limited to a case in which a specific mode of multi-hypothesis prediction, for example, the DC mode, is used. Alternatively, when generalized bi-prediction-related signaling is present before than multi-hypothesis prediction-related signaling, if generalized bi-prediction is used, multi-hypothesis prediction or a specific mode of multi-hypothesis prediction may not be used.

Using no certain method may indicate that signaling for the specific method is not performed and a related syntax is not parsed.

Figure 22:
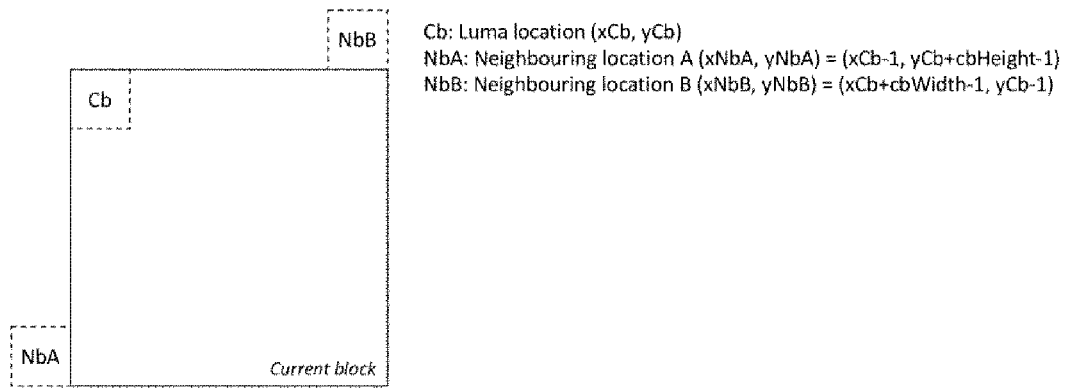
FIG. 22 is a diagram illustrating neighboring locations referenced in multi-hypothesis prediction according to an embodiment of the present disclosure.

FIG. 22 is a diagram illustrating neighboring locations referenced in multi-hypothesis prediction according to an embodiment of the present disclosure.

As described above, during the procedure of generating a candidate list for multi-hypothesis prediction, neighboring locations may be referenced. For example, aforementioned candIntraPredModeX may be needed. Locations of A and B adjacent to a current block may be NbA and NbB as shown in FIG. 22. If the location of the top-left of the current block is Cb as illustrated in FIG. 18, and when coordinates thereof are (xCb, yCb), NbA may be that (xNbA, yNbA)=(xCb−1, yCb+cbHeight−1), and NbB may be that (xNbB, yNbB)= (xCb+cbWidth−1, yCb−1). Here, cbWidth and cbHeight may be the width and the height of the current block, respectively. A neighboring location in the procedure of generating a candidate list of multi-hypothesis prediction may be the same as a neighboring location referenced when an MPM list of intra prediction is generated.

According to another embodiment, a neighboring location referenced during the procedure of generating a candidate list of multi-hypothesis prediction may be near the left center and upper center of the current block. For example, NbA and NbB may be (xCb−1, yCb+cbHeight/2−1) and (xCb+cbWidth/2−1, yCb−1). Alternatively, NbA and NbB may be xCb−1, yCb+cbHeight/2) and (xCb+cbWidth/2, yCb−1).

Figure 23:
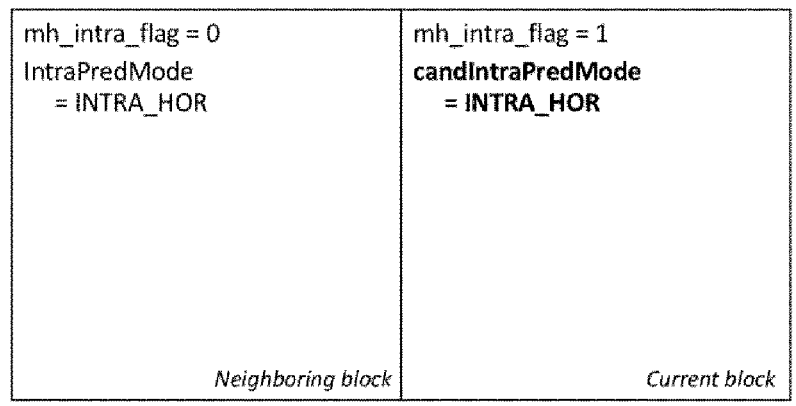
FIG. 23 is a diagram illustrating a method of referencing neighboring modes according to an embodiment of the present disclosure.

FIG. 23 is a diagram illustrating a method of referencing neighboring modes according to an embodiment of the present disclosure.

As described above, a neighboring location may be referenced during the procedure of generating a candidate list of multi-hypothesis prediction. In the embodiment of FIG. 19, in the case where multi-hypothesis prediction is not used for a neighboring location, candIntraPredModeX is configured to be a preconfigured mode. This may be because the mode of the neighboring location may not be candIntraPredModeX as it is when candIntraPredModeX is configured.

Therefore, according to an embodiment of the present disclosure, although multi-hypothesis prediction is not used for the neighboring location, if a mode used for the neighboring location is a mode used for multi-hypothesis prediction, candIntraPredModeX may be configured to be the mode used for the neighboring location. The mode used for multi-hypothesis prediction may be the planar mode, the DC mode, the vertical mode, and the horizontal mode.

Alternatively, although multi-hypothesis prediction is not used for the neighboring location, if the mode used for the neighboring location is a specific mode, candIntraPredModeX may be configured to be the mode used for the neighboring location.

Alternatively, although multi-hypothesis prediction is not used for the neighboring location, if the mode used for the neighboring location is the vertical mode or the height mode, candIntraPredModeX may be configured to be the mode used for the neighboring location. Alternatively, in a case where the neighboring location is on the upper side of the current block, although multi-hypothesis prediction is not used for the neighboring location, if the mode used for the neighboring location is the vertical mode, candIntraPredModeX may be configured to be the mode used for the neighboring location. Alternatively, in a case where the neighboring location is on the left side of the current block, although multi-hypothesis prediction is not used for the neighboring location, if the mode used for the neighboring location is the horizontal mode, candIntraPredModeX may be configured to be the mode used for the neighboring location.

Referring to FIG. 23, mh_intra_flag may be signaling indicating whether multi-hypothesis prediction is used (or has been used). An intra prediction mode used in a neighboring block may be the horizontal mode. The current block may use multi-hypothesis prediction, and a candidate list may be generated using candIntraPredMode that is based on the mode of the neighboring block, wherein although multi-hypothesis prediction is not used in the neighboring block, the intra prediction mode of the neighboring block is a specific mode, for example, the horizontal mode, and candIntraPredMode may be thus configured to be the horizontal mode.

Hereinafter, the example of the method of referencing a neighboring mode described above will be described again, in combination with another embodiment of FIG. 19.

For X being replaced by either A or B, the variables candIntraPredModeX are derived as follows:

1. The availability derivation process for a block as specified in Neighbouring blocks availability checking process is invoked with the location (xCurr, yCurr) set equal to (xCb, yCb) and the neighbouring location (xNbY, yNbY) set equal to (xNbX, yNbX) as inputs, and the output is assigned to availableX.

2. The candidate intra prediction mode candIntraPredModeX is derived as follows:

A. If one or more of the following conditions are true, candIntraPredModeX is set equal to INTRA_DC.
  a. The variable availableX is equal to FALSE.
  b. mh_intra_flag[xNbX][yNbX] is not equal to 1, and IntraPredModeY[xNbX][yNbX] is neither INTRA_ANGULAR50 nor INTRA_ANGULAR18.
  c. X is equal to B and yCb−1 is less than ((yCb>>CtbLog 2SizeY)<<CtbLog 2SizeY).

B. Otherwise, if IntraPredModeY[xNbX][yNbX]>INTRA_ANGULAR34, candIntraPredModeX is set equal to INTRA_ANGULAR50.

C. Otherwise, if IntraPredModeY[xNbX][yNbX]<=INTRA_ANGULAR34 and IntraPredModeY[xNbX][yNbX]>INTRA_DC, candIntraPredModeX is set equal to INTRA_ANGULAR18.

D. Otherwise, candIntraPredModeX is set equal to IntraPredModeY[xNbX][yNbX].

The following is another embodiment.

For X being replaced by either A or B, the variables candIntraPredModeX are derived as follows:

1. The availability derivation process for a block as specified in Neighbouring blocks availability checking process is invoked with the location (xCurr, yCurr) set equal to (xCb, yCb) and the neighbouring location (xNbY, yNbY) set equal to (xNbX, yNbX) as inputs, and the output is assigned to availableX.

2. The candidate intra prediction mode candIntraPredModeX is derived as follows:

A. If one or more of the following conditions are true, candIntraPredModeX is set equal to INTRA_DC.
  a. The variable availableX is equal to FALSE.
  b. mh_intra_flag [xNbX][yNbX] is not equal to 1, and IntraPredModeY[xNbX][yNbX] is neither INTRA_PLANAR, INTRA_DC, INTRA_ANGULAR50 nor INTRA_ANGULAR18.
  c. X is equal to B and yCb−1 is less than ((yCb>>CtbLog 2SizeY)<<CtbLog 2SizeY).

B. Otherwise, if IntraPredModeY[xNbX][yNbX]>INTRA_ANGULAR34, candIntraPredModeX is set equal to INTRA_ANGULAR50.

C. Otherwise, if IntraPredModeY[xNbX][yNbX]<=INTRA_ANGULAR34 and IntraPredModeY[xNbX][yNbX]>INTRA_DC, candIntraPredModeX is set equal to INTRA_ANGULAR18.

D. Otherwise, candIntraPredModeX is set equal to IntraPredModeY[xNbX][yNbX].

In the aforementioned list configuration method, candIntraPredModeX may be determined according to the method of referring to a neighboring mode.

Figure 24:
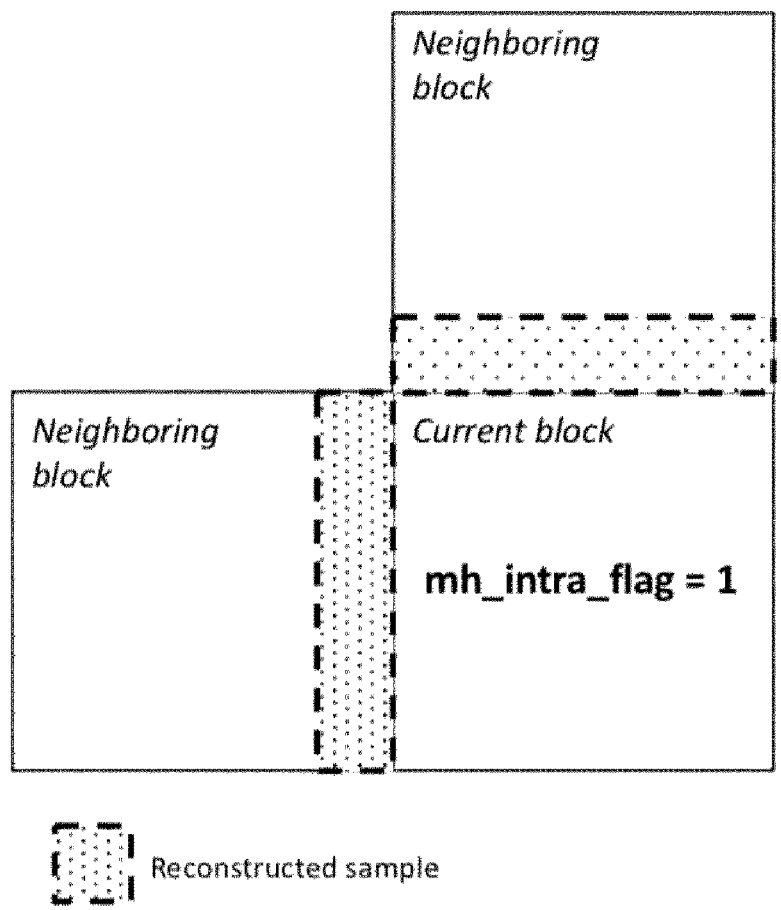
FIG. 24 is a diagram illustrating use of a neighboring sample according to an embodiment of the present disclosure.

FIG. 24 is a diagram illustrating use of a neighboring sample according to an embodiment of the present disclosure.

As described above, if multi-hypothesis prediction is used, intra-prediction may be used in combination with another prediction. Therefore, if multi-hypothesis prediction is used, intra prediction may be generated using a neighboring sample of the current block as a reference sample.

According to an embodiment of the present disclosure, a mode using a reconstructed sample may be used if multi-hypothesis prediction is used. In addition, a mode using a reconstructed sample may not be used if multi-hypothesis prediction is not used. The reconstructed sample may be a reconstructed sample adjacent to the current block.

An example of a mode using the reconstructed sample may include template matching. Reconstructed samples at a preconfigured location based on a certain block may be defined as a template. Template matching may be an operation of comparing costs between the template of the current block and templates of blocks to be compared with, so as to find a block with a low cost. In this case, the costs may be defined as the sum of absolute differences of the template, the sum of the squares of the differences, etc. For example, it is possible to search for a block expected to be similar to the current block by performing template matching between the current block and blocks in a reference picture, and a motion vector may be configured or refined based thereon.

Examples of a mode using the reconstructed sample may include motion vector refinement and motion compensation using a reconstructed sample, etc.

In order to use the reconstructed sample adjacent to the current block, it is necessary, when decoding the current block, to wait for completion of decoding of neighboring blocks. In this case, it may be difficult to perform parallel processing of the current block and the neighboring blocks. Therefore, if multi-hypothesis prediction is not used, a mode using the reconstructed sample adjacent to the current block may not be used to enable parallel processing. If multi-hypothesis prediction is used, intra prediction may be generated using the reconstructed sample adjacent to the current block, and thus another mode using the reconstructed sample adjacent to the current block may also be used.

According to an embodiment of the present disclosure, although multi-hypothesis prediction is used, it is possible to vary, depending on a candidate index, whether the reconstructed sample adjacent to the current block is available. As an embodiment, if the candidate index has a value smaller than a threshold, the reconstructed sample adjacent to the current block may be available. If the candidate index has a small value, the number of candidate index signaling bits may be small, candidate accuracy may be high, and it is possible to further increase accuracy by using the reconstructed sample for high coding efficiency. According to another embodiment, if the candidate index is greater than the threshold, the reconstructed sample adjacent to the current block may be available. If the candidate index is large, the number of candidate index signaling bits may be large and candidate accuracy may be low, and accuracy may be supplemented by using the reconstructed sample adjacent to the current block for a candidate with low accuracy.

According to an embodiment of the present disclosure, if multi-hypothesis prediction is used, it is possible to generate inter prediction by using the reconstructed sample adjacent to the current block and generate a prediction block by combining the inter prediction with intra prediction of multi-hypothesis prediction.

Referring to FIG. 24, a value of mh_intra_flag which is signaling indicating whether the current block uses multi-hypothesis prediction is 1. The current block uses multi-hypothesis prediction, and a mode using reconstructed samples adjacent to the current block may be thus used.

Figures 25, 26:
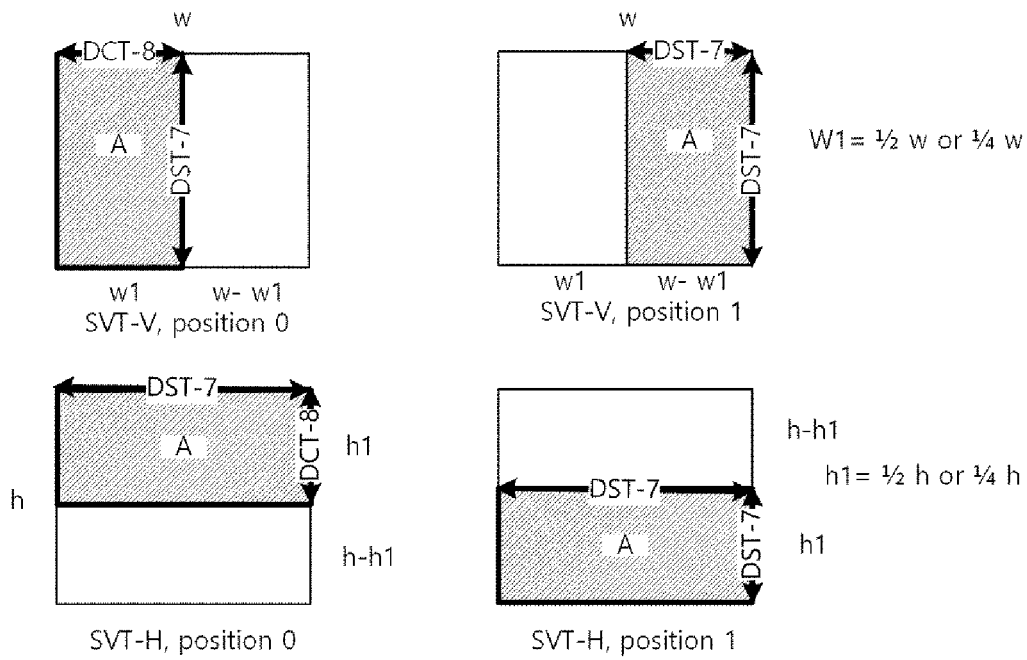
FIG. 25 is a diagram illustrating a transform mode according to an embodiment of the present disclosure.
FIG. 26 is a diagram illustrating a relationship between multi-hypothesis prediction and a transform mode according to an embodiment of the present disclosure.

FIG. 25 is a diagram illustrating a transform mode according to an embodiment of the present disclosure.

According to an embodiment of the present disclosure, there may be a transform mode for transforming of only a sub-part of a block. This transform mode may be referred to as a subblock transform (SBT) or a spatially varying transform (SVT). For example, a CU or a PU may be divided into multiple TUs, and only some of the multiple TUs may be transformed. For example, only one TU among the multiple TUs may be transformed. A TU that is not transformed among the multiple TUs may be configured to have a residual of 0.

Referring to FIG. 25, SBT-V and SBT-H may correspond to two types of division of a single CU or PU into multiple Tus. According to SVT-V, heights of multiple TUs are the same as a height of a CU or PU, and widths of the multiple TUs are different from a width of the CU or PU. According to SVT-H, the heights of the multiple TUs are different from the height of the CU or PU, and the widths of the multiple TUs are the same as the width of the CU or PU. According to an embodiment, the width and the location of a TU for SVT-V transform may be signaled. The height and the location of a TU for SVT-H transform may be signaled.

According to an embodiment, a transform kernel according to an SVT type, a location, a width, or a height may be preconfigured.

As described above, the mode for transforming of only a part of a CU or PU may exist because it is possible that a residual after prediction is mainly present in a part of a CU or PU.

That is, the SBT may have the same concept as a skip mode for a TU. The existing skip mode may be a skip mode for a CU.

Referring to FIG. 25, a location that is to be transformed and is marked with A is defined in two places for each type of SVT-V and SVT-H, and the width or the height may be defined to be ½ or ¼ of the width of a CU or the height of a CU. A part other than the area marked with A may be configured to have a residual of 0.

There may be conditions under which SBT available. For example, conditions enabling SBT may include a condition associated with a block size, a signaling value of availability in a high level (e.g., sequence, slice, tile, etc.) syntax, and the like.

FIG. 26 is a diagram illustrating a relationship between multi-hypothesis prediction and a transform mode according to an embodiment of the present disclosure.

According to an embodiment of the present disclosure, there may be an association between multi-hypothesis prediction and a transform mode. For example, depending on which one of them is used, whether the other one is to be used may be determined. Alternatively, depending on the mode of any one of them, whether the mode of the other is to be used may be determined. Alternatively, depending on which one of them is used, whether the mode of the other is to be used may be determined.

According to an embodiment, the transform mode may be SVT of FIG. 25. That is, depending on whether multi-hypothesis prediction is used, whether SVT is to be used may be determined. Alternatively, depending on whether SVT is used, whether multi-hypothesis prediction is to be used may be determined. This is because, through multi-hypothesis prediction, the performance of prediction of the entire block may be improved, and the phenomenon in which a residual is concentrated only in a part of the block may less frequently occur.

According to an embodiment of the present disclosure, depending on whether multi-hypothesis prediction is used or a mode of multi-hypothesis prediction, a location of a TU for SVT transform may be restricted. Alternatively, depending on whether multi-hypothesis prediction is used or the mode of multi-hypothesis prediction, the width (SBT-V) or height (SBT-H) of the TU for SVT transform may be restricted. Therefore, signaling relating to a location, a width, or a height may be reduced. For example, the location of the TU for SVT transform may be other than a part where a weight of intra prediction in multi-hypothesis prediction may has a large value. This is because a residual in the part with a large weight may be reduced by multi-hypothesis prediction. Therefore, when multi-hypothesis prediction is used, a mode for transforming of a part with a large weight may not exist in SVT. For example, if the horizontal mode or the vertical mode is used in multi-hypothesis prediction, it is possible to omit position 1 of FIG. 25. As another embodiment, if the planar mode is used in multi-hypothesis prediction, the location of the TU for SVT transform may be restricted. For example, if the planar mode is used in multi-hypothesis prediction, it is possible to omit position 0 of FIG. 25. This is because, if the planar mode is used in multi-hypothesis prediction, a part near a reference sample of intra prediction may have a value similar to a value of the reference sample, and accordingly the part near the reference sample may have a small residual.

According to another embodiment, if multi-hypothesis prediction is used, possible values of the width or height of the TU for SVT transform may vary. Alternatively, if a predetermined mode is used in multi-hypothesis prediction, possible values of the width or height of the TU for SVT transform may vary. For example, if multi-hypothesis prediction is used, there may not be a lot of residuals in a wide part of the block, and therefore a large value of the width or height of the TU for SVT transform may be excluded. Alternatively, if multi-hypothesis prediction is used, the width or height value of the TU for SVT transform, which is the same as a unit based on which a weight is changed in multi-hypothesis prediction, may be excluded.

Referring to FIG. 26, cu_sbt_flag indicating whether SBT is used and mh_intra_flag indicating whether multi-hypothesis prediction is used may exist. Referring to the drawing, if mh_intra_flag is 0, cu_sbt_flag may be parsed. If a case where cu_sbt_flag does not exist may be inferred to be 0.

Both SBT and combining of intra prediction in multi-hypothesis prediction may be to solve a problem that a lot of residuals may remain in only a part of a CU or PU, when the corresponding technology is not used. Accordingly, two technologies may be associated with each other, and thus whether one of the technologies is to be used, whether a specific mode of one technology is to be used, and the like may be determined based on information associated with the other technology.

In FIG. 26, sbtBlockConditions may indicate conditions under which SBT is possible. The conditions under which SBT is possible may include a condition associated with a block size, a signaling value of availability in a high level (e.g., sequence, slice, tile, etc.) syntax, and the like.

FIG. 27 is a diagram illustrating a relationship between color components according to an embodiment of the present disclosure.

Referring to FIG. 27, a color format may be indicated by chroma format information (chroma_format_idc), chroma format, separate_colour_plane_flag, and the like.

In a case of monochrome, only one sample array may exist. Both SubWidthC and SubHeightC may be 1.

In a case of 4:2:0 sampling, two chroma arrays may exist. In addition, a chroma array may have half the width and height of a luma array. Both width-related information (SubWidthC) and height-related information (SubHeightC) may be 2.

The width-related information (SubWidthC) and height-related information (SubHeightC) may indicate a size of the chroma array in comparison with a size of the luma array, and if the chroma array width or height is half the size of the luma array, the width-related information (SubWidthC) or the height-related information (SubHeightC) may be 2, and the width-related information (SubWidthC) or the height-related information (SubHeightC), in which the chroma array width or height has the same size as the luma array, may be 1.

In a case of 4:2:2 sampling, two chroma arrays may exist. In addition, the chroma array may have half the width of the luma array and the same height as that of the luma array. SubWidthC and SubHeightC may be 2 and 1, respectively.

In a case of 4:4:4 sampling, the chroma array may have the same width and height as those of the luma array. Both SubWidthC and SubHeightC may be 1. In this case, processing may vary based on separate_colour_plane_flag. If separate_colour_plane_flag is 0, the chroma array may have the same width and height as those of the luma array. If separate_colour_plane_flag is 1, three color planes (luma, Cb, and Cr) may be processed respectively. Regardless of separate_colour_plane_flag, both SubWidthC and SubHeightC may be 1 in the case of 4:4:4.

If separate_colour_plane_flag is 1, one corresponding to only a single color component can exist in a single slice. If separate_colour_plane_flag is 0, one corresponding to multiple color components can exist in a single slice.

Referring to FIG. 27, SubWidthC and SubHeightC can be different only in the case of 4:2:2. Therefore, in the case of 4:2:2, the relationship of a luma-based width to a luma-based height may be different from the relationship of a chroma-based width to a chroma-based height.

For example, when a luma sample-based width is widthL and a chroma sample-based width is widthC, if widthL corresponds to widthC, the relationship thereof may be as follows.
widthC=widthL/SubWidthC
i.e., widthL=widthC*SubWidthC Also, when a luma sample-based height is heightL and a chroma sample-based height is heightC, if heightL corresponds to heightC, the relationship thereof may be as follows.
heightC=heightL/SubHeightC
i.e., heightL=heightC*SubHeightC A value indicating (representing) a color component may exist. For example, cIdx may indicate a color component. For example, cIdx may be a color component index. If cIdx is 0, this may indicate a luma component. A cIdx of non-0 may indicate a chroma component. A cIdx of 1 may indicate a chroma Cb component. A cIdx of 2 may indicate a chroma Cr component.

Figure 28:
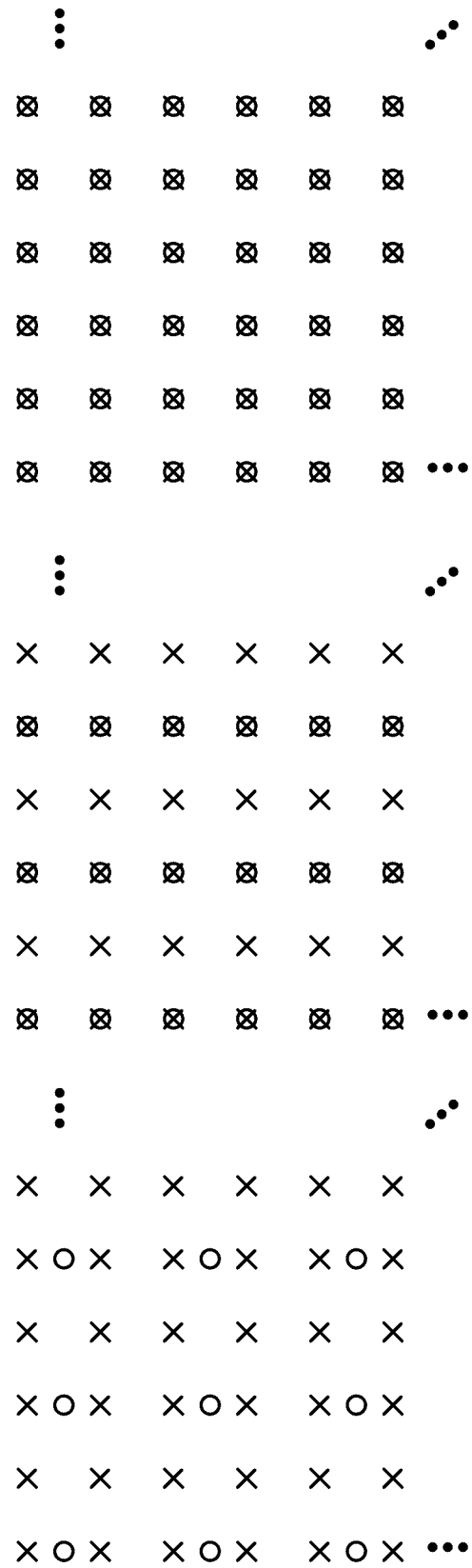
FIG. 28 is a diagram illustrating a relationship between color components according to an embodiment of the present disclosure.

FIG. 28 is a diagram illustrating a relationship between color components according to an embodiment of the present disclosure.

FIG. 28(a), FIG. 28(b), and FIG. 28(c) indicate cases of 4:2:0, 4:2:2, and 4:4:4, respectively.

Referring to FIG. 28(a), one chroma sample (one Cb and one Cr) may be disposed per two luma samples in the horizontal direction. One chroma sample (one Cb and one Cr) may be disposed per two luma samples in the vertical direction.

Referring to FIG. 28(b), one chroma sample (one Cb and one Cr) may be disposed per two luma samples in the horizontal direction. One chroma sample (one Cb and one Cr) may be disposed per luma sample in the vertical direction.

Referring to FIG. 28(c), one chroma sample (one Cb and one Cr) may be disposed per luma sample in the horizontal direction. One chroma sample (one Cb and one Cr) may be disposed per luma sample in the vertical direction.

As described above, SubWidthC and SubHeightC which have been described in FIG. 27 may be determined based on the aforementioned relationship, and transform between a luma sample reference and a chroma sample reference may be performed based on SubWidthC and SubHeightC.

Figure 29:
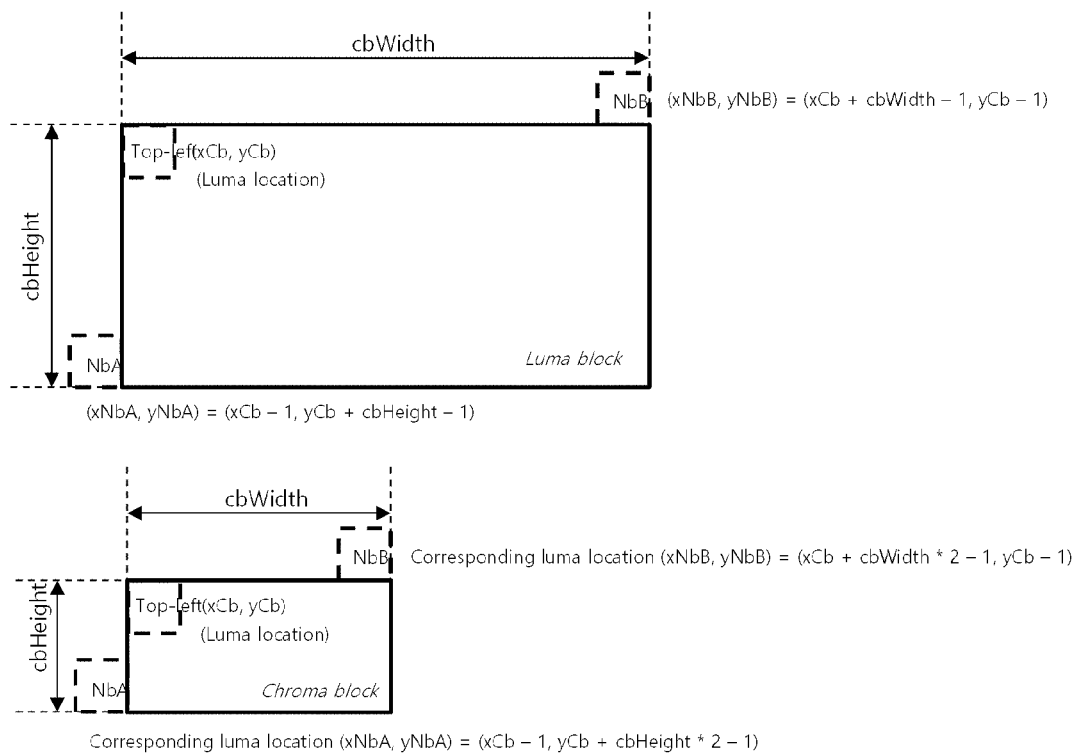
FIG. 29 is a diagram illustrating a neighboring reference location according to an embodiment of the present disclosure.

FIG. 29 is a diagram illustrating a neighboring reference location according to an embodiment of the present disclosure.

According to an embodiment of the present disclosure, a neighboring location may be referenced when prediction is performed. For example, as described above, a neighboring location may be referenced when CIIP is performed. CIIP may be multi-hypothesis prediction described above. CIIP may be combined inter-picture merge and intra-picture prediction. That is, CIIP may be a prediction method that combines inter prediction (e.g., merge mode inter prediction) with intra prediction.

According to an embodiment of the present disclosure, it is possible to combine inter prediction with intra prediction by referencing a neighboring location. For example, it is possible to determine a ratio of inter prediction to intra prediction by referencing a neighboring location. Alternatively, it is possible to determine weighting when combining inter prediction with intra prediction by referencing a neighboring location. Alternatively, it is possible to determine weighting when obtaining a weighted sum (weighted average) of inter prediction and intra prediction by referencing a neighboring location.

According to an embodiment of the present disclosure, the referenced neighboring location may include NbA and NbB. Coordinates of NbA and NbB may be (xNbA, yNbA) and (xNbB, yNbB), respectively.

NbA may be a location on the left of a current block. More specifically, if the coordinates of the top-left of the current block are (xCb, yCb), and the width and height of the current block are cbWidth and cbHeight, respectively, NbA may be (xCb−1, yCb+cbHeight−1). The coordinates (xCb, yCb) of the top-left of the current block may be values based on a luma sample. Alternatively, the top-left coordinates (xCb, yCb) of the current block may correspond to the location of a top-left sample luma of a current luma coding block associated with a top-left luma sample of a current picture. In addition, cbWidth and cbHeight may be values based on a corresponding color component. The aforementioned coordinates may be associated with a luma component (or a luma block). For example, cbWidth and cbHeight may be values based on a luma component.

In addition, NbB may be a location on the top of the current block. More specifically, the top-left coordinates of the current block are (xCb, yCb), and the width and height of the current block are cbWidth and cbHeight, respectively, NbB may be (xCb+cbWidth−1, yCb−1). The coordinates (xCb, yCb) of the top-left of the current block may be values based on a luma sample. Alternatively, the top-left coordinates (xCb, yCb) of the current block may correspond to the location of a top-left sample luma of a current luma coding block associated with a top-left luma sample of a current picture. In addition, cbWidth and cbHeight may be values based on a corresponding color component. The aforementioned coordinates may be associated with a luma component (or a luma block). For example, cbWidth and cbHeight may be values based on a luma component.

Referring to FIG. 29, with respect to a block shown in the upper part, which is indicated as a luma block, top-left, coordinates of NbA, coordinates of NbB, and the like are illustrated.

NbA may be a location on the left of a current block. More specifically, if the top-left coordinates of the current block are (xCb, yCb), and the width and height of the current block are cbWidth and cbHeight, respectively, NbA may be (xCb−1, yCb+2*cbHeight−1). The coordinates (xCb, yCb) of the top-left of the current block may be values based on a luma sample. Alternatively, the top-left coordinates (xCb, yCb) of the current block may correspond to the location of a top-left sample luma of a current luma coding block associated with a top-left luma sample of a current picture. In addition, cbWidth and cbHeight may be values based on a corresponding color component. The aforementioned coordinates may be associated with a chroma component (chroma block). For example, cbWidth and cbHeight may be values based on a chroma component. In addition, the coordinates may correspond to the case of 4:2:0 format.

In addition, NbB may be a location on the top of the current block. More specifically, if the top-left coordinates of the current block are (xCb, yCb), and the width and height of the current block are cbWidth and cbHeight, respectively, NbB may be (xCb+2*cbWidth−1, yCb−1). The coordinates (xCb, yCb) of the top-left of the current block may be values based on a luma sample. Alternatively, the top-left coordinates (xCb, yCb) of the current block may correspond to the location of a top-left sample luma of a current luma coding block associated with a top-left luma sample of a current picture. In addition, cbWidth and cbHeight may be values based on a corresponding color component. The aforementioned coordinates may be associated with a chroma component (chroma block). For example, cbWidth and cbHeight may be values based on a chroma component. In addition, the coordinates may correspond to the case of 4:2:0 format or 4:2:2 format.

Referring to FIG. 29, with respect to a block shown in the lower part, which is indicated as a chroma block, top-left, coordinates of NbA, coordinates of NbB, and the like are illustrated.

FIG. 30 is a diagram illustrating a weighted sample prediction process according to an embodiment of the present disclosure.

The embodiment of FIG. 30 may relate to a method of combining two or more prediction signals. The embodiment of FIG. 30 may be applied to a case in which CIIP is used. The embodiment of FIG. 30 may include the method of referencing a neighboring location, which has been described in FIG. 29.

Referring to equation (8-838) of FIG. 30, scale information (scallFact) may be described as follows.

scallFact=(cIdx==0)?0:1

That is, if information (cIdx) on a color component of a current block is 0, scale information (scallFact) may be configured to 0, and if the information (cIdx) on the color component of the current block is no 0, the scale information (scallFact) may be configured to 1. According to an embodiment of the present disclosure, if x is true or x is not 0, x?y:z may indicate a y value, and otherwise (x is false (or x is 0)), x?y:z may indicate a z value.

In addition, (xNbA, yNbA) and (xNbB, yNbB) which are coordinates of referenced neighboring locations NbA and NbB may be configured. According to the embodiment described with reference to FIG. 29, (xNbA, yNbA) and (xNbB, yNbB) for a luma component may be configured to be (xCb−1, yCb+cbHeight−1) and (xCb+cbWidth−1, yCb−1), respectively, and (xNbA, yNbA) and (xNbB, yNbB) for a chroma component may be configured to be (xCb−1, yCb+2*cbHeight−1) and (xCb+2*cbWidth−1, yCb−1), respectively. An operation of multiplying by 2^n may be equivalent to left shifting of n bits. For example, an operation of multiplying by 2 may be equivalent to left shifting of 1 bit. Left shifting of x by n bits may be expressed as "x<<n". An operation of dividing by 2^n may be equivalent to right shifting of n bits. An operation of dividing by 2^n and rounding down to the nearest whole number may be equivalent to right shifting of n bits. For example, an operation of dividing by 2 may be equivalent to right shifting of 1 bit. Right shifting of x by n bits may be expressed as "x>>n". Therefore, (xCb−1, yCb+2*cbHeight−1) and (xCb+2*cbWidth−1, yCb−1) may be expressed as ((xCb−1, yCb+(cbHeight<<1)−1) and (xCb+(cbWidth<<1)−1, yCb−1). Therefore, the aforementioned coordinates associated with the luma component and coordinates associated with the chroma component may be expressed together as follows.

(xNbA, yNbA)=(xCb−1, yCb+(cbHeight<<scallFact)−1)
(xNbB, yNbB)=(xCb+(cbWidth<<scallFact)−1, yCb−1)

Here, the scale information (scallFact) may be (cIdx==0)?0:1, as described above. In this case, cbWidth and cbHeight may be expressed based on each color component. For example, if the width and height based on a luma component are cbWidthL and cbHeightL, respectively, when a weighted sample prediction process for a luma component is performed, cbWidth and cbHeight may be cbWidthL and cbHeightL, respectively. Also, if the width and height based on a luma component are cbWidthL and cbHeightL, respectively, when a weighted sample prediction process for a chroma component is performed, cbWidth and cbHeight may be cbWidthL/SubWidthC and cbHeightL/SubHeightC, respectively.

According to an embodiment, a prediction mode of a corresponding location may be determined with reference to a neighboring location. For example, it may be determined whether the prediction mode is intra prediction. The prediction mode may be indicated by CuPredMode. If CuPredMode is MODE_INTRA, this may indicate that intra prediction is used. CuPredMode values can be MODE_INTRA, MODE_INTER, MODE_IBC, and MODE_PLT. If CuPredMode is MODE_INTER, intra prediction may be used. If CuPredMode is MODE_IBC, intra block copy (IBC) may be used. If CuPredMode is MODE_PLT, palette mode may be used. CuPredMode may be expressed according to a channel type (chType) and a location. For example, expression may be made as CuPredMode[chType][x][y], and this value may be a value of CuPredMode associated with a channel type chType at a location (x, y). In addition, chType may be based on a tree type. For example, the tree type (treeType) may be configured to the value of SINGLE_TREE, DUAL_TREE_LUMA, DUAL_TREE_CHROMA, or the like. In the case of SINGLE_TREE, there may be a part in which block partitioning of a luma component and a chroma component is shared. For example, in the case of SINGLE_TREE, a luma component and a chroma component may have identical block partitioning. Alternatively, in the case of SINGLE_TREE, a luma component and a chroma component may have identical or partially identical block partitioning. Alternatively, in the case of SINGLE_TREE, block partitioning of a luma component and block partitioning of a chroma component may be performed by the same syntax element value. In addition, in the case of DUAL TREE, block partitioning of a luma component and block partitioning of a chroma component may be independent. Alternatively, in the case of DUAL TREE, block partitioning of a luma component and block partitioning of a chroma component may be performed by different syntax element values. In the case of DUAL TREE, a treeType value may be DUAL_TREE_LUMA or DUAL_TREE_CHROMA. If treeType is DUAL_TREE_LUMA, this may indicate that DUAL TREE is used and that a process is associated with a luma component. If treeType is DUAL_TREE_CHROMA, this may indicate that DUAL TREE is used and that a process is associated with a chroma component. In addition, chType may be determined based on whether the tree type is DUAL_TREE_CHROMA. For example, chType may be configured to 1 if treeType is DUAL_TREE_CHROMA, and may be configured to 0 if treeType is other than DUAL_TREE_CHROMA. Therefore, referring to FIG. 30, a CuPredMode[0][xNbX][yNbY] value may be determined. X may be replaced with A and B. That is, CuPredMode values for NbA and NbB locations may be determined.

In addition, an isIntraCodedNeighbourX value may be configured based on determination of the prediction mode for the neighboring location. For example, the isIntraCodedNeighbourX value may be configured according to whether CuPredMode for the neighboring location is MODE_INTRA. If CuPredMode for the neighboring location is MODE_INTRA, the isIntraCodedNeighbourX value may be set to TRUE, and if CuPredMode for the neighboring location is not MODE_INTRA, the isIntraCodedNeighbourX value may be set to FALSE. X may be replaced with A, B, or the like in the present disclosure which has been described above, and is to be described below. X may refer to a thing corresponding to location X.

According to an embodiment, whether a corresponding location is available may be determined by referencing a neighboring location. Whether the corresponding location is available may be configured based on availableX. In addition, isIntraCodedNeighbourX may be configured based on availableX. For example, if availableX is TRUE, isIntraCodedNeighbourX may be set to TRUE. For example, if availableX is FALSE, isIntraCodedNeighbourX may be set to FALSE. Referring to FIG. 30, whether the corresponding location is available may be determined by "The derivation process for neighboring block availability". In addition, whether the corresponding location is available may be determined based on whether the corresponding location falls within a current picture. In a case where the corresponding location is (xNbY, yNbY), if xNbY or yNbY is smaller than 0, the corresponding location is out of the current picture, and availableX may be set to FALSE. If xNbY is greater than or equal to a picture width, the corresponding location is out of the current picture, and availableX may be set to FALSE. The picture width may be indicated by pic_width_in_luma_samples. If yNbY is greater than or equal to a picture height, the corresponding location is out of the current picture, and availableX may be set to FALSE. The picture height may be indicated by pic_height_in_luma_samples. If the corresponding location is in a brick or slice different from that of the current block, availableX may be set to FALSE. In addition, if reconstruction of the corresponding location is not completed, availableX may be set to FALSE. Whether reconstruction is completed may be indicated by IsAvailable[cIdx][xNbY][yNbY]. Accordingly, in summary, if one of the following conditions is satisfied, availableX may be set to FALSE, and otherwise (if none of the following conditions is satisfied), availableX may be set to TRUE.

Condition 1: xNbY <0
Condition 2: yNbY <0
Condition 3: xNbY >=pic_width_in_luma_samples
Condition 4: yNbY >=pic_height_in_luma_samples
Condition 5: IsAvailable[cIdx][xNbY][yNbY], FALSE
Condition 6: case in which a corresponding location (a neighboring location or a location of (xNbY, yNbY)) belongs to a different brick (or different slice) from that of the current block In addition, availableX may be configured by determining whether the current location and the corresponding location have the same CuPredMode according to an option.

isIntraCodedNeighbourX may be configured by combining the two aforementioned conditions. For example, if all of the following conditions are satisfied, isIntraCodedNeighbourX may be set to TRUE, and otherwise (if at least one of the conditions is not satisfied), isIntraCodedNeighbourX may be set to FALSE.

Condition 1: availableX==TRUE
Condition 2: CuPredMode[0][xNbX][yNbX], MODE_INTRA According to an embodiment of the present disclosure, weighting of CIIP may be determined based on multiple pieces of code information (isIntraCodedNeighbourX). For example, weighting may be determined when inter prediction and intra prediction are combined based on multiple pieces of code information (isIntraCodedNeighbourX). For example, the determination may be made based on code information (isIntraCodedNeighbourA) of a left block and code information (isIntraCodedNeighbourB) of an upper block. According to an embodiment, if both the code information (isIntraCodedNeighbourA) of a left block and the code information (isIntraCodedNeighbourB) of an upper block are TRUE, a weighting value (w) may be configured to 3. For example, the weighting value (w) may be weighting of CIIP or a value for determination of weighting. In addition, if both the code information (isIntraCodedNeighbourA) of a left block and the code information (isIntraCodedNeighbourB) of an upper block are FALSE, the weighting value (w) may be configured to 1. If one of the code information (isIntraCodedNeighbourA) of a left block and the code information (isIntraCodedNeighbourB) of an upper block is FALSE (identical to when one of them is TRUE), the weighting value (w) may be configured to 2. That is, the weighting value (w) may be configured based on whether a neighboring location is predicted according to intra prediction, or based on the number of neighboring locations predicted according to intra prediction.

The weighting value (w) may be weighting corresponding to intra prediction. Weighting corresponding to inter prediction may be determined based on the weighting value (w). For example, weighting corresponding to inter prediction may be (4−w). Referring to an equation (8-840) in FIG. 30, combining of two or more prediction signals may be done as follows.

predSampleComb[x][y]=(w*predSamplesIntra[x][y]+(4−w)*predSamplesInter[x][y]+2)>>2

Here, second samples (predSamplesIntra) and first samples (predSamplesInter) may be prediction signals. For example, the second samples (predSamplesIntra) and the first samples (predSamplesInter) may be prediction signals predicted by intra prediction and prediction signals predicted by inter prediction (e.g., a merge mode, more specifically, a regular merge mode), respectively. Combination prediction samples (predSampleComb) may be prediction signals used in CIIP.

Before execution of an equation (8-840) of FIG. 30, a procedure of updating a prediction signal before combination may be included. For example, the update may be performed in the same manner as in an equation (8-839) of FIG. 30. For example, the procedure of updating the prediction signal may be a procedure of updating an inter prediction signal for CIIP.

Figure 31:
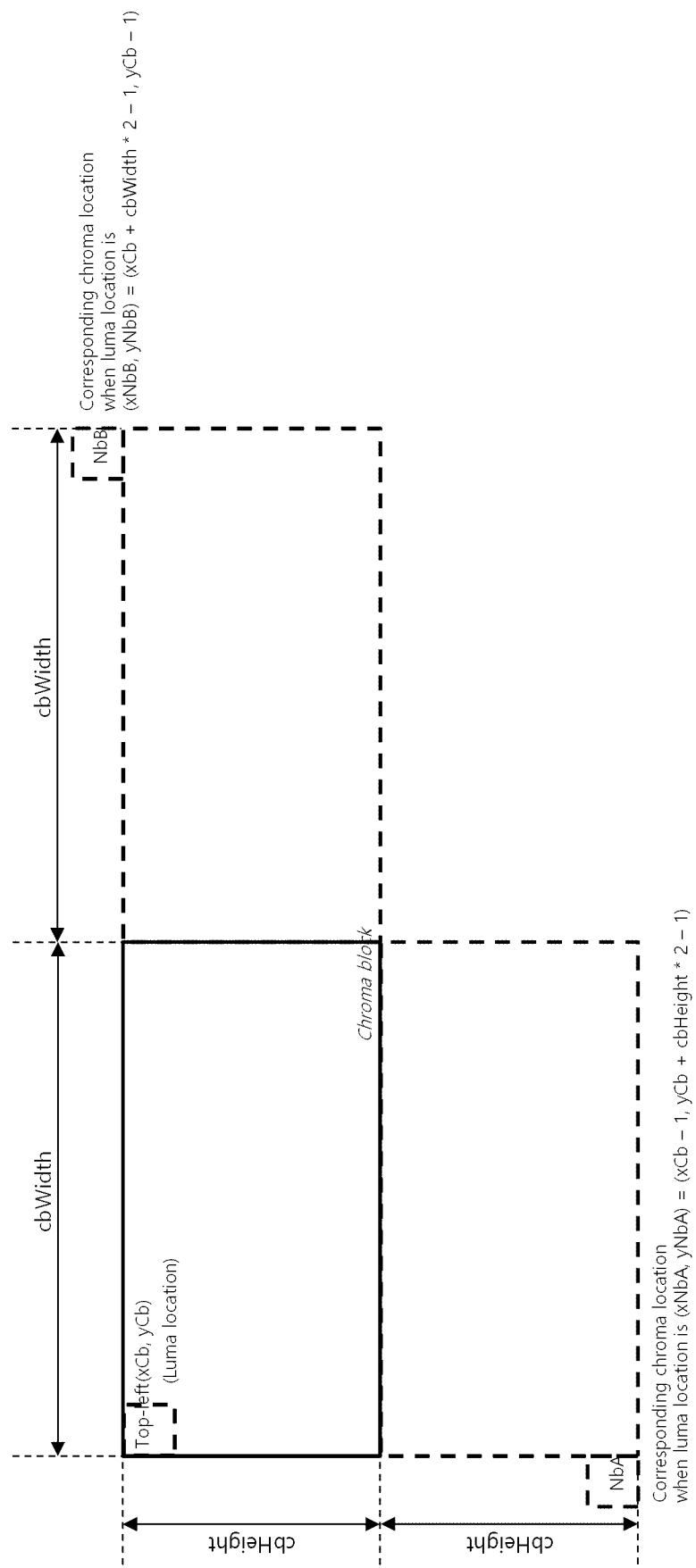
FIG. 31 is a diagram illustrating neighboring reference locations according to an embodiment of the present disclosure.

FIG. 31 is a diagram illustrating a neighboring reference location according to an embodiment of the present disclosure.

A neighboring reference location has been described in FIG. 29 and FIG. 30. If the described location is used for all cases (e.g., all chroma blocks), a problem may occur, and the problem will be described with reference to FIG. 31.

The embodiment of FIG. 31 illustrates a chroma block. In FIG. 29 and FIG. 30, the coordinates of NbA and NbB, which are expressed based on a luma sample for a chroma block, are ((xCb−1, yCb+2*cbHeight−1) and (xCb+2*cbWidth−1, yCb−1), respectively. However, if SubWidthC or SubHeightC is 1, this may indicate a location illustrated in FIG. 31, which is different from the location illustrated in FIG. 29. cbWidth and cbHeight are expressed based on each color component (chroma component in this example), and the coordinates are expressed based on luma, and therefore multiplying cbWidth and cbHeight by 2 in the above coordinates may be for compensation associated with the number of chroma samples versus luma samples in the case of 4:2:0. That is, this may be used for representing, based on luma, the coordinates of the case where the number of chroma samples corresponding to two luma samples based on the x-axis is one and the number of chroma samples corresponding to two luma samples based on the y-axis is one. Therefore, a case where SubWidthC or SubHeightC is 1 may indicate a different location. Accordingly, if the location of (xCb−1, yCb+2*cbHeight−1) and (xCb+2*cbWidth−1, yCb−1) is always used with respect to a chroma block, reference may be made to a location that is far away from the current chroma block. In this case, a relative location used by the luma block of the current block and a relative location used by the chroma block may not match. Weighting may be configured with reference to a location which has little relevance to the current block, by referring to a different location for the chroma block. Alternatively, decoding/reconstruction may not be performed according to the order of block decoding.

Referring to FIG. 31, illustrated is the location of luma-based coordinates described above, in the case of 4:4:4, that is, the case in which both SubWidthC and SubHeightC are 1. NbA and NbB may exist at locations far from the chroma block indicated by solid lines.

FIG. 32 is a diagram illustrating a weighted sample prediction process according to an embodiment of the present disclosure.

The embodiment of FIG. 32 may be an embodiment for solving the problems described in FIG. 29 to FIG. 31. The above description may have been omitted.

In FIG. 30, a neighboring location is configured based on scale information (scallFact), and as described in FIG. 31, the scale information (scallFact) is a value for transforming of a location if SubWidthC and SubHeightC are 2.

However, as described above, a problem may occur depending on a color format, and a ratio of a chroma sample to a luma sample may differ depending on a width and a height. According to an embodiment of the present disclosure, scale information (scallFact) may be divided into a width and a height.

According to an embodiment of the present disclosure, x-axis scale information (scallFactWidth) and y-axis scale information (scallFactHeight) may exist, and a neighboring location may be configured based on the x-axis scale information (scallFactWidth) and the y-axis scale information (scallFactHeight). In addition, the neighboring location may be configured based on a luma sample (luma block).

A video signal processing device may perform an operation of obtaining width-related information (SubWidthC) and height-related information (SubHeightC) based on chroma format information (chroma_format_idc). Here, the chroma format information (chroma_format_idc) may be signaled in one of a coding tree unit, a slice, a tile, a tile group, a picture, or a sequence unit.

The video signal processing device may obtain, based on the table shown in FIG. 27, width-related information (SubWidthC) and height-related information (SubHeightC) based on chroma format information (chroma_format_idc).

The video signal processing device may perform an operation (8-838) of obtaining the x-axis scale information (scallFactWidth) based on the width-related information (SubWidthC) or information (cIdx) on a color component of a current block. More specifically, the x-axis scale information (scallFactWidth) may be configured based on the information (cIdx) on the color component of the current block and the width-related information (SubWidthC). For example, if the information (cIdx) on the color component of the current block is 0, or the width-related information (SubWidthC) is 1, the x-axis scale information (scallFactWidth) may be configured to 0, and otherwise (if the information (cIdx) on the color component of the current block is not 0, and the width-related information (SubWidthC) is not 1 (if SubWidthC is 2)), the x-axis scale information (scallFactWidth) may be configured to 1. Referring to equation (8-838) of FIG. 32, description may be provided as follows.

scallFactWidth=(cIdx==0 II SubWidthC==1)?0:1

The video signal processing device may perform an operation (8-839) of obtaining the y-axis scale information (scallFactHeight) based on the height-related information (SubHeightC) or the information (cIdx) on the color component of the current block.

The y-axis scale information (scallFactHeight) may be configured based on the information (cIdx) on the color component of the current block and the height-related information (SubHeightC). For example, if the information (cIdx) on the color component of the current block is 0, or the height-related information (SubHeightC) is 1, the y-axis scale information (scallFactHeight) may be configured to 0, and otherwise (if the information (cIdx) on the color component of the current block is not 0, and the height-related information (SubHeightC) is not 1 (if SubHeightC is 2)), the y-axis scale information (scallFactHeight) may be configured to 1. Referring to equation (8-839) of FIG. 32, a description may be provided as follows.

scallFactHeight=(cIdx==0 II SubHeightC==1)?0:1

The x coordinate of a neighboring location may be indicated based on the x-axis scale information (scallFactWidth), and the y coordinate of the neighboring location may be indicated based on the y-axis scale information (scallFactHeight). The video signal processing device may perform an operation of determining a location of a left block (NbA), based on the y-axis scale information (scallFactHeight). The video signal processing device may perform an operation of determining a location of an upper block (NbB), based on the x-axis scale information (scallFactWidth). For example, coordinates of the upper block (NbB) may be configured based on the x-axis scale information (scallFactWidth). For example, coordinates of the left block (NbA) may be configured based on the y-axis scale information (scallFactHeight). As described above, in this case, being based on the x-axis scale information (scallFactWidth) may refer to being based on width-related information (SubWidthC), and being based on the y-axis scale information (scallFactHeight) may refer to being based on the height-related information (SubHeightC). For example, the coordinates of a neighboring location may be as follows.

(xNbA, yNbA)=(xCb−1, yCb+(cbHeight<<scallFactHeight)−1)
(xNbB, yNbB)=(xCb+(cbWidth<<scallFactWidth)−1, yCb−1)

(xCb, yCb) may be a top-left sample luma location of a current luma block (luma coding block) with respect to a top-left luma sample of a current picture. cbWidth and cbHeight may be the width and height of the current block, respectively. In this case, xCb and yCb may be coordinates expressed based on the luma sample, as described above. cbWidth and cbHeight may be expressed based on each color component.

Therefore, in a case of a chroma block and SubWidthC that is 1, it may be determined that (xNbB, yNbB)=(xCb+cbWidth−1, yCb−1). That is, in this case, NbB coordinates for the luma block and NbB coordinates for the chroma block may be the same. In addition, in the case of the chroma block and SubHeightC that is 1, it may be determined that (xNbA, yNbA)=(xCb−1, yCb+cbHeight−1). That is, in this case, NbA coordinates for the luma block and NbA coordinates for the chroma block may be the same.

Therefore, in the embodiment of FIG. 32, the coordinates of a neighboring location may be configured to be identical to the coordinates in the embodiments of FIG. 29 and FIG. 30 in the case of 4:2:0 format, and the coordinates of a neighboring location may be configured to be different from the coordinates in the embodiment of FIG. 29 and FIG. 30 in the case of 4:2:2 format or 4:4:4 format.

The video signal processing device may perform an operation of determining a weighting value (w) based on the left block (NbA) and the upper block (NbB). FIG. 32 may have description similar to that in FIG. 30. That is, a prediction mode or availability thereof may be determined based on the coordinates of a neighboring location described in FIG. 32, and weighting of CIIP may be determined. Among the descriptions of FIG. 32, some descriptions overlapping those of FIG. 30 may be omitted.

Referring to FIG. 32, the video signal processing device may configure code information (isIntraCodedNeighbourX) by combining two conditions. For example, if all of the following conditions are satisfied, the code information (isIntraCodedNeighbourX) may be set to TRUE, and otherwise (if at least one of the following conditions is not satisfied), the code information (isIntraCodedNeighbourX) may be set to FALSE.

Condition 1: availableX==TRUE
Condition 2: CuPredMode[0][xNbX][yNbX], MODE_INTRA More specifically, referring to line 3210, if the left block is available (availableA, TRUE), and a prediction mode of the left block is intra prediction (CuPredMode[0][xNbA][yNbA] is equal to MODE_INTRA), the video signal processing device may perform an operation of setting code information (isIntraCodedNeighbourA) of the left block to TRUE.

If the left block is not available or the prediction mode of the left block is not intra prediction, the video signal processing device may perform an operation of setting the code information of the left block to FALSE.

If the upper block is available (availableB==TRUE) and a prediction mode of the upper block is intra prediction (CuPredMode[0][xNbB][yNbB] is equal to MODE_INTRA), the video signal processing device may perform an operation of setting code information (isIntraCodedNeighbourB) of the upper block to TRUE.

If the upper block is not available or the prediction mode of the upper block is not intra prediction, the video signal processing device may perform an operation of setting the code information of the upper block to FALSE.

Referring to line 3220, if both the code information (isIntraCodedNeighbourA) of the left block and the code information (isIntraCodedNeighbourB) of the upper block are TRUE, the video signal processing device may perform an operation of determining a weighting value (w) to be 3. If both the code information (isIntraCodedNeighbourA) of the left block and the code information (isIntraCodedNeighbourB) of the upper block are FALSE, the video signal processing device may perform an operation of determining the weighting value (w) to be 1. If only one of the code information (isIntraCodedNeighbourA) of the left block and the code information (isIntraCodedNeighbourB) of the upper block is TRUE, the video signal processing device may perform an operation of determining the weighting value (w) to be 2.

The video signal processing device may perform an operation of obtaining first samples (predSamplesInter) by predicting the current block in the merge mode. The video signal processing device may perform an operation of obtaining second samples (predSamplesIntra) by predicting the current block in the intra mode.

The video signal processing device may perform an operation (8-841) of obtaining a combination prediction sample (predSampleComb) for the current block based on the weighting value (w), the first samples (predSamplesInter), and the second samples (predSamplesIntra). For example, the video signal processing device may obtain the combination prediction sample (predSampleComb) based on the following equation.

predSampleComb[x][y]=(w*predSamplesIntra[x][y]+(4−w)*predSamplesInter[x][y]+2)>>2

Here, predSamplesComb may refer to the combination prediction sample, w may refer to the weighting value, predSamplesIntra may refer to the second samples, predSamplesInter may refer to the first samples, [x] may refer to an x-axis coordinate of a sample included in the current block, and [y] may refer to a y-axis coordinate of the sample included in the current block.

In the present disclosure, a neighboring location and neighboring location coordinates may be used interchangeably.

FIG. 33 is a diagram illustrating a weighted sample prediction process according to an embodiment of the present disclosure.

The embodiment of FIG. 33 may express the coordinates of a neighboring location, which is described in FIG. 32, in a different manner. Therefore, duplicated contents of the aforementioned contents may be omitted.

As described above, bit shift may be expressed as multiplication. FIG. 32 may provide description using a bit shift, and FIG. 33 may provide description using multiplication.

According to an embodiment, x-axis scale information (scallFactWidth) may be configured based on information (cIdx) on a color component of a current block and width-related information (SubWidthC). For example, if the information (cIdx) on the color component of the current block is 0, or the width-related information (SubWidthC) is 1, the x-axis scale information (scallFactWidth) may be configured to 1, and otherwise (if cIdx is not 0, and the width-related information (SubWidthC) is not 1 (if SubWidthC is 2)), the x-axis scale information (scallFactWidth) may be configured to 2. Referring to equation (8-838) of FIG. 33, a description may be provided as follows.

scallFactWidth=(cIdx==0∥SubWidthC==1)?1:2

The y-axis scale information (scallFactHeight) may be configured based on the information (cIdx) on the color component of the current block and the height-related information (SubHeightC). For example, if the information (cIdx) on the color component of the current block is 0, or the height-related information (SubHeightC) is 1, the y-axis scale information (scallFactHeight) may be configured to 1, and otherwise (if cIdx is not 0, and the height-related information (SubHeightC) is not 1 (if SubHeightC is 2)), the y-axis scale information (scallFactHeight) may be configured to 2. Referring to equation (8-839) of FIG. 33, description may be provided as follows.

scallFactHeight=(cIdx==0∥SubHeightC==1)?1:2

The x coordinate of a neighboring location may be indicated based on the x-axis scale information (scallFactWidth), and the y coordinate of the neighboring location may be indicated based on the y-axis scale information (scallFactHeight). For example, the coordinates of NbB may be configured based on the x-axis scale information (scallFactWidth). For example, the coordinates of NbA may be configured based on the y-axis scale information (scallFactHeight). As described above, in this case, being based on the x-axis scale information (scallFactWidth) may refer to being based on SubWidthC, and being based on the y-axis scale information (scallFactHeight) may refer to being based on SubHeightC. For example, the coordinates of a neighboring location may be as follows.

(xNbA, yNbA)=(xCb−1, yCb+(cbHeight*scallFactHeight)−1)
(xNbB, yNbB)=(xCb+(cbWidth*scallFactWidth)−1, yCb−1)

In this case, xCb and yCb may be coordinates expressed based on the luma sample, as described above. cbWidth and cbHeight may be expressed based on each color component.

FIG. 34 is a diagram illustrating a weighted sample prediction process according to an embodiment of the present disclosure.

In the embodiments of FIG. 30, FIG. 32, and FIG. 33, and the like, whether a corresponding location is available is determined by referring to a neighboring location. In this case, cIdx which is an index indicating a color component is configured to 0 (a luma component). During the determination of whether the corresponding location is available, information (cIdx) on a color component of a current block may be used when determining whether reconstruction of the corresponding location (cIdx) is completed. That is, during the determination of whether the corresponding location is available, cIdx may be used when determining a value of IsAvailable[cIdx][xNbY][yNbY]. However, when a weighted sample prediction process for a chroma block is performed, if an IsAvailable value corresponding to cIdx 0 is referenced, incorrect determination may be made. For example, in a case where reconstruction of a luma component of a block including the neighboring location is incomplete, but reconstruction of a chroma component is complete, if cIdx is not 0, IsAvailable[0][xNbY][yNbY] may be FALSE, and IsAvailable[cIdx][xNbY][yNbY] may be TRUE. Therefore, even though the neighboring location is actually available, it may be incorrectly determined that the neighboring location is unavailable. In the embodiment of FIG. 34, in order to solve the problem, cIdx of the current coding block may be used as an input when determining whether the corresponding location is available by referring to the neighboring location. That is, when "the derivation process for neighbouring block availability" is invoked, cIdx of the current coding block may be used as cIdx that is an input.

The contents described in FIG. 32 and FIG. 33 may be omitted.

When determining the prediction mode of the neighboring location described above, CuPredMode[0][xNbX][yNbY], which is CuPredMode corresponding to chType 0, is referenced, wherein, if chType for the current block is not matched, an incorrect parameter may be referenced. Therefore, according to an embodiment of the present disclosure, when determining the prediction mode of the neighboring location, CuPredMode[chType][xNbX][yNbY] corresponding to a chType value corresponding to the current block may be referenced.

Figure 35:
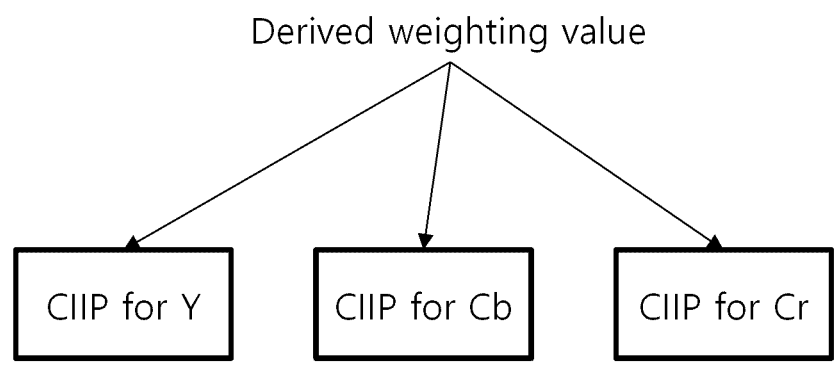
FIG. 35 is a diagram illustrating CIIP weight derivation according to an embodiment of the present disclosure.

FIG. 35 is a diagram illustrating CIIP weight derivation according to an embodiment of the present disclosure.

The contents related to CIIP weight derivation have been described in the embodiments described with reference to FIG. 29 to FIG. 34, and the described contents may be omitted in this embodiment.

In the embodiments described with reference to FIG. 29 to FIG. 34, weighting used in CIIP has been determined based on the relatively same locations for multiple color components. Accordingly, this may indicate that, with respect to a chroma component, weighting used in CIIP may be determined based on neighboring locations described for a luma component. Also, accordingly, this may indicate that, with respect to multiple color components, weightings used in CIIP may be determined based on neighboring locations described for a luma component. Accordingly, this may indicate that, with respect to multiple color components, weightings used in CIIP may be determined based on the same neighboring locations. This may also indicate that, with respect to multiple color components, weightings used in CIIP are the same. This may be because, as described above, the prediction modes of neighboring locations are referenced. Alternatively, this may be because, with respect to the color components, the prediction modes at the relatively same locations are the same. More specifically, if the prediction modes corresponding to preconfigured locations for the respective color components are the same with respect to the color components, it is possible that weightings used in CIIP are the same for multiple color components. If inter prediction is available, it is possible that the prediction modes corresponding to the preconfigured locations for the respective color components are the same with respect to the color components. Alternatively, in a case of slice P or slice B, it is possible that the prediction modes corresponding to the preconfigured locations for the respective color components are the same with respect to the color components. This may be because SINGLE_TREE is configured in the case of slice P or slice B.

As described above, the neighboring locations described for a luma component may be as follows.
(xNbA, yNbA)=(xCb−1, yCb+cbHeight−1)
(xNbB, yNbB)=(xCb+cbWidth−1, yCb−1)

In summary, according to an embodiment of the present disclosure, weightings used in CIIP for multiple color components may be the same. More specifically, it is possible to use, for a chroma component, weighting used in CIIP derived for a luma component. This may be to prevent a procedure of weighting derivation for multiple color components from being performed multiple times. Also, for the chroma component, a weighting value based on (xNbA, yNbA) and (xNbB, yNbB) may be used. In this case, cbHeight and cbWidth in (xNbA, yNbA) and (xNbB, yNbB) may be values based on a luma sample. In addition, xCb and yCb values in (xNbA, yNbA) and (xNbB, yNbB) may be values based on the luma sample. That is, also for the chroma component, it is possible to use, for CIIP, a weighting value determined based on the neighboring locations based on coordinates and the width and height based on the luma sample.

Referring to FIG. 35, the derived weighting values are used for all the respective color components, i.e., Y, Cb, and Cr. That is, the same weighting value is used for CIIP for all color components.

FIG. 36 is a diagram illustrating a CIIP procedure according to an embodiment of the present disclosure.

The embodiment of FIG. 36 may be related to the embodiment described with reference to FIG. 35. The embodiment of FIG. 36 may show a structure of the embodiment described with reference to FIG. 35. In the embodiment of FIG. 36, the contents described with reference to FIG. 29 to FIG. 35 may be omitted.

As described in FIG. 35, when CIIP is used for each color component, it is possible to use the same weighting value.

Referring to FIG. 36, ciip_flag may be signaling indicating whether CIIP is used. If CIIP is used, the process mentioned in FIG. 36 may be performed. If CIIP is used, it is possible to perform a weighting value derivation process. The weighting value derivation process can be performed regardless of a color component. The weighting value derivation process may include the process described with reference to FIG. 30. In this case, neighboring locations can be determined regardless of a color component. For example, neighboring locations as in the following may be used.
(xNbA, yNbA)=(xCb−1, yCb+cbHeight−1)
(xNbB, yNbB)=(xCb+cbWidth−1, yCb−1)

Referring to FIG. 36, xCb, yCb, cbWidth, and cbHeight, which are inputs of the weighting value derivation process, and xCb, yCb, cbWidth, and cbHeight of the neighboring locations may be component references preconfigured regardless of a color component currently being executed. For example, xCb, yCb, cbWidth, and cbHeight, which are inputs of the weighting value derivation process, and xCb, yCb, cbWidth, and cbHeight of the neighboring locations may be values based on a luma sample. That is, when the weighting value derivation process is performed for a chroma component, the process may be based on xCb, yCb, cbWidth, and cbHeight based on a luma sample. More specifically, when the weighting value derivation process is performed for a chroma component, neighboring locations may be configured based on xCb, yCb, cbWidth, and cbHeight of a luma sample, and weighting values may be determined based on the neighboring locations.

A weighting value (w) may be configured based on the weighting value derivation process. The weighting value derivation process of FIG. 36 may be a procedure of configuring the weighting value (w) described with reference to FIG. 30. In this case, as described, neighboring locations unassociated with a color component may be used.

Referring to FIG. 36, when CIIP is used, a general intra sample prediction process and a weighted sample prediction process may be performed. These can be performed for each color component. The weighted sample prediction process may include a procedure of combining inter prediction and intra prediction by using the weighting described with reference to FIG. 30. For example, the weighted sample prediction process may include a procedure of combination using the equation (8-840) of FIG. 30. According to an embodiment of the present disclosure, the weighted sample prediction process may be performed based on a weighting value, and it is possible to use the same weighting value for multiple color components. The weighting value used in weighted sample prediction may be a weighting value (w) determined based on the above-described weighting value derivation process.

Referring to FIG. 36, a coding block width and a coding block height, which are inputs of the weighted sample prediction process, may be values expressed based on each color component. Referring to FIG. 36, in the case of a luma component (when cIdx is 0), a width and a height may be cbWidth and cbHeight, respectively, and in the case of a chroma component (when cIdx is not 0; when cIdx is 1 or 2), a width and a height may be cbWidth/SubWidthC and cbHeight/SubHeightC, respectively.

That is, the weighted sample prediction process may be performed for a certain color component by using a weighting value determined based on another color component, and by using a width and a height which are based on the certain color component. Alternatively, the weighted sample prediction process may be performed for a certain color component by using a weighting value determined based on a width and a height which are based on another color component, and by using a width and a height which are based on the certain color component. In this case, the certain color component may be a chroma component, and the another color component may be a luma component. As another embodiment, the certain color component may be a luma component, and the another color component may be a chroma component.

This may be to simplify implementation. For example, the process shown in FIG. 36 may be performed for each color component, wherein implementation of the weighting value derivation process may be simplified by allowing the weighting value derivation process to be performed regardless of a color component. Alternatively, this may be for preventing a repeated process from being performed.

Figure 37:
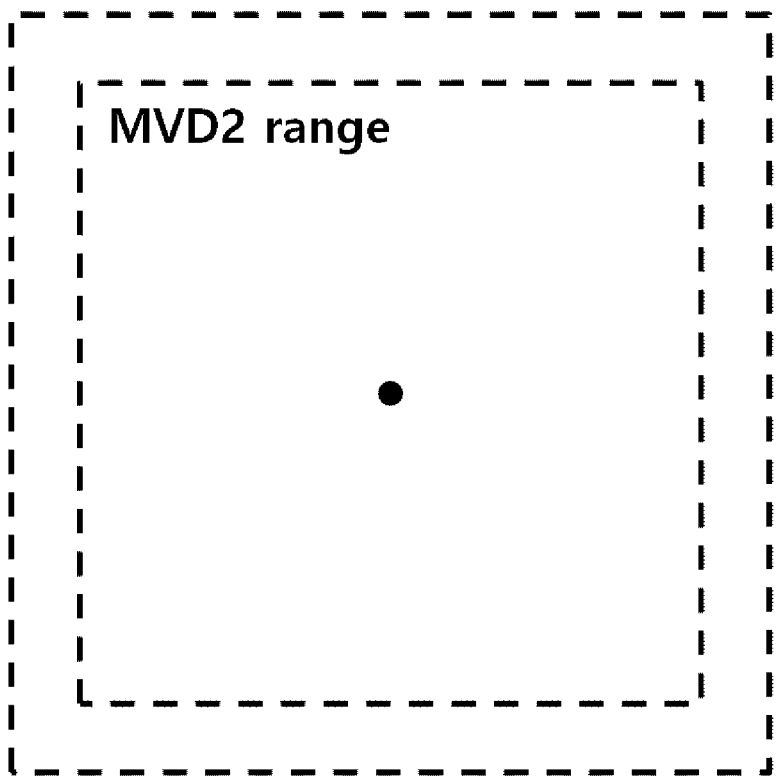
FIG. 37 is a diagram illustrating MV and MVD ranges according to an embodiment of the present disclosure.

FIG. 37 is a diagram illustrating MV and MVD ranges according to an embodiment of the present disclosure.

According to an embodiment of the present disclosure, a plurality of MVD generation methods or MVD determination methods may exist. An MVD may be the aforementioned motion vector difference. In addition, a plurality of motion vector (MV) generation methods or MV determination methods may exist.

For example, the MVD determination methods may include a method of determination based on a syntax element value. For example, an MVD may be determined based on a syntax element, as described with reference to FIG. 9. This will be further described with reference to FIG. 40.

The MVD determination methods may include a method of determination performed when a merge with MVD (MMVD) mode is used. For example, there may be an MVD used when a merge mode is used. This will be further described with reference to FIG. 38 and FIG. 39.

In an embodiment of the present disclosure, an MV or MVD may include a control point motion vector (CPMV) for performing affine motion compensation. That is, an MV and an MVD may include a CPMV and a CPMVD, respectively.

According to an embodiment of the present disclosure, a range that an MV or an MVD is able to represent may be limited. Accordingly, it may be possible to express or store an MV or MVD by using a limited resource and a limited number of bits, and to perform an operation using the MV or MVD. In an embodiment of the present disclosure, ranges that may be represented by an MV and an MVD may be referred to as an MV range and an MVD range, respectively.

According to an embodiment, the MV range or the MVD range may be from $-2^N$ to $(2^N-1)$. The range may include $-2^N$ and $(2^N-1)$. According to another embodiment, the MV range or MVD range may be from $(-2^N+1)$ to $2^N$. The range may include $(-2^N+1)$ and $2^N$. In these embodiments, N may be an integer, for example, a positive integer. More specifically, N may be 15 or 17. In this case, it may be possible to express the MV range or the MVD range by using N+1 bits.

It is possible to perform clipping and modulus operations in order to implement the described limited MV range or limited MVD range. For example, a value within the MV range or MVD range may be derived by performing clipping or modulus operation on the MV or MVD in a certain stage (e.g., before the final stage). Alternatively, in order to implement the limited MV range or the limited MVD range, a binarization expression range of a syntax element indicating the MV or MVD may be limited.

According to an embodiment of the present disclosure, the MV range and the MVD range may be different. A plurality of MVD determination methods may exist, and MVD1 and MVD2 may be MVDs determined by different methods. According to another embodiment of the present disclosure, an MVD1 range and an MVD2 range may be different. Using different ranges may be for using different resources or different bit numbers, and therefore this may prevent representing of an unnecessarily wide range for an element.

According to an embodiment, MVD1 may be the MVD described with reference to FIG. 40 or FIG. 9. Alternatively, MVD1 may be an MVD of an affine inter mode, an inter mode, and an AMVP. Alternatively, MVD1 may be an MVD when a merge mode is not used. Whether the merge mode is used may be indicated by merge_flag or general_merge_flag. For example, if merge_flag or general_merge_flag is 1, the merge mode is used, and if merge_flag or general_merge_flag is 0, the merge mode may not be used.

According to an embodiment, MVD2 may be the MVD described with reference to FIG. 38 and FIG. 39. Alternatively, MVD2 may be an MVD of an MMVD mode. Alternatively, MVD2 may be an MVD when the merge mode is used.

According to an embodiment, the MV may be an MV used for final motion compensation or prediction. Alternatively, the MV may be an MV included in a candidate list. Alternatively, the MV may be a collocated motion vector (temporal motion vector). Alternatively, the MV may be a value obtained by adding an MVD to an MVP. Alternatively, the MV may be a CPMV. Alternatively, the MV may be a value obtained by adding a CPMVD to a CPMVP. Alternatively, the MV may be an MV for each subblock in affine MC. The MV for the subblock may be an MV derived from a CPMV. Alternatively, the MV may be an MV of MMVD.

According to an embodiment of the present disclosure, an MVD2 range may be narrower than an MVD1 range or an MV range. The MVD1 range and the MV range may be the same. According to an embodiment, the MVD1 range and the MV range may be from $-2^{17}$ to $(2^{17}-1)$ (inclusive). The MVD2 range may be from $-2^{15}$ to $(2^{15}-1)$ (inclusive).

Referring to FIG. 37, rectangles indicated by dotted lines indicate an MV range or an MVD range. An inner rectangle may indicate an MVD2 range. An outer rectangle may indicate an MVD1 range or an MV range. That is, the MVD2 range may be different from the MVD1 range or the MV range. The ranges in the drawing may indicate vector ranges expressible from a point in the drawing. For example, as described above, the MVD2 range may be from $-2^{15}$ to $(2^{15}-1)$ (inclusive). The MVD1 range or the MV range may be from $-2^{17}$ to $(2^{17}-1)$ (inclusive). If an MV or MVD is a value in units of x pels, the value indicated by the MV or MVD may actually be (MV*x) or (MVD*x) pixels. For example, in a case of a value in units of 1/16 pels, it may indicate (MV/16) or (MVD/16) pixels. In this embodiment, in the case of the MVD2 range, a maximum absolute value is 32768, and if this is a value in units of 1/16 pels, the value of (MVD2 value)/16 is a maximum of 2048 pixels. Therefore, an 8K picture cannot be fully covered. In the case of the MVD1 range or MV range, a maximum absolute value is 131072, and this value may indicate a maximum of 8192 pixels when a 1/16-pel unit is used. Therefore, an 8K picture can be fully covered. 8K resolution may indicate a resolution with a horizontal length (or a length of a longer one between horizontal and vertical lengths) of 7680 pixels or 8192 pixels. For example, a picture, such as 7680×4320, may have 8K resolution.

Figure 38:
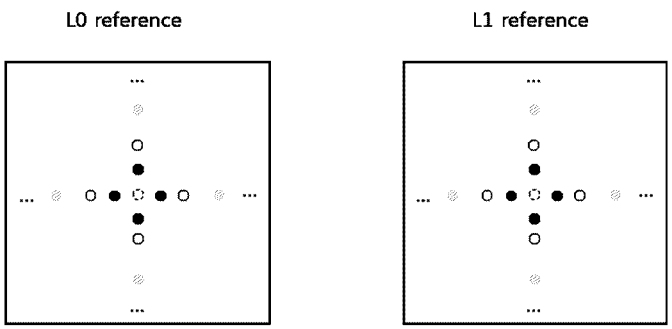
FIG. 38 is a diagram illustrating MMVD according to an embodiment of the present disclosure.

FIG. 38 is a diagram illustrating MMVD according to an embodiment of the present disclosure.

According to an embodiment of the present disclosure, MMVD is a merge mode with MVD and a merge with MVD, and may be a method of using an MVD for a merge mode. For example, an MV may be generated based on a merge candidate and an MVD. An MVD of MMVD may have a limited expressible range compared to the aforementioned MVD1 or the MVD of FIG. 9 or FIG. 40. For example, it is possible for the MVD of MMVD that there exists only one of a horizontal component and a vertical component. Absolute values of values expressible by the MVD of MMVD may not be equally spaced from each other. FIG. 38(a) shows points expressible by the MVD of MMVD from a dotted-line point at the center.

FIG. 38(b) shows MMVD-related syntaxes. According to an embodiment, higher-level signaling indicating whether MMVD is available may exist. Here, signaling may indicate parsing from a bitstream. The higher level may be a unit including a current block and a current coding block, and may be, for example, a slice, a sequence, a tile, a tile group, and a CTU. Higher-level signaling indicating whether MMVD is available may be higher-level MMVD enabling information (sps_mmvd_enabled_flag). If higher-level MMVD enabling information (sps_mmvd_enabled_flag) is 1, this may indicate that MMVD is enabled, and if higher-level MMVD enabling information (sps_mmvd_enabled_flag) is 0, this may indicate that the MMVD is not enabled. However, the present disclosure is not limited thereto, and if higher-level MMVD enabling information (sps_mmvd_enabled_flag) is 0, this may indicate that MMVD is enabled, and if the higher-level MMVD enabling information (sps_mmvd_enabled_flag) is 1, this may indicate that the MMVD is not enabled.

If higher-level MMVD enabling information (sps_mmvd_enabled_flag), which is higher-level signaling indicating whether MMVD is available, is 1, it is possible to indicate, via additional signaling, whether MMVD is used for a current block. That is, if the higher-level MMVD enabling information indicates enabling of MMVD, a video signal processing device may parse, from a bitstream, MMVD merge information (mmvd_merge_flag) indicating whether MMVD is used for the current block. Signaling indicating whether MMVD is used may be MMVD merge information (mmvd_merge_flag). If the MMVD merge information (mmvd_merge_flag) is 1, this may indicate that MMVD is used for the current block. If the MMVD merge information (mmvd_merge_flag) is 0, this may indicate that MMVD is not used for the current block. However, the present disclosure is not limited thereto, and if the MMVD merge information (mmvd_merge_flag) is 0, this may indicate that MMVD is used for the current block, and if the MMVD merge information (mmvd_merge_flag) is 1, this may indicate that MMVD is not used for the current block.

If the MMVD merge information (mmvd_merge_flag) is 1 (a value indicating use of MMVD), an MMVD-related syntax element may be parsed. The MMVD-related syntax element may include at least one of mmvd_cand_flag, MMVD distance-related information (mmvd_distance_idx), and MMVD direction-related information (mmvd_direction_idx).

As an embodiment, mmvd_cand_flag may indicate an MVP to be used in an MMVD mode. Alternatively, mmvd_cand_flag may indicate a merge candidate to be used in the MMVD mode. The MVD of MMVD may be determined based on the MMVD distance-related information (mmvd_distance_idx) and the MMVD direction-related information (mmvd_direction_idx). The MVD of MMVD may indicate MVD information (mMvdLX). For example, the MMVD distance-related information (mmvd_distance_idx) may indicate a value related to an absolute value of the MVD of MMVD, and the MMVD direction-related information (mmvd_direction_idx) may indicate a value related to an MVD direction of the MMVD.

FIG. 39 is a diagram illustrating MVD derivation of MMVD according to an embodiment of the present disclosure.

Referring to the left side of FIG. 39, a video signal processing device may determine whether MMVD is used in a current block, based on MMVD merge information (mmvd_merge_flag). If MMVD is used for the current block, an MVD derivation procedure may be performed. The MVD derivation procedure may be 8.5.2.7 shown on the right side of FIG. 39. The MVD that is an output of 8.5.2.7 may be an MVD of the MMVD and may be MMVD information (mMvdLX). As described above, the MMVD information (mMvdLX) may be obtained based on MMVD distance-related information (mmvd_distance_idx) and MMVD direction-related information (mmvd_direction_idx). Here, X may be replaced with 0 and 1 which may correspond to reference list L0 and reference list L1, respectively.

As shown in FIG. 39, the MVD of MMVD or the MMVD information (mMvdLX) may be added to mvLX, which is the motion vector (MV) derived in the previous procedures ((8-281) and (8-282)). Here, X may be replaced with 0 and 1 which may correspond to a first reference list (reference list L0) and a second reference list (reference list L1), respectively. The MVD of MMVD may indicate the MMVD information (mMvdLX). The video signal processing device may perform a procedure of limiting a range of a modified motion vector (mvLX) obtained by adding the MVD. For example, clipping may be performed ((8-283) and (8-284)). For example, the range may be limited to the aforementioned MV range. For example, the range may be limited from $-2^{17}$ to $(2^{17}-1)$ (inclusive).

In the present disclosure, Clip3(x, y, z) may indicate clipping. For example, a result of Clip3(x, y, z) may be 1) x, if z<x, 2) y, if z>y, and 3) z, otherwise. Therefore, the range of the result of Clip3(x, y, z) may be x<=result<=y.

In this embodiment, comp in mvLX[0][0][comp] and mMvdLX[comp] may represent an x-component or a y-component. For example, comp may represent each of a horizontal component and a vertical component.

The video signal processing device may predict the current block, based on the modified motion vector (mvLX). The video signal processing device may reconstruct the current block based on the modified motion vector (mvLX). As described above, the modified motion vector (mvLX) may be a value obtained by adding MMVD information (mMvdLX) to mvLX that is the motion vector (MV).

A procedure of MVD derivation of MMVD may be as shown on the right side of FIG. 39. An MMVD offset (MmvdOffset) in the drawing may be a value based on the aforementioned MMVD-related syntax element. For example, the MMVD offset (MmvdOffset) may be a value based on MMVD distance-related information (mmvd_distance_idx) and MMVD direction-related information (mmvd_direction_idx). In summary, the MMVD offset (MmvdOffset) may be obtained based on at least one of MMVD distance-related information (mmvd_distance_idx) and MMVD direction-related information (mmvd_direction_idx). MMVD information (mMvdLX) may be derived based on the MMVD offset (MmvdOffset).

According to one embodiment, in a case of bi-prediction (predFlagLX may indicate a reference list to be used, X may be replaced with 0 and 1, and L0 and L1 may correspond to the first reference list (reference list L0) and the second reference list (reference list L1), respectively), it may be determined whether to use, as it is, the MMVD offset (MmvdOffset) as the MVD of MMVD based on a picture order count (POC), whether to use a value calculated based on the MMVD offset (MmvdOffset), whether to use the MMVD offset (MmvdOffset) as it is for a value for a certain reference list, whether to use a value calculated based on the MMVD offset (MmvdOffset), for a value for a certain reference list, or the like.

According to an embodiment, there may be a case of using the MMVD offset (MmvdOffset) to obtain the MVD for both the first reference list (reference list L0) and the second reference list (reference list L1) ((8-350) to (8-353)). For example, a first POC difference (currPocDiffL0) and a second POC difference (currPocDiffL1) may be the same. A POC difference (currPocDiffLX) may be a difference between a POC of the current picture and a POC of a reference picture of reference list LX, and X may be replaced with 0 and 1. The first POC difference (currPocDiffL0) and the second POC difference (currPocDiffL1) may be determined by (8-348) and (8-349) of FIG. 39, respectively. DiffPicOrderCnt may be calculated as follows.

DiffPicOrderCnt(picA, picB)=PicOrderCnt(picA)-PicOrderCnt(picB)

PicOrderCnt(picX) may indicate a picture order count value of picture picX.

FIG. 39, currPic may indicate the current picture. RefPicList[X][refIdxLX] may indicate the reference picture when refIdxLX is used in reference list LX.

According to an embodiment, there may be a case where a value calculated based on MmvdOffset is used for the MVD for the second reference list (reference list L1) ((8-354) to (8-363)). In this case, it is possible to use, as it is, the MMVD offset (MmvdOffset) value as the MVD for the first reference list (reference list L0). This may be a case where Abs(currPocDiffL0) is equal to or greater than Abs(currPocDiffL1). Alternatively, Abs(currPocDiffL0) may be greater than Abs(currPocDiffL1).

According to an embodiment, there may be a case where a value calculated based on the MMVD offset (MmvdOffset) is used for the MVD for the first reference list (reference list L0) ((8-364) to (8-373)). In this case, it is possible to use, as it is, the MMVD offset (MmvdOffset) value as the MVD for the second reference list (reference list L1). This may be a case where Abs(currPocDiffL0) is smaller than Abs(currPocDiffL1). Alternatively, Abs(currPocDiffL0) may be less than or equal to Abs(currPocDiffL1).

According to an embodiment, calculation based on the MMVD offset (MmvdOffset) may indicate MV scaling. MV scaling may correspond to (8-356) to (3-361) or (8-366) to (3-371) of FIG. 39. The former may be a procedure of generating second MMVD information (mMvdL1) which is a scaled MV obtained by scaling based on first MMVD information (mMvdL0) or the MMVD offset (MmvdOffset), and the latter may be a procedure of generating the first MMVD information (mMvdL0) which is a scaled motion vector (MV) obtained by scaling based on the second MMVD information (mMvdL1) or the MMVD offset (MmvdOffset). MV scaling may be calculation based on a scale factor (distScaleFactor((8-359) and (8-369))) that is a value based on the first POC difference (currPocDiffL0) and the second POC difference (currPocDiffL1). MV scaling may be calculation based on a value obtained by multiplying the scale factor (distScaleFactor) and an MV to be scaled ((8-360), (8-361), (8-370), and (8-371)). MV scaling may include a procedure of limiting an MV range. For example, the range limiting procedure may be included in (8-360), (8-361), (8-370), and (8-371) of FIG. 39. For example, MV scaling may include a clipping procedure. According to the embodiment of the present disclosure, in this case, the aforementioned MVD2 range may be used. For example, the range may be limited from $-2^{15}$ to $(2^{15}-1)$ (inclusive). That is, the MVD range of MMVD may be limited from $-2^{15}$ to $(2^{15}-1)$ (inclusive). For example, that is, the procedure of MVD derivation of the MMVD may include a procedure of limiting the value based on the product of the MV to be scaled and distScaleFactor to the range from $-2^{15}$ to $(2^{15}-1)$ (inclusive). For example, a Clip3$(-2^{15}, 2^{15}-1, x)$ procedure may be included in the procedure of MVD derivation of the MMVD. More specifically, mMvdLX may be determined as follows.

mMvdLX=Clip3($-2^{15}$, $2^{15}-1$, (distScaleFactor*mMvdLY+128−(distScaleFactor*mMvdLY>=0))>>8)

Here, Y may be 0 or 1, and may be !X. mMvdLY may be MmvdOffset. distScaleFactor may be a value shown in (8-359) or (8-369), and may be a value based on currPocDiffL0 and currPocDiffL1. However, the range of the scaled MV, the MMVD information (mMvdLX), and the MVD of MMVD are not limited to the range from $-2^{15}$ to $(2^{15}-1)$. The range of the scaled MV, the MMVD information (mMvdLX), and the MVD of MMVD may be from $-2^{17}$ to $(2^{17}-1)$. This will be described with reference to FIG. 43.

This procedure can be performed when both reference pictures for L0 and L1 are not long-term reference pictures.

According to an embodiment, calculation based on the MMVD offset (MmvdOffset) may indicate an MMVD offset (MmvdOffset) or a negative MMVD offset (−MmvdOffset), which is based on the first POC difference (currPocDiffL0) and the second POC difference (currPocDiffL1) ((8-362), (8-363), (8-372), and (8-373)). This procedure can be performed when at least one of the reference pictures for L0 and L1 is a long-term reference picture. In a case of uni-prediction, it is possible to use, as it is, MmvdOffset as mMvdLX ((8-374) and (8-375)).

FIG. 40 is a diagram illustrating MVD and MV derivation according to an embodiment of the present disclosure.

The embodiment of FIG. 40 may be an example using the MV range or MVD1 range of FIG. 37. The embodiment of FIG. 40 may be an example of using a range from $-2^{17}$ to $(2^{17}-1)$ (inclusive).

Referring to FIG. 40, it is possible to derive lMvd, based on the syntax element described in FIG. 9 and the like (7-161). lMvd may range from $-2^{17}$ to $(2^{17}-1)$ (inclusive). Values, such as MvdLX and MvdCpLX, may be configured to lMvd. lMvd, MvdLX, MvdCpLX, etc. may be MVD1 described above.

If an AMVP, an inter mode, etc. are used, an MV range may be limited from $-2^{17}$ to $(2^{17}-1)$ (inclusive). This may be a case in which a merge mode is not used. Referring to FIG. 40, (8-264) to (8-267) may include an MV range limiting procedure. Referring to the drawings, uLX may be a value based on adding MVP (mvpLX) and MVD (mvdLX). mvLX which is a final MV may be calculated based on ULX. FIG. 40 includes a modulus operation, wherein a value represented by this operation may be limited so as to be expressed by a certain number of bits or less. For example, by calculating (% $2^{18}$), the value may be expressed in 18 bits. Therefore, the MV range may be limited from $-2^{17}$ to $(2^{17}-1)$ (inclusive). (8-265) and (8-267) may serve to solve overflow that may occur when adding MVP and MVD.

FIG. 41 is a diagram illustrating MV and CPMV derivation according to an embodiment of the present disclosure.

The embodiment of FIG. 41 may be an example using the MV range or MVD1 range of FIG. 37. The embodiment of FIG. 40 may be an example of using a range from $-2^{17}$ to ($2^{17}-1$) (inclusive).

FIG. 41 (*a*) may represent a method of deriving a collocated motion vector (temporal motion vector). This procedure may include MV scaling. An operation of clipping a value based on distScaleFactor and an MV to be scaled (mvCol) may be included (8-398). In this case, clipping may be configured to produce results in the range from $-131072$ to $131071$ (inclusive). $-131072$ is equal to $-2^{17}$. $131071$ is equal to $2^{17}-1$.

FIG. 41 (*b*) is a diagram illustrating a part of a procedure of deriving a CPMV (cpMvLX). This may also include a clipping procedure for limiting the range. In this case, the range may be from $-2^{17}$ to ($2^{17}-1$) (inclusive).

FIG. 41 (*c*) is a diagram illustrating a part of a procedure of deriving a subblock-based MV. Subblock-based MVs may be MVs when using affine MC, subblock based temporal MV prediction, or the like. This may also include a clipping procedure for limiting the range. In this case, the range may be from $-2^{17}$ to ($2^{17}-1$) (inclusive). xSbIdx and ySbIdx of the drawing may indicate a subblock index on the x-axis and a subblock index on the y-axis, respectively.

Figure 42:
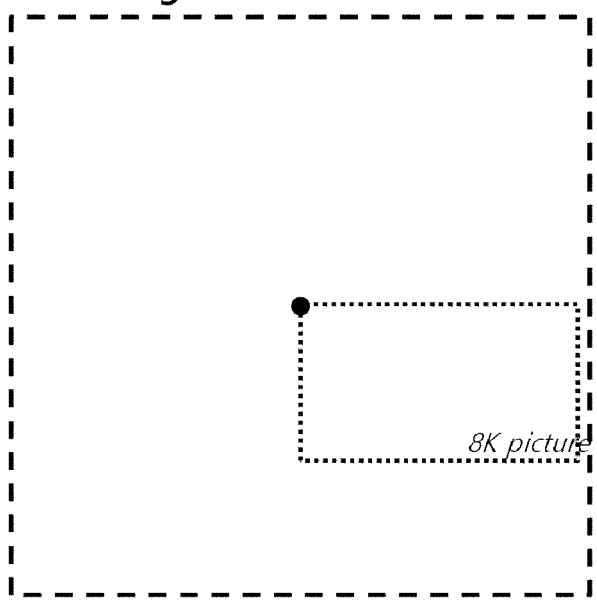
FIG. 42 is a diagram illustrating MV and MVD ranges according to an embodiment of the present disclosure.

FIG. 42 is a diagram illustrating MV and MVD ranges according to an embodiment of the present disclosure.

The above described parts may be omitted in this embodiment.

As described above, a plurality of MVD generation methods or MVD determination methods may exist. An MVD may be the aforementioned motion vector difference. In addition, a plurality of MV generation methods or MV determination methods may exist.

According to an embodiment of the present disclosure, a range that an MV or an MVD is able to indicate may be limited.

According to an embodiment of the present disclosure, the MV range and the MVD range may be the same. An MVD generation method may exist, an MVD generated by MVD generation method 1 may be MVD1, and an MVD generated by MVD generation method 2 may be MVD2. An MVD1 range and an MVD2 range may be the same. The MV range, the MVD range, MVD1 range, and MVD2 range may be from $-2^N$ to ($2^N-1$). The ranges may include $-2^N$ and ($2^N-1$). According to another embodiment, the MV range or MVD range may be from ($-2^N+1$) to $2^N$. The range may include ($-2^N+1$) and $2^N$. In these embodiments, N may be an integer, for example, a positive integer. More specifically, N may be 17. In this case, it may be possible to express the MV range or the MVD range by using N+1 bits. Therefore, the MV range, the MVD range, the MVD1 range, and the MVD2 range can all range from $-2^{17}$ to ($2^{17}-1$).

As described in the previous drawings, the MV, MVD1, MVD2, etc. may be defined. That is, the MV may refer to an MV used for final motion compensation or prediction, and the description of FIG. 37 may be referenced for this. MVD1 may be the MVD described with reference to FIG. 40 or FIG. 9. Alternatively, MVD1 may be an MVD of an AMVP, inter mode, or affine inter mode, or an MVD when a merge mode is not used, for which reference may be made to the description of FIG. 37. MVD2 may be the MVD described in FIG. 38 and FIG. 39 or an MVD of an MMVD mode, for which reference may be made to the description of FIG. 37. The MVD of the MMVD mode may indicate MMVD information (mMvdLX).

Therefore, according to an embodiment, the ranges expressible by all the MVD of the AMVP, inter mode, or affine inter mode and the MVD of the MMVD may be the same. Additionally, a final MV may have the same range. More specifically, the MVD of the AMVP, inter mode, or affine inter mode and the MVD of the MMVD may all range from $-2^{17}$ to ($2^{17}-1$) (inclusive). Additionally, the final MV may also have a range from $-2^{17}$ to ($2^{17}-1$) (inclusive).

Accordingly, all the MV and MVDs are able to fully cover a picture of a certain size. When there is a range expressible by a certain MV or MVD1, MVD2 may also express the same range. Therefore, for example, a method using MVD2 may be prevented from being used more restrictively due to the range of expression compared to other methods. The fact that when the MV, MVD1, etc. are able to express a certain range, MVD2 expresses the same range may not require an additional resource in hardware or software. If the MVD of MMVD or MVD2 is able to express from $-2^{17}$ to ($2^{17}-1$) (inclusive), a maximum absolute value is 131072, wherein if this value is a value in units of 1/16 pels, a maximum of 8192 pixels may be expressed. Therefore, an 8K picture can be fully covered.

Referring to FIG. 42, the outer dotted line indicates ranges expressible by the MV, MVD1, and MVD2 from the center point. The MV range, the MVD1 range, and the MVD2 range may all be the same. For example, the MV range, the MVD1 range, and the MVD2 range may all range from $-2^{17}$ to ($2^{17}-1$) (inclusive). All these ranges may include an 8K picture. That is, the MV, MVD1, and MVD2 ranges may indicate this, even in the worst case where the end of a picture is indicated. Accordingly, a better motion vector can be indicated, motion compensation may be considered to be well performed, residuals may be reduced, and coding efficiency may be increased.

FIG. 43 is a diagram illustrating MVD derivation of MMVD according to an embodiment of the present disclosure.

FIG. 43 may correspond to FIG. 39 a part of which has been modified. In the embodiment of FIG. 43, the content described with reference to FIG. 39 may be omitted. Alternatively, the above description may have been omitted.

When MMVD is used, an MVD derivation procedure may be performed. The MVD derivation procedure may be 8.5.2.7 shown in FIG. 43. The MVD that is the output of 8.5.2.7 may be an MVD of MMVD and may be MMVD information (mMvdLX). As described above, the MMVD information (mMvdLX) may be obtained based on MMVD distance-related information (mmvd_distance_idx) and MMVD direction-related information (mmvd_direction_idx).

More specifically, description will be provided with reference to FIG. 43. Referring to FIG. 43, a video signal processing device may obtain an MMVD offset (MmvdOffset). The video signal processing device may obtain an MMVD offset (MmvdOffset) in order to obtain MMVD information (mMvdLX). The MMVD offset (MmvdOffset) may be a value based on the MMVD-related syntax element described above. For example, the MMVD offset (MmvdOffset) may be a value based on MMVD distance-related information (mmvd_distance_idx) and MMVD direction-related information (mmvd_direction_idx).

According to an embodiment, the video signal processing device may determine, based on predFlagLX, whether a current block is predicted by bi-prediction. predFlagLX may indicate a reference list to be used. Here, X may be replaced with 0 and 1, and L0 and L1 may correspond to reference lists L0 and L1, respectively. If predFlagL0 is 1, this may indicate that a first reference list is used. If predFlagL0 is 0, this may indicate that the first reference list is not used. If predFlagL1 is 1, this may indicate that a second reference list is used. If predFlagL1 is 0, this may indicate that the second reference list is not used.

In FIG. 43, if both predFlagL0 and predFlagL1 are 1, bi-prediction may be indicated. Bi-prediction may indicate that both the first reference list and the second reference list are used. If the first reference list and the second reference list are used, the video signal processing device may perform an operation (8-348) of obtaining, as a first picture order count (POC) difference (currPocDiffL0), a difference between a POC of a current picture (currPic) including the current block and a POC of a first reference picture (RefPicList[0][refIdxL0]) based on the first reference list. If the first reference list and the second reference list are used, the video signal processing device may perform an operation (8-349) of obtaining, as a second picture order count (POC) difference (currPocDiffL1), a difference between the POC of the current picture (currPic) and a POC of a second reference picture (RefPicList[1][refIdxL1]) based on the first list.

A POC difference (currPocDiffLX) may be a difference between the POC of the current picture and a POC of a reference picture of a reference list (reference list LX), and X may be replaced with 0 and 1. The first POC difference (currPocDiffL0) and the second POC difference (currPocDiffL1) may be determined by (8-348) and (8-349) of FIG. 43, respectively. DiffPicOrderCnt may be calculated as follows.

DiffPicOrderCnt(picA, picB)=PicOrderCnt(picA)−PicOrderCnt(picB)

PicOrderCnt(picX) may indicate a picture order count value of picture picX.

The video signal processing device may perform an operation of obtaining first MMVD information (mMvdL0) related to the first reference list and second MMVD information (mMvdL1) related to the second reference list based on at least one of the MMVD offset (MmvdOffset), the first POC difference (currPocDiffL0), and the second POC difference (currPocDiffL1). Here, the MMVD information (mMvdLX) may include the first MMVD information (mMvdL0) and the second MMVD information (mMvdL1). A procedure of obtaining the first MMVD information (mMvdL0) and the second MMVD information (mMvdL1) by the video signal processing device will be described in detail below.

The video signal processing device may determine whether to use, as it is, the MMVD offset (MmvdOffset) as the MVD of the MMVD based on a picture order count (POC), whether to use a value calculated based on the MMVD offset (MmvdOffset), whether to use the MMVD offset (MmvdOffset) as it is for a value for a certain reference list, whether to use a value calculated based on the MMVD offset (MmvdOffset), for a value for a certain reference list, or the like.

If the first POC difference (currPocDiffL0) and the second POC difference (currPocDiffL1) are the same, the video signal processing device may perform operations (8-350 and 8-351) of obtaining the MMVD offset (MmvdOffset) as the first MMVD information (mMvdL0). If the first POC difference (currPocDiffL0) and the second POC difference (currPocDiffL1) are the same, the video signal processing device may perform operations (8-352 and 8-353) of obtaining the MMVD offset (MmvdOffset) as the second MMVD information (mMvdL1).

The video signal processing device may determine whether an absolute value (Abs(currPocDiffL0)) of the first POC difference is greater than an absolute value (Abs(currPocDiffL1)) of the second POC difference. If the absolute value (Abs(currPocDiffL0)) of the first POC difference is greater than or equal to the absolute value (Abs(currPocDiffL1)) of the second POC difference, the video signal processing device may perform operations (8-354 and 8-355) of obtaining the MMVD offset (MmvdOffset) as the first MMVD information (mMvdL0).

If the first reference picture (RefPicList[0][refIdxL0]) is not a long-term reference picture and the second reference picture (RefPicList[1][refIdxL1]) is not a long-term reference picture, the video signal processing device may perform operations (8-356 to 8-361) of obtaining the second MMVD information (mMvdL1) by scaling the first MMVD information (mMvdL0). A scale factor (distScaleFactor) may be used for scaling. The scale factor (distScaleFactor) may be obtained based on at least one of the first POC difference (currPocDiffL0) and the second POC difference (currPocDiffL1).

If the first reference picture is a long-term reference picture or the second reference picture is a long-term reference picture, the video signal processing device may perform operations (8-362 and 8-363) of obtaining the second MMVD information (mMvdL1) without scaling the absolute value of the first MMVD information (mMvdL0). Here, not scaling may refer to not changing the absolute value of the first MMVD information (mMvdL0). That is, the video signal processing device may obtain the second MMVD information (mMvdL1) by changing or without changing the sign of the first MMVD information (mMvdL0). If the signs of the first POC difference (currPocDiffL0) and the second POC difference (currPocDiffL1) are the same, the video signal processing device may configure the second MMVD information (mMvdL1) as the first MMVD information (mMvdL0). If the signs of the first POC difference (currPocDiffL0) and the second POC difference (currPocDiffL1) are different, the video signal processing device may configure the second MMVD information (mMvdL1) by changing the sign of the first MMVD information (mMvdL0).

The video signal processing device may determine whether the absolute value (Abs(currPocDiffL0)) of the first POC difference is smaller than the absolute value (Abs(currPocDiffL1)) of the second POC difference. If the absolute value (Abs(currPocDiffL0)) of the first POC difference is smaller than the absolute value (Abs(currPocDiffL1)) of the second POC difference, the video signal processing device may perform operations (8-364 and 8-365) of obtaining the MMVD offset (MmvdOffset) as the second MMVD information (mMvdL1).

If the first reference picture (RefPicList[0][refIdxL0]) is not a long-term reference picture and the second reference picture (RefPicList[1][refIdxL1]) is not a long-term reference picture, the video signal processing device may perform operations (8-366 to 8-371) of obtaining the first MMVD information (mMvdL0) by scaling the second MMVD information (mMvdL1). A scale factor (distScaleFactor) may be used for scaling. The scale factor (distScaleFactor) may be obtained based on at least one of the first POC difference (currPocDiffL0) and the second POC difference (currPocDiffL1).

If the first reference picture (RefPicList[0][refIdxL0]) is a long-term reference picture or the second reference picture (RefPicList[1][refIdxL1]) is a long-term reference picture, the video signal processing device may perform operations (8-372 and 8-373) of obtaining the first MMVD information (mMvdL0) without scaling the absolute value of the second MMVD information (mMvdL1). Here, not scaling may refer to not changing the absolute value of the second MMVD information (mMvdL1). That is, the video signal processing device may obtain the first MMVD information (mMvdL0) by changing or without changing the sign of the second MMVD information (mMvdL1). If the signs of the first POC difference (currPocDiffL0) and the second POC difference (currPocDiffL1) are the same, the video signal processing device may configure the first MMVD information (mMvdL0) as the second MMVD information (mMvdL1). If the signs of the first POC difference (currPocDiffL0) and the second POC difference (currPocDiffL1) are different, the video signal processing device may configure the first MMVD information (mMvdL0) by changing the sign of the second MMVD information (mMvdL1).

In FIG. 43, if at least one of predFlagL0 and predFlagL1 is not 1, uni-prediction may be indicated. In a case of uni-prediction, it may be possible to use, as it is, the MMVD offset (MmvdOffset) as the MMVD information (mMvdLX) ((8-374) and (8-375)).

As described above, the video signal processing device may perform an operation of obtaining the MMVD offset based on the MMVD distance-related information and the MMVD direction-related information in order to obtain the MMVD information (mMvdLX). If only the first reference list is used (predFlagL0=1), the video signal processing device may perform operations (8-374 and 8-375) of obtaining the MMVD offset (MmvdOffset), without scaling of the same, as the first MMVD information (mMvdL0) related to the first reference list.

If only the second reference list is used (predFlagL1=1), the video signal processing device may perform operations (8-374 and 8-375) of obtaining the MMVD offset (MmvdOffset), without scaling of the same, as the second MMVD information (mMvdL1) related to the second reference list.

As described above, the range of the MVD of the MMVD may be limited. The MVD of the MMVD may be the MMVD information (mMvdLX). According to an embodiment of the present disclosure, the range of the MVD of the MMVD may be the same as the range of an MVD (e.g., the MVD based on the syntax element of FIG. 9) determined by another method. The range of the MVD of the MMVD may be the same as the range of a final MV. According to an embodiment of the present disclosure, the MVD range of the MMVD or the range of the MMVD information (mMvdLX) may be from $-2^{17}$ to $2^{17}-1$, wherein $-2^{17}$ and $2^{17}-1$ are inclusive.

As described above, an MV scaling procedure may be included in the procedure of MVD derivation of the MMVD. A clipping operation to limit a range may be included in the procedure of MVD derivation of the MMVD.

Referring to FIG. 43, the MMVD information (mMvdLX) may be based on a clipping operation. Here, X may be replaced with 0 or 1 which may correspond to the first reference list (reference list L0) or the second reference list (reference list L1), respectively. For example, the MMVD information (mMvdLX) may be based on a Clip3 operation. For example, the MMVD information (mMvdLX) may be based on Clip3($-2^{17}$, $2^{17}-1$, x). In this case, x may be a value based on the first POC difference (currPocDiffL0), the second POC difference (currPocDiffL1), or the MMVD offset (MmvdOffset). For example, x may be a value based on the scale factor (distScaleFactor) and the MMVD offset (MmvdOffset). (8-360), (8-361), (8-370), and (8-371) of FIG. 43 include a clipping operation for limiting MVD ranges.

As an additional embodiment, in FIG. 42 and FIG. 43, a unified range between the MV, MVD, MVD1, and MVD2, and the MVD range of the MVD and MMVD by multiple MVD generation methods may be from $-2^{N}+1$ to $2^{N}$, where $-2^{N}+1$ and $2^{N}$ are inclusive. More specifically, N may be 17. That is, the unified range between the MV, MVD, MVD1, and MVD2, and the MVD range of the MVD and MMVD by multiple MVD generation methods may be from $-2^{17}+1$ to $2^{17}$, where $-2^{17}+1$ and $2^{17}$ are inclusive. In this case, it may be possible to express the MVD in 18 bits.

According to an embodiment of the present disclosure, a range of a chroma MV may be different from a range of a luma MV. For example, the chroma MV may have a higher resolution than that of the luma MV. That is, 1 unit of the chroma MV may express a smaller pixel compared to 1 unit of luma MV. For example, the luma MV may be in units of 1/16 pels. The chroma MV may be in units of 1/32 pels.

The chroma MV may be based on the luma MV. For example, the chroma MV may be determined by multiplying the luma MV by a certain value. The certain value may be 2/SubWidthC for a horizontal component and 2/SubHeightC for a vertical component. 2, which is included in the certain value, may be a value included because the resolution of the chroma MV is two times higher than the resolution of the luma MV. SubWidthC and SubHeightC may be values determined according to a color format. SubWidthC and SubHeightC may be values for chroma sample sampling. For example, SubWidthC and SubHeightC may be values regarding the number of existing chroma samples with respect to a luma sample. SubWidthC and SubHeightC may be 1 or 2.

According to an embodiment of the present disclosure, if the resolution of the chroma MV is higher than the resolution of the luma MV, the range of the chroma MV may be broader than the range of the luma MV. This may be to allow an area, which is covered by the luma MV, to be also covered by the chroma MV. For example, the range of the chroma MV may be twice the range of the luma MV. For example, the chroma MV range may be from $-2^{18}$ to $2^{18}-1$, wherein $-2^{18}$ and $2^{18}-1$ are inclusive. Also, the luma MV range may be from $-2^{17}$ to $2^{17}-1$, wherein $-2^{17}$ and $2^{17}-1$ are inclusive.

The range of the chroma MV may vary depending on a color format. For example, if SubWidthC or SubHeightC is 1, the range of the chroma MV may be different from the range of the luma MV. In this case, it is possible that the range of the chroma MV is twice the range of the luma MV. For example, the chroma MV range may be from $-2^{18}$ to $2^{18}-1$, in which case $-2^{18}$ and $2^{18}-1$ are inclusive, and the luma MV range may be from $-2^{17}$ to $2^{17}-1$, in which case $-2^{17}$ and $2^{17}-1$ are inclusive. If SubWidthC and SubHeightC are 2, the range of the chroma MV may be the same as the range of the luma MV. In this case, the range may be from $-2^{17}$ to $2^{17}-1$, wherein $-2^{17}$ and $2^{17}-1$ are inclusive. This may be to unify the ranges expressible by the chroma MV and the luma MV.

In the embodiment of the present disclosure, in a case of a 4:2:0 format, SubWidthC and SubHeightC may be 2 and 2, respectively. In the case of the 4:2:2 format, SubWidthC and SubHeightC may be 2 and 1, respectively. In a case of a 4:4:4 format, SubWidthC and SubHeightC may be 1 and 1, respectively.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A method for decoding a video signal, the method comprising:
    obtaining chroma component format information from a higher-level bitstream;
    obtaining width-related information (SubWidthC) and height-related information (SubHeightC) based on the chroma component format information;
    obtaining x-axis scale information based on the width-related information or information on a color component of a current block;
    obtaining y-axis scale information based on the height-related information or information on the color component of the current block;
    determining a location of a left block based on the y-axis scale information;
    determining a location of an upper block based on the x-axis scale information;
    determining a weighting value based on the left block and the upper block;
    obtaining first samples by predicting the current block in a merge mode;
    obtaining second samples by predicting the current block in an intra mode; and
    obtaining a combination prediction sample for the current block based on the weighting value, the first samples, and the second samples.

2. The method of claim 1, wherein the determining of the weighting value comprises:
    if the left block is available, and a prediction mode of the left block is intra prediction, setting code information (isIntraCodedNeighbourA) of the left block to TRUE;
    if the left block is not available, or the prediction mode of the left block is not intra prediction, setting the code information of the left block to FALSE;
    if the upper block is available, and a prediction mode of the upper block is intra prediction, setting code information (isIntraCodedNeighbourB) of the upper block to TRUE; and
    if the upper block is not available, or the prediction mode of the upper block is not intra prediction, setting the code information of the upper block to FALSE.

3. The method of claim 2, wherein the determining the weighting value comprises:
    if both the code information of the left block and the code information of the upper block are TRUE, determining the weighting value to be 3;
    if both the code information of the left block and the code information of the upper block are FALSE, determining the weighting value to be 1; and
    if only one of the code information of the left block and the code information of the upper block is TRUE, determining the weighting value to be 2.

4. The method of claim 1, wherein the obtaining the combination prediction sample comprises predicting the current block based on predSamplesComb[x][y]= (w*predSamplesIntra[x][y]+(4−w)*predSamplesInter[x][y]+2) >>2, where predSamplesComb refers to the combination prediction sample, w refers to the weighting value, predSamplesIntra refers to the second samples, predSamplesInter refers to the first samples, [x] refers to an x-axis coordinate of a sample included in the current block, and [y] refers to a y-axis coordinate of the sample included in the current block.

5. The method of claim 1, wherein the obtaining the x-axis scale information comprises:
    if the information on the color component of the current block is 0, or the width-related information is 1, determining the x-axis scale information to be 0; and
    if the information on the color component of the current block is not 0, and the width-related information is not 1, determining the x-axis scale information to be 1, and
    the obtaining the y-axis scale information comprises:
    if the information on the color component of the current block is 0, or the height-related information is 1, determining the y-axis scale information to be 0; and
    if the information on the color component of the current block is not 0, and the height-related information is not 1, determining the y-axis scale information to be 1.

6. The method of claim 1, wherein:
    the location of the left block is (xCb −1, yCb −1+ (cbHeight <<scallFactHeight)), where xCb is an x-axis coordinate of a top-left sample of a current luma block, yCb is a y-axis coordinate of the top-left sample of the current luma block, cbHeight is a value of a height of the current block, and scallFactHeight is the y-axis scale information; and
    the location of the upper block is (xCb −1+ (cbWidth <<scallFactWidth), yCb −1), where xCb is the x-axis coordinate of the top-left sample of the current luma block, yCb is the y-axis coordinate of the top-left sample of the current luma block, cbWidth is a value of a width of the current block, and scallFactWidth is the x-axis scale information.

7. A device for decoding a video signal, the device comprising a processor and a memory, wherein, based on instructions stored in the memory, the processor is configured to:
  obtain chroma component format information from a higher-level bitstream;
  obtain width-related information (SubWidthC) and height-related information (SubHeightC) based on the chroma component format information;
  obtain x-axis scale information based on the width-related information or information on a color component of a current block;
  obtain y-axis scale information based on the height-related information or information on the color component of the current block;
  determine a location of a left block based on the y-axis scale information;
  determine a location of an upper block based on the x-axis scale information;
  determine a weighting value based on the left block and the upper block;
  obtain first samples by predicting the current block in a merge mode;
  obtain second samples by predicting the current block in an intra mode; and
  obtain a combination prediction sample for the current block based on the weighting value, the first samples, and the second samples.

8. The device of claim 7, wherein, based on the instructions stored in the memory, the processor is configured to: if the left block is available, and a prediction mode of the left block is intra prediction, set code information (isIntraCodedNeighbourA) of the left block to TRUE;
  if the left block is not available, or the prediction mode of the left block is not intra prediction, set the code information of the left block to FALSE;
  if the upper block is available, and a prediction mode of the upper block is intra prediction, set code information (isIntraCodedNeighbourB) of the upper block to TRUE; and
  if the upper block is not available, or the prediction mode of the upper block is not intra prediction, set the code information of the upper block to FALSE.

9. The device of claim 8, wherein, based on the instructions stored in the memory, the processor is configured to: if both the code information of the left block and the code information of the upper block are TRUE, determine the weighting value to be 3;
  if both the code information of the left block and the code information of the upper block are FALSE, determine the weighting value to be 1; and
  if only one of the code information of the left block and the code information of the upper block is TRUE, determine the weighting value to be 2.

10. The device of claim 7, wherein, based on the instructions stored in the memory, the processor is configured to predict the current block based on predSamplesComb[x][y]=(w*predSamplesIntra[x][y]+(4−w)*predSamplesInter[x][y]+2) >>2, where predSamplesComb refers to the combination prediction sample, w refers to the weighting value, predSamplesIntra refers to the second samples, predSamplesInter refers to the first samples, [x] refers to an x-axis coordinate of a sample included in the current block, and [y] refers to a y-axis coordinate of the sample included in the current block.

11. The device of claim 7, wherein, based on the instructions stored in the memory, the processor is configured to: if the information on the color component of the current block is 0, or the width-related information is 1, determine the x-axis scale information to be 0;
  if the information on the color component of the current block is not 0, and the width-related information is not 1, determine the x-axis scale information to be 1;
  if the information on the color component of the current block is 0, or the height-related information is 1, determine the y-axis scale information to be 0; and
  if the information on the color component of the current block is not 0, and the height-related information is not 1, determine the y-axis scale information to be 1.

12. The device of claim 7, wherein:
  the location of the left block is (xCb −1, yCb −1+ (cbHeight <<scallFactHeight)), where xCb is an x-axis coordinate of a top-left sample of a current luma block, yCb is a y-axis coordinate of the top-left sample of the current luma block, cbHeight is a value of a height of the current block, and scallFactHeight is the y-axis scale information; and
  the location of the upper block is (xCb −1+ (cbWidth <<scallFactWidth), yCb −1), where xCb is the x-axis coordinate of the top-left sample of the current luma block, yCb is the y-axis coordinate of the top-left sample of the current luma block, cbWidth is a value of a width of the current block, and scallFactWidth is the x-axis scale information.

13. A method for generating a bitstream including a video signal, the method comprising:
  generating chroma component format information;
    obtaining width-related information (SubWidthC) and height-related information (SubHeightC) based on the chroma component format information;
    obtaining x-axis scale information based on the width-related information or information on a color component of a current block;
    obtaining y-axis scale information based on the height-related information or information on the color component of the current block;
    determining a location of a left block based on the y-axis scale information;
    determining a location of an upper block based on the x-axis scale information;
    determining a weighting value based on the left block and the upper block;
    obtaining first samples by predicting the current block in a merge mode;
    obtaining second samples by predicting the current block in an intra mode; and
    obtaining a combination prediction sample for the current block based on the weighting value, the first samples, and the second samples.

14. A non-transitory computer-readable medium storing a bitstream, the bitstream being decoded by a decoding method,
  wherein the decoding method comprises:
    obtaining chroma component format information from a higher-level bitstream;
    obtaining width-related information (SubWidthC) and height-related information (SubHeightC) based on the chroma component format information;
    obtaining x-axis scale information based on the width-related information or information on a color component of a current block;
    obtaining y-axis scale information based on the height-related information or information on the color component of the current block;

determining a location of a left block based on the y-axis scale information;
determining a location of an upper block based on the x-axis scale information;
determining a weighting value based on the left block and the upper block;
obtaining first samples by predicting the current block in a merge mode;
obtaining second samples by predicting the current block in an intra mode; and
obtaining a combination prediction sample for the current block based on the weighting value, the first samples, and the second samples.

* * * * *